(12) United States Patent
Clerc

(10) Patent No.: US 12,329,719 B2
(45) Date of Patent: Jun. 17, 2025

(54) ADMINISTRATION PACKAGING AND METHOD FOR ITS PRODUCTION

(71) Applicant: Boehringer Ingelheim Vetmedica GmbH, Ingelheim am Rhein (DE)

(72) Inventor: Marie-Amélie Clerc, Lyons (FR)

(73) Assignee: BOEHRINGER INGELHEIM VETMEDICA GMBH, Ingelheim am Rhein (DE)

( * ) Notice: Subject to any disclaimer, the term of this patent is extended or adjusted under 35 U.S.C. 154(b) by 85 days.

(21) Appl. No.: 18/473,915

(22) Filed: Sep. 25, 2023

(65) Prior Publication Data

US 2024/0108544 A1 Apr. 4, 2024

(30) Foreign Application Priority Data

Sep. 30, 2022 (EP) .................................. 22199095

(51) Int. Cl.
| | |
|---|---|
| *A61J 1/06* | (2006.01) |
| *A61J 1/14* | (2023.01) |
| *B32B 7/02* | (2019.01) |
| *B32B 27/08* | (2006.01) |
| *B32B 27/30* | (2006.01) |
| *B32B 27/32* | (2006.01) |
| *B65B 3/00* | (2006.01) |
| *B65B 3/02* | (2006.01) |

(Continued)

(52) U.S. Cl.
CPC .............. *A61J 1/067* (2013.01); *A61J 1/1468* (2015.05); *B32B 7/02* (2013.01); *B32B 27/08* (2013.01); *B32B 27/306* (2013.01); *B32B 27/325* (2013.01); *B65B 3/006* (2013.01); *B65B 3/022* (2013.01); *B65D 75/322* (2013.01); *B65D 75/5811* (2013.01); *B32B 2250/05* (2013.01); *B32B 2250/246* (2013.01); *B32B 2307/31* (2013.01); *B32B 2307/7244* (2013.01); *B32B 2307/7246* (2013.01); *B32B 2307/7376* (2023.05); *B32B 2307/738* (2013.01); *B32B 2439/80* (2013.01)

(58) Field of Classification Search
CPC ........... A61J 1/106; A61J 1/1468; B32B 7/02; B32B 27/08; B32B 27/306; B32B 27/325; B32B 2307/7376; B32B 2250/05; B32B 2250/246; B32B 2307/31; B32B 2307/7244; B32B 2307/7246; B32B 2307/738; B32B 2439/80; B65B 3/006; B65B 3/022; B65D 75/322; B65D 75/5811
USPC ....... 206/524.1, 524.2, 524.6, 467, 471, 469
See application file for complete search history.

(56) References Cited

U.S. PATENT DOCUMENTS

| | | | |
|---|---|---|---|
| 5,215,221 A | 6/1993 | Dirksing | |
| 11,858,241 B2 * | 1/2024 | Münster | ................. B32B 27/20 |

(Continued)

FOREIGN PATENT DOCUMENTS

| | | |
|---|---|---|
| DE | 20116341 U1 | 1/2002 |
| EP | 1263389 B1 | 5/2004 |

(Continued)

*Primary Examiner* — Jacob K Ackun
(74) *Attorney, Agent, or Firm* — Calderon Safran & Wright P.C.; David S. Safran

(57) ABSTRACT

An administration packaging and method for its production. The administration packaging having a bottom part and a cover which are formed of multi-layer films.

20 Claims, 14 Drawing Sheets

(51) Int. Cl.
*B65D 75/32* (2006.01)
*B65D 75/58* (2006.01)

(56) References Cited

U.S. PATENT DOCUMENTS

| | | | |
|---|---|---|---|
| 2002/0193031 A1* | 12/2002 | Stell | B32B 3/28 |
| | | | 442/378 |
| 2011/0049003 A1* | 3/2011 | Bellamah | B32B 27/08 |
| | | | 205/183 |
| 2012/0118920 A1 | 5/2012 | Havrileck et al. | |
| 2012/0265159 A1 | 10/2012 | Kaufman | |
| 2014/0053952 A1* | 2/2014 | Genosar | A61J 1/2096 |
| | | | 141/105 |
| 2015/0151891 A1 | 6/2015 | Shi et al. | |
| 2016/0122103 A1 | 5/2016 | Havrileck et al. | |
| 2022/0054356 A1* | 2/2022 | Liao | C08G 63/181 |
| 2022/0257469 A1* | 8/2022 | Wang | A61K 9/1652 |
| 2022/0388749 A1* | 12/2022 | Van Landeghem | B32B 3/30 |

FOREIGN PATENT DOCUMENTS

| | | |
|---|---|---|
| EP | 2998055 A1 | 3/2016 |
| EP | 2998098 A1 | 3/2016 |
| EP | 2998099 A1 | 3/2016 |
| EP | 3025848 A1 | 6/2016 |
| EP | 2432701 B1 | 10/2018 |
| WO | 2008/044549 A1 | 4/2008 |
| WO | 2018132113 A1 | 7/2018 |

* cited by examiner

ADMINISTRATION PACKAGING AND METHOD FOR ITS PRODUCTION

CROSS-REFERENCE TO RELATED APPLICATIONS

This application claims the benefit under 35 U.S.C. 119(a) to European Patent Application No. 22 199 095.5, filed Sep. 30, 2022, the disclosure of which is incorporated herein by reference in its entirety.

BACKGROUND OF THE INVENTION

Field of the Invention

The present invention relates to an administration packaging for a preferably liquid pharmaceutic product as well as to a method for producing and filling an administration packaging and to a use of a plastic sheet for producing an administration packaging.

The administration packaging is in particular produced by thermoforming. Thermoforming is a method in which a plastic sheet, in particular a film or foil, is heated to a pliable forming temperature and then formed to a specific shape in a mold. Further, the plastic sheet is preferably trimmed after forming in the mold.

The administration packaging is in particular a packaging for a liquid pharmaceutic product which contains the product or in which the product is stored and which is also usable for administering the product to a patient. The packaging is in particular a pipette or can be used as or transformed to a pipette.

The pharmaceutic product is preferably a liquid and/or a product which is to be applied on the skin and/or fur of a patient, preferably a domestic animal such as a cat or dog.

Description of Related Art

European Applications EP 2 998 098 A1 and EP 2 998 099 A1 relate to methods for producing and filling an administration packaging for a liquid pharmaceutic product. The packaging is produced by a thermoforming process, wherein a deep-drawing film is heated in order to plasticize the film at least in sub-regions, the plasticized regions are deep-drawn into a molding tool to form a chamber for the product and a cannula-like administration channel opening into that chamber, the product is introduced into the chamber, and the filled deep-drawn film is covered with a cover film in order to close the chamber and the administration channel. In an end region, the administration channel is provided with a crack or groove forming a predetermined breaking zone at which the tip of the application channel can be broken off in order to open the administration packaging. The predetermined breaking zone is generated before the deep-drawing film is heated. The deep-drawing film is a laminated composite film with one layer of polypropylene (PP) and one layer of an acrylonitrile-methylacrylate-copolymer (AMAB) and the crack or groove is generated by cutting through the PP layer.

The methods disclosed in EP 2 998 098 A1 and EP 2 998 099 A1 have several disadvantages.

First, to avoid any undesired interaction of solvents or active ingredients of the pharmaceutic product and the packaging, only specific combinations of plastic films can be used for both the cover film as well as the deep-drawn film. The same applies for the breaking zone: Only specific material combinations can be used to ensure that reproducibly a clean break at the breaking zone and a usable pipette ready for application are obtained. Unfortunately, the specific acrylonitrile methacrylate copolymer (AMAB) mentioned in EP 2 998 098 A1 or EP 2 998 099 A1, respectively, which was distributed under the brand Barex®, is not available anymore.

Moreover, the generation of the groove requires an extra step in addition to the thermoforming step in which the chamber and the administration channel are formed.

Lastly, the method of generating the predetermined breaking zone by cutting through the PP layer does not work well when the film has a different composition than the one described and/or a system for cutting is more complex to set up.

Thus, there is a need for a new material combination which renders possible the use of such single use administration packagings for liquid pharmaceutic products.

US patent application publication 2012/0265159 A1 describes devices for storing and dispensing medicaments, and more particularly describes a device that can be used to dispense a parasiticidal medicament to the skin of an animal. Specific focus lies on the configuration of the packaging device, which is designed such that it comprises a wall or second layer coupled to a substrate or first layer, wherein the substrate and the wall define a medicament reservoir. At least a portion of the wall or second layer is configured to be deformed to reduce a volume of the medicament reservoir when the wall is actuated, so that dispensing a medicament from the device is facilitated.

In view of materials to be possibly included in the first or second layer of the device, it is merely stated that the first layer and/or the second layer, as well as any other layers, walls and structures included within any of the medicament containers described can be constructed from any suitable material. Such materials can be selected to minimize interaction with the medicament, can be constructed from a substantially inert and/or flexible polymer or can be constructed from a polymer with a certain hardness. The material, however, is not related to a possible opening mechanism of the device described, and specifically not directed at a potential or at all possible use in the context of designing a predetermined breaking zone.

German utility model DE 201 16 341 U1 describes polyolefin multilayer films. The films are specifically suited for the application with perishable foods like fresh meat or sausages. The multilayer plastic film therefore comprises at least two plastic layers, wherein at least one layer comprises a mixture of at least one semicrystalline polyolefin and more than 5 wt. % of at least one amorphous polyolefin, and at least one further layer comprises a material having an oxygen barrier effect. The films are expected to be characterized by a uniform wall thickness distribution after thermoforming, good thermoformability with low shrinkage after thermoforming, a good puncture resistance under static and/or dynamic loads, good barrier properties against water vapor and oxygen and consistent mechanical properties regardless of moisture absorption.

The document, however, does not relate or provide a basis for a potential suitability of the multilayer films for medicinal applications which go along with specific application requirements that cannot be equated to material requirements for food packaging. Further, the films are described as particularly puncture resistant, even under mechanic strain. This material characteristic appears unsuited for an administration packaging that is intended to be opened by breaking off or open a certain part of the packaging.

International Patent Application Publication WO 2018/132113 A1 and corresponding U.S. Patent Application Publication 2019/337694 A1 describe a blister packaging for solid pharmaceuticals, i.e., tablets. These are formed by a multilayer structure comprising, in the following order: a first passive moisture barrier layer; a second passive moisture barrier layer; a first active moisture barrier layer comprising a first moisture absorbing composition and a cyclic olefin copolymer; and, a third passive moisture barrier layer, wherein the first, second and third passive moisture barrier layers and the first active moisture barrier layer are contiguous, non-contiguous or combinations thereof.

It Is mentioned that by appropriate modification of the active moisture barrier layer using an elastomer, and also by surrounding the active moisture barrier layer with passive moisture barrier layers with a modulus equivalent to or lower than the active moisture barrier layer, effective post processing is enabled. Appropriate modification in this regard means lowering stiffness or increasing flexibility and elasticity of the material, respectively. From this it can be concluded that the described material is not suited for use in an administration packaging that is intended to be opened by breaking off or open a certain part of the packaging as rather the opposite, i. e. no stiffness or breakability, constitutes the focus of WO 2018/132113 A1.

Accordingly, the prior art lacks suitable alternatives that could be used as a substitute for the material described in EP 2 998 099 A1 or EP 2 998 099 A1, respectively. In this regard, specifically the aspect of controlled breakability of polymeric materials remains largely untouched.

Furthermore, there is a need for an efficient method for producing administration packaging that allows the reproducible formation of a predetermined breaking zone in the administration packaging.

SUMMARY OF THE INVENTION

Therefore, it is an object of the present invention to provide a new material combination which protects the active ingredients of a liquid pharmaceutic products from environmental effects and which does not show any undesired chemical interaction with solvents or active ingredients of the liquid pharmaceutic product, and furthermore prevents the liquid pharmaceutic products or its constituents from leaking out of the packaging.

Moreover, it is an object of the present invention to provide a material combination which renders it possible to obtain a distinct breaking zone in the packaging which allows to precisely open the packaging in a predetermined manner.

Finally, it is an object of the present invention to provide an enhanced method for producing administrative packaging.

To solve the aforementioned objects, the present invention suggests an administration packaging as described herein.

Moreover, to solve the aforementioned objects, the present invention suggests a method as described herein.

Moreover, to solve the aforementioned objects, the present invention suggests a use of a plastic sheet as described herein.

It goes without saying that special features, characteristics, embodiments and advantages or the like which are set forth below—for the purpose of avoiding unnecessarily repetition—with respect to only one aspect of the invention, apply, of course, accordingly with respect to the other aspects of the invention, without the need for expressed mention.

Furthermore, it applies that all values or parameters or the like mentioned in the following can in principle be determined or measured by standardized or explicitly stated determination methods or by determination methods familiar to the person skilled in the art in this field.

Furthermore, it goes without saying that all weight- or quantity-related percentages are selected by the person skilled in the art in such a way that the total results in 100%.

With this proviso made, the present invention will be described in more detail below.

Thus, the subject-matter of the present invention—according to a first aspect of the present invention—is an administration packaging for a preferably liquid pharmaceutic product, wherein the administration packaging has a bottom part having a cavity for receiving the pharmaceutic product and a rim surrounding the cavity,
wherein the administration packaging has a cover which covers and completely closes the cavity,
wherein the administration packaging, in particular the bottom part, has a predetermined breaking zone for opening the administration packaging by breaking the breaking zone,
wherein the bottom part is formed from a plastic sheet in form of a multi-layer film and wherein the cover is a cover sheet in form of a multi-layer film,
wherein
the plastic sheet of the bottom part comprises at least 5 layers:
an outer thermoformable layer,
a cyclic olefin copolymer (COC) layer,
an inner thermoformable layer,
a barrier layer, preferably barrier layer against oxygen and/or chemicals,
a sealing layer, preferably a heat-sealing layer,
wherein the cyclic olefin copolymer layer is arranged between the outer thermoformable layer and the inner thermoformable layer and wherein the barrier layer is arranged between the sealing layer and the inner thermoformable layer.

As applicant has surprisingly found, this specific combination of films allows to obtain deep drawn packagings which are suitable for single use as breakable packagings for the administration of liquid pharmaceutical products. The combination of materials particularly allows to enclose liquid pharmaceuticals safely in a packaging without any undesired interaction between the packaging and the ingredients of the liquid pharmaceutic products, especially active ingredients or solvents, respectively. Moreover, substances from the environment, in particular oxygen and/or water vapor cannot penetrate the packaging and deteriorate the liquid pharmaceutic product. The above combination of layers allows to substitute the Barex®-films used so far and the inventive layer structure has a thickness which is similar to that of known multilayer Barex® films.

Thermoformable deep drawing films based on cyclic olefin copolymers (COC) surprisingly show comparable or even enhanced chemical and mechanical properties compared to the Barex containing multilayer films used in the prior art. The cyclic olefin copolymer (COC) layer is the main layer of the multilayer plastic sheet that forms the bottom part of the inventive administration packaging. The cyclic olefin copolymer (COC) layer comprises or consists of, preferably consists of, COC. Cyclic olefin copolymers (COC) are amorphous polymers which are obtained by copolymerization of cyclic monomers, such as 8,9,10-trinorborn-2-ene (nobornene) or 1,2,3,4,4a,5,8,8a-octahydro-1,4:5,8-dimethanonaphtalene (tetracyclododecene) with ethene. Particularly preferred for use with the present invention are copolymers of ethene and nornornene.

COC is rigid and therefore able to provide structural integrity and stiffness to the inventive administration packaging, but also brittle and therefore can be manufactured into packagings with a predetermined breaking zone for opening the packaging. Moreover, COC has good moisture barrier properties, particularly if used with a high layer thickness. Moreover, COC has good chemical resistance and barrier properties with regard to polar solvents and is resistant to acids and bases.

A further advantage of COC is that it is available with high purity so that no impurities can be extracted by solvents or active ingredients contained in a packaging.

As delineated above, the COC layer is arranged between two thermoformable layers.

According to the invention, the outer thermoformable layer comprises or consists of, preferably consists of, a polymer is selected from the group consisting of polystyrene (PS), polyvinyl chloride (PVC), amorphous polyethylene therephthalate (APET), ethylene butylacrylate (EBA), ethylene vinyl acetate (EVA), polypropylene (PP), polyethylene (PE), low-density polyethylene (LDPE), linear low-density polyethylene (LLDPE) and mixtures thereof.

The outer thermoformable layer is usually also the outer surface of the administration packaging, particularly of the bottom part of the administration packaging. The outer thermoformable layer is usually less rigid and less brittle than the COC layer. It protects the COC layer from damage and provides a better processability and enhanced thermoforming properties to the multi-layer film.

According to a preferred embodiment of the present invention, the polymer of the outer thermoformable layer is selected from the group consisting of polypropylene (PP), polyethylene (PE), low-density polyethylene (LDPE), linear low-density polyethylene (LLDPE) or mixtures thereof.

Best results are obtained, if the polymer of the outer thermoformable layer is polypropylene (PP). Polypropylene has a good compatibility with COC. Moreover, polypropylene is much less rigid and brittle than COC and therefore, an outer thermoformable layer of PP improves the thermoforming properties of the COC layer and protects the brittle COC layer from damage during processing, storage or application. Moreover, the processability of the multilayer film, particularly the COC layer is enhanced by the PP layer. Particularly, a PP layer provides enhanced flexibility to the COC layer and the plastic sheet of the bottom part of the inventive administration packaging.

The inner thermoformable layer usually comprises or consists of, preferably consists of, a polymer selected from the group consisting of polystyrene (PS), polyvinyl chloride (PVC), amorphous polyethylene therephthalate (APET), ethylene butylacrylate (EBA), ethylene vinyl acetate (EVA), polypropylene (PP), polyethylene (PE), low-density polyethylene (LDPE), linear low-density polyethylene (LLDPE) and mixtures thereof.

According to the invention, it is particularly preferred if the polymer of the inner thermoformable layer is selected from the group consisting of polypropylene (PP), polyethylene (PE), low-density polyethylene (LDPE), linear low-density polyethylene (LLDPE) or mixtures thereof. Particularly good results are obtained if the polymer is polypropylene (PP).

If, according to the present invention a plastic film or a layer comprises or consists of a specific polymer that means that the film or layer comprises or consists of, respectively, this polymer as the polymeric material of the film or layer, respectively. However, further constituents, for example fillers and additives, can also be present in the film or layer, respectively.

According to the present invention, it is preferred, if the outer thermoformable layer and the inner thermoformable layer comprise or consist of, preferably consist of, the same polymer(s).

Preferably, the outer thermoformable layer and the inner thermoformable layer comprise or consist of the same materials, i.e., polymers. In this regard, it is particularly preferred if the outer thermoformable layer and the inner thermoformable layer comprise or consist of, preferably consist of, polypropylene (PP). If the COC layer is arranged between two PP layers, the processability of the resulting multilayer film is particularly good. In particular, the rigidity of the COC is reduced by the PP, on the one hand, but, on the other hand, the brittleness of the COC still allows the fabrication of predetermined distinct breaking zones in the packaging.

With regard to the barrier layer, it is preferred according to the invention, if the barrier layer comprises or consists of, preferably consists of, a polymer selected from the group consisting of ethylene vinyl alcohol (EVOH), ethylene vinyl acetate (EVA), polyvinylidene chloride (PVDC), polychlorotrifluoroethylene (PCTFE), polyethylene therephthalate (PET), amorphous polyethylene therephthalate (APET), polyethylene naphthalate (PEN), ethyl methylacrylate (EMA), ethylene butylacrylate (EBA), ethylene ethylacrylate (EEA), poly(methyl methacrylate) (PMMA), ethylene/methyl methacrylate (EMMA), ethylene acrylic acid copolymers (EAA), ethylene methacrylic acid copolymers (EMAA), polyacrylonitrile (PAN) or mixtures thereof.

According to the invention it is preferred, if the barrier layer comprises or consists of, preferably consists of, a polymer selected from the group consisting of ethylene vinyl alcohol (EVOH), polyvinylidene chloride (PVDC), polychlorotrifluorethylene (PCTFE) and mixtures thereof.

According to a particularly preferred embodiment of the present invention, the polymer of the barrier layer comprises or consists of, preferably consists of, ethylene vinyl alcohol (EVOH). Particularly ethylene vinyl alcohol provides good barrier properties against oxygen as well as against solvents and other chemicals or ingredients of the pharmaceutical product.

With regard to the sealing layer, it is preferred according to the invention, if the sealing layer comprises or consists of, preferably consists of, a polymer selected from the group consisting of polypropylene (PP), copolymers of propylene (CoPP), terpolymers of polypropylene (ter-PP), polyethylene (PE), low-density polyethylene (LDPE), linear low-density polyethylene (LLDPE), metallocene linear low-density polyethylene (mLLDPE), very low-density polyethylene (VLDPE), ionomers of acid copolymers, ethylene acrylic acid copolymers (EAA), ethylene methacrylic acid copolymers (EMAA), ethyl methylacrylate (EMA), ethylene vinyl alcohol (EVA) or mixtures thereof.

According to a preferred embodiment of the present invention, the polymer of the sealing layer is selected from the group consisting of polypropylene (PP), copolymers of propylene (CoPP), terpolymers of polypropylene (ter-PP), polyethylene (PE), low-density polyethylene (LDPE), linear low-density polyethylene (LLDPE), metallocene linear low-density polyethylene (mLLDPE), very low-density polyethylene (VLDPE) or mixtures thereof. Particularly good results are obtained if the polymer is selected from the group of polypropylene (PP), polyethylene (PE), low-density polyethylene (LDPE), linear low-density polyethylene (LLDPE), metallocene linear low-density polyethylene (mLLDPE), very low-density polyethylene (VLDPE) or mixtures thereof.

According to the invention it is particularly preferred if the sealing layer comprises or consists of, preferably consists of, polyethylene (PE). Polyethylene is a common material for sealing layers, has good water vapor barrier properties and is compatible with many barrier materials, particularly EVOH.

As already delineated above, the COC-layer provides the structural integrity to the administration packaging. Therefore, the COC layer usually is the thickest layer of the multilayer plastic sheet that forms the bottom part of the inventive administration packaging.

It is preferred according to the invention, if the cyclic olefin copolymer (COC) layer has a thickness of at least 200 µm, particularly 250 µm, preferably 300 µm, more preferably 350 µm, particularly preferably 360 µm.

Likewise, it is preferred, if the cyclic olefin copolymer layer has a thickness of at most 600 µm, particularly 500 µm, preferably 450 µm, more preferably 400 µm, particularly preferably 390 µm.

Moreover, good results are obtained if the cyclic olefin copolymer layer has a thickness in the range of from 200 to 600 µm, particularly 250 to 500 µm, preferably 300 to 450 µm, more preferably 350 to 400 µm, particularly preferably 360 to 390 µm.

COC layers with the above-mentioned thickness show good water vapor barrier properties and are able to provide structural integrity and stiffness to the administration packaging.

With regard to the outer thermoformable layer and the inner thermoformable layer it is preferred if the outer thermoformable layer and/or the inner thermoformable layer have a thickness of at least 10 µm, particularly 12 µm, preferable 15 µm, more preferably 18 µm, particularly preferably 20 µm.

Likewise, it is preferred according to the invention, if the outer thermoformable layer and/or the inner thermoformable layer have a thickness of at most 40 µm, particularly 35 µm, preferably 30 µm, more preferably 27 µm, particularly preferably 25 µm.

According to a preferred embodiment of the present invention, the outer thermoformable layer and/or the inner thermoformable layer have a thickness in the range of from 10 to 40 µm, particularly 12 to 35 µm, preferably 15 to 30 µm, more preferably 18 to 27 µm, particularly preferably 20 to 25 µm.

According to the present invention it is particularly preferred if both the outer thermoformable layer as well as the inner thermoformable layer have a thickness in the above mentioned ranges. Thus, these relatively thin thermoformable layers are able to provide enhanced flexibility to the COC layer and to enhance the processability of the multilayer plastic sheet of the bottom part used according to the invention.

According to the invention it is preferred if the thickness of the cyclic olefin copolymer layer to the thickness of the outer thermoformable layer and/or the thickness of the inner thermoformable layer is in the range of from 5:1 to 30:1, particularly 7:1 to 25:1, preferably 10:1 to 22:1, more preferably 13:1 to 20:1, particularly preferably 15:1 to 18:1.

With regard to the barrier layer according to the present invention it is preferred, if the barrier layer has a thickness of at least 2 µm, particularly 5 µm, preferably 7 µm.

Moreover, it is likewise preferred if the barrier layer has a thickness of at most 20 µm, particularly 15 µm, preferably 12 µm.

According to the invention it is preferred if the barrier layer has a thickness in the range of from 2 to 20, particularly 5 to 15 µm, preferably 7 to 12 µm.

Thus, relatively thin barrier layers are preferably used according to the present invention.

According to a preferred embodiment of the present invention, the sealing layer has a thickness of at least 10 µm, particularly 15 µm, preferable 17 µm, more preferably 20 µm, particularly preferably 22 µm.

Moreover, the sealing layer usually has a thickness of at most 50 µm, particularly 40 µm, preferably 35 µm, more preferably 30 µm, particularly preferably 27 µm.

Particularly good results are obtained according to the invention if the sealing layer has a thickness of from 10 to 50 µm, particularly 15 to 40 µm, preferably 17 to 35 µm, more preferably 20 to 30 µm, particularly preferably 22 to 27 µm.

According to a preferred embodiment of the present invention, the plastic sheet of the bottom part of the administration packaging comprises an intermediate layer.

If the plastic sheet of the bottom part of the administration packaging comprises an intermediate layer, the intermediate layer is preferably arranged between the inner thermoformable layer and the barrier layer. An intermediate layer between the barrier layer and the inner thermoformable layer enhances compatibility of the barrier layer and the inner thermoformable layer.

If the plastic sheet of the body part comprises an intermediate layer, the intermediate layer usually comprises or consists of, preferably consists of, a polymer selected from the group consisting of polypropylene (PP), copolymers of propylene (CoPP), terpolymers of polypropylene (ter-PP), polyethylene (PE), low-density polyethylene (LDPE), linear low-density polyethylene (LLDPE), metallocene linear low-density Polyethylene (mLLDPE), very low-density polyethylene (VLDPE), ionomers of acid copolymers, ethylene acrylic acid copolymers (EAA), ethylene methacrylic acid copolymers (EMAA), ethyl methylacrylate (EMA), ethylene vinyl alcohol (EVA) or mixtures thereof.

It is particularly preferred according to the invention, if the polymer is selected from the group consisting of polypropylene (PP), copolymers of propylene (CoPP), terpolymers of polypropylene (ter-PP), polyethylene (PE), low-density polyethylene (LDPE), linear low-density polyethylene (LLDPE), metallocene linear low-density polyethylene (mLLDPE), very low-density polyethylene (VLDPE) or mixtures thereof.

More preferably, the polymer selected from the group consisting of particularly polypropylene (PP), polyethylene (PE), low-density polyethylene (LDPE), linear low-density polyethylene (LLDPE), metallocene linear low-density polyethylene (mLLDPE), very low-density polyethylene (VLDPE) or mixtures thereof.

Particularly good results are obtained if the intermediate layer comprises or consists of, particularly consists of, polyethylene (PE).

According to the present invention it is preferred if the intermediate layer of the plastic sheet of the bottom part comprises or consists, preferably consists of, the same polymer as the sealing layer.

With regard to the layer thickness of the intermediate layer it is preferred if the intermediate layer has a thickness of at least 10 μm, particularly 15 μm, preferably 17 μm, more preferably 20 μm, particularly preferably 22 μm.

Likewise it is preferred if the intermediate layer has a thickness of at most 50 μm, particularly 40 μm, preferably 35 μm, more preferably 30 μm, particularly preferably 27 μm.

Particularly good results are obtained according to the invention if the intermediate layer has a thickness of from 10 to 50 μm, particularly 15 to 40 μm, preferably 17 to 35 μm, more preferably 20 to 30 μm, particularly preferably 22 to 27 μm.

According to the invention it is preferred if the intermediate layer has the same layer thickness as the sealing layer.

According to a preferred embodiment of the present invention, the plastic sheet of the bottom part comprises or consists of, preferably consists of, the following layer structure:
(a) an outer thermoformable layer,
(b) a cyclic olefin copolymer (COC) layer,
(c) an inner thermoformable layer,
(d) an intermediate layer,
(e) a barrier layer, preferably an oxygen and/or chemicals barrier layer, and
(f) a sealing layer, preferably a heat-sealing layer.

Particularly preferred, it is envisioned, that the above-mentioned layers are followed directly by another, i. e., according to the above preferred embodiment of the present invention, the above-mentioned layers are formed consecutively or sequentially and/or are not separated from another by any further intermediate layers than the optional intermediate layer (d).

Particularly good results in this regard are obtained, if the outer and the inner thermoformable layer comprise or consist of, particularly consist of, a polyolefin, particularly polypropylene (PP). Moreover, is it preferred if the intermediate layer and the sealing layer comprise or consist of, preferably consist of, a polyolefin, particularly polyethylene (PE). Furthermore it is preferred if the barrier layer comprises or consists of ethylene vinyl alcohol (EVOH).

The single layers might be bonded directly or indirectly to each other. A direct bonding means that the layers are in direct contact with each other, for example by coextrusion, or that a tie layer or an adhesive layer is used to bond the layers directly together. An indirect bonding means that further plastic films or metal foils are arranged between the single layers.

Preferably, the layers are bonded directly to each other, as was stated already.

In regard to this specific embodiment, all advantages, particularities and features, which have been delineated above in connection with other embodiments also apply.

According to a preferred embodiment of the present invention, the plastic sheet of the bottom part comprises or consists of the following layer structure:
(a) an outer thermoformable layer, particularly comprising or consisting of, preferably consisting of, polypropylene,
(b) a cyclic olefin copolymer (COC) layer,
(c) an inner thermoformable layer, particularly comprising or consisting of, preferably consisting of, polypropylene,
(d) an intermediate layer, particularly comprising or consisting of, preferably consisting of, polyethylene (PE),
(e) a barrier layer, particularly comprising or consisting of, preferably consisting of ethylene vinyl alcohol (EVOH), and
(f) a sealing layer, particularly comprising or consisting of, preferably consisting of, polyethylene.

In regard to this embodiment, all advantages, particularities and features, which have been delineated above in connection with other embodiments, also apply.

The plastic sheet of the bottom part of the administration packaging usually has a thickness of at least 230 μm, particularly 300 μm, preferably 400 μm, more preferably 450 μm, particularly preferably 480 μm.

Moreover, it is preferred according to the invention if the plastic sheet of the bottom part has a thickness of at most 750 μm, particularly 650 μm, preferably 600 μm, more preferably 550 μm, particularly preferably 520 μm.

Likewise, it is preferred according to the invention if the plastic sheet of the bottom part has a thickness in the range of from 230 to 750 μm, particularly 300 to 650 μm, preferably 400 to 600 μm, more preferably 450 to 550 μm, particularly preferably 480 to 520 μm.

Plastic sheets of the bottom part with the above-mentioned thickness are able to provide structural integrity to the packaging and have a layer thickness in the range of the Barex® films used in the prior art.

According to a specific and preferred embodiment of the present invention, the plastic sheet of the bottom part further comprises tie layers and/or adhesive layers.

Tie layers and adhesive layers are very thin layers, usually with a layer thickness of 2 to 20 μm, preferably 5 to 15 μm, that are used to bond layers of the multilayer plastic sheet together. If according to the present invention, adhesive layers are used, the adhesive is usually a solvent- or waterborne polyurethane adhesive. Tie layers usually consist of adhesive resins.

According to a preferred embodiment of the present invention, the plastic sheet of the bottom part comprises a tie layer or an adhesive layer between each polymer layer.

As delineated above, the administration packaging according to the invention comprises a cover which consists of a cover sheet. Usually, the cover sheet is a multi-layer film that comprises and consists of the following layers:
a protective layer,
a first barrier layer,
an intermediate layer,
a second barrier layer and
a sealing layer, preferably a heat sealing layer,
wherein the first barrier layer is arranged between the protective layer and the intermediate layer and wherein the second barrier layer is arranged between the intermediate layer and the sealing layer.

The layers of the cover sheet might be in direct or indirect contact with each other. A direct contact means that the layers of the cover sheet are bonded directly to each other, e.g. by coextrusion or by an adhesive layer or a tie layer. An indirect contact means, that further polymer layers or metal foils are arranged between at least two individual layers of the cover sheet.

In this context it is particularly preferred, if the above-mentioned layers are followed directly by another, i. e., according to a preferred embodiment of the present invention, the above-mentioned layers are formed consecutively or sequentially and/or are not separated from another by any further intermediate layers than the intermediate layer mentioned.

The multilayer plastic sheet that forms the bottom part of the inventive administration packaging is a rather thick plastic sheet which provides the form and the structural integrity of the administration packaging, whereas the cover sheet is a rather thin multilayer film.

Usually, the cover sheet has a thickness of at least 50 µm, particularly 70 µm, preferably 80 µm, more preferably 90 µm, particularly preferably 95 µm.

Likewise, the cover sheet has a thickness of at most 200 µm, particularly 180 µm, preferably 150 µm, more preferably 140 µm, particularly preferably 130 µm.

According to the third embodiment of the present invention, the cover sheet has a thickness in the range of from 50 to 200 µm, particularly 70 to 180 µm, preferably 80 to 150 µm, more preferably 90 to 140 µm, particularly preferably 95 to 130 µm.

With regard to the protective layer of the cover sheet, good results are obtained if the protective layer comprises or consists of, preferably consists of, a polymer selected from the group consisting of polyethylene therephthalate (PET), polyamide (PA), polyvinylidene difluoride (PVDF) and mixtures thereof.

The protective layer provides protection of the administration packaging and the liquid pharmaceutic composition or product, respectively, contained in the administration packaging against physical damage. Moreover, the protective layer is preferably also a printing layer that might be printed. Best results are obtained according to the invention, if the protective layer comprises or consists of, preferably consists of, polyethylene therephtalate (PET).

The protective layer usually has a thickness of at least 5 µm, particularly 7 µm, preferably 10 µm. Moreover, the protective layer has a thickness of at most 25 µm, particularly 20 µm, preferably 15 µm.

Good results are obtained, if the protective layer has a thickness in the range of from 5 to 25 µm, particularly 7 to 20 µm, preferably 10 to 14 µm.

As delineated above, the cover sheet comprises a first barrier layer. In this regard, it is preferred if the first barrier layer comprises or consists of, preferably consists of, a metal foil. Particularly good results are obtained if the first barrier layer comprises or consists of an aluminum foil. Preferably, the first barrier layer is an aluminum foil. Metal foils, particularly aluminum foils, provide excellent oxygen and water vapor barrier properties and thus protect the liquid pharmaceutic composition or product, respectively, from deterioration.

The thickness of the first barrier layer can vary in wide ranges. However, good results are obtained, if the first barrier layer has a thickness of at least 5 µm, particularly 7 µm, preferably 10 µm.

Likewise, it is preferred if the first barrier layer has a thickness of at most 25 µm, particularly 20 µm, preferably 15 µm.

According to a preferred embodiment of the present invention the first barrier layer has a thickness in the range of from 5 to 25 µm, particularly 7 to 20 µm, preferably 10 to 14 µm.

The intermediate layer of the cover sheet mainly enhances the compatibility between the first barrier layer and further layers of the cover sheet, particularly the second barrier layer. The material of the intermediate layer might be selected from any suitable material provided that it is compatible to any adjacent layer. However, good results are obtained, if the intermediate layer comprises or consists of, preferably consists of, a polymer selected from the group consisting of polypropylene (PP), copolymers of propylene (CoPP), terpolymers of polypropylene (ter-PP), polyethylene (PE), low-density polyethylene (LDPE), linear low-density polyethylene (LLDPE), metallocene linear low-density polyethylene (mLLDPE), very low-density polyethylene (VLDPE), ionomers of acid copolymers, ethylene acrylic acid copolymers (EAA), ethylene methacrylic acid copolymers (EMAA), ethyl methylacrylate (EMA), ethylene vinyl alcohol (EVA) or mixtures thereof.

In this regard, it is preferred if the polymer is selected from the group consisting of polypropylene (PP), copolymers of propylene (CoPP), terpolymers of polypropylene (ter-PP), polyethylene (PE), low-density polyethylene (LDPE), linear low-density polyethylene (LLDPE), metallocene linear low-density polyethylene (mLLDPE), very low-density polyethylene (VLDPE) or mixtures thereof. It is even more preferred, if the polymer of the intermediate layer selected from the group consisting of polypropylene (PP), polyethylene (PE), low-density polyethylene (LDPE), linear low-density polyethylene (LLDPE), metallocene linear low-density polyethylene (mLLDPE), very low-density polyethylene (VLDPE) or mixtures thereof.

Best results are obtained if the polymer is polyethylene (PE). It is furthermore preferred if the intermediate layer comprises or consists of, preferably consists of, the same polymer as the sealing layer.

Usually, the intermediate layer has a thickness of at least 10 µm, particularly 15 µm, preferably 17 µm, more preferably 20 µm, particularly preferably 22 µm.

Likewise, good results are obtained, if the intermediate layer has a thickness of at most 50 µm, particularly 40 µm, preferably 35 µm, more preferably 30 µm, particularly preferably 27 µm.

Moreover, according to a preferred embodiment of the present invention, the intermediate layer has a thickness in the range of from 10 to 50 µm, particularly 15 to 40 µm, preferably 17 to 35 µm, more preferably 20 to 30 µm, particularly preferably 22 to 27 µm.

With regard to the second barrier layer, the second barrier layer is mainly a barrier layer against chemicals and should prevent any undesired interaction between the liquid pharmaceutical composition or the product, respectively, and the packaging. Therefore, the second barrier layer of the cover sheet usually comprises or consists of, preferably consists of, the same materials or material, respectively, as the barrier layer of the multilayer plastic sheet of the bottom part of the inventive administration packaging.

The second barrier layer usually comprises or consists of, preferably consists of, a polymer selected from the group consisting of ethylene vinyl alcohol (EVOH), ethylene vinyl acetate (EVA), polyvinylidene chloride (PVDC), polychlorotrifluoroethylene (PCTFE), polyethylene therephthalate (PET), amorphous polyethylene therephthalate (APET), polyethylene naphthalate (PEN), ethyl methylacrylate (EMA), ethylene butylacrylate (EBA), ethylene ethylacrylate (EEA), poly(methyl methacrylate) (PMMA), ethylene/methyl methacrylate (EMMA), ethylene acrylic acid copolymers (EAA), ethylene methacrylic acid copolymers (EMAA), polyacrylonitrile (PAN) or mixtures thereof.

Preferably, the second barrier layer comprises or consists of, preferably consists of, a polymer selected from the group consisting of ethylene vinyl alcohol (EVOH), polyvinylidene chloride (PVDC), polychlorotrifluorethylene (PCTFE) and mixtures thereof.

However, best results are obtained if the second barrier layer comprises or consists of, preferably consists of, ethylene vinyl alcohol (EVOH).

With regard to the layer thickness of the second barrier layer the layer thickness is usually comparable to the layer thickness of the barrier layer of the multilayer plastic sheet of the bottom part. In general, the second barrier layer has a thickness of at least 2 µm, particularly 5 µm, preferably 7 µm.

Moreover, the second barrier layer usually has a thickness of at most 20 µm, particularly 15 µm, preferably 12 µm.

According to a preferred embodiment of the present invention, the second barrier layer has a range of from 2 to 20, particularly 5 to 15 µm, preferably 7 to 12 µm.

As delineated above, the cover sheet comprises a sealing layer. It has proven advantageous, if the sealing layer comprises or consists of, preferably consists of, a polymer selected from the group consisting of polypropylene (PP), copolymers of propylene (CoPP), terpolymers of polypropylene (ter-PP), polyethylene (PE), low-density polyethylene (LDPE), linear low-density polyethylene (LLDPE), metallocene linear low-density polyethylene (mLLDPE), very low-density polyethylene (VLDPE), ionomers of acid copolymers, ethylene acrylic acid copolymers (EAA), ethylene methacrylic acid copolymers (EMAA), ethyl methylacrylate (EMA), ethylene vinyl alcohol (EVA) or mixtures thereof.

Preferably, the polymer of the sealing layer is selected from the group consisting of polypropylene (PP), copolymers of propylene (CoPP), terpolymers of polypropylene (ter-PP), polyethylene (PE), low-density polyethylene (LDPE), linear low-density polyethylene (LLDPE), metallocene linear low-density polyethylene (mLLDPE), very low-density polyethylene (VLDPE) or mixtures thereof. Particularly good results are obtained, if the polymer is selected from the group consisting of particularly polypropylene (PP), polyethylene (PE), low-density polyethylene (LDPE), linear low-density polyethylene (LLDPE), metallocene linear low-density polyethylene (mLLDPE), very low-density polyethylene (VLDPE) or mixtures thereof. Most preferably, the sealing layer comprises or consists of, preferably consists of, polyethylene (PE).

According to a preferred embodiment of the present invention, the sealing layer of the multi-layer plastic sheet of the bottom part and the sealing layer of the cover sheet comprise or consist of the same polymers or materials, respectively. The use of the same or highly similar materials results in a good compatibility of the sealing layers and, thus, excellent sealing results.

The thickness of the sealing layer can vary in wide ranges. However, it is proven to be advantageous if the sealing layer has a thickness of at least 10 µm, particularly 15 µm, preferably 17 µm, more preferably 20 µm, particularly preferably 22 µm.

Likewise, it is proven to be advantageous if the sealing layer has a thickness of at most 50 µm, particularly 40 µm, preferably 35 µm, more preferably 30 µm, particularly preferably 27 µm.

Good results are obtained according to the invention if the sealing layer has a thickness in a range of from 10 to 50 µm, particularly 15 to 40 µm, preferably 17 to 35 µm, more preferably 20 to 30 µm, particularly preferably 22 to 27 µm.

According to a preferred embodiment the cover sheet comprises or consists of the following layer structure:
(i) a protective layer, particularly comprising or consisting of, preferably consisting of, PET,
(ii) a first barrier layer, particularly comprising or consisting of, preferably consisting of, aluminum foil,
(iii) an intermediate layer, particularly comprising or consisting of, preferably consisting of, polyethylene (PE),
(iv) a second barrier layer, particularly comprising or consisting of, preferably consisting of, EVOH, and
(v) a sealing layer, particularly comprising or consisting of, preferably consisting of, polyethylene (PE).

In regard to this specific embodiment, all features, advantages and particularities delineated above in connection with other embodiments also apply.

Moreover, it is possible that the cover sheet further comprises tie layers and/or adhesive layers. As delineated in connection with the multilayer plastic sheet of the bottom part, tie layers and/or adhesive layers are used to bond the aforementioned layers of the cover sheet together and to enhance the compatibility of the layers. Adhesives are usually solvent- or water-borne polyurethane adhesives.

According to a preferred embodiment of the present invention the cover sheet comprises a tie layer or an adhesive layer between each polymer layer or between polymer layers and metal foils.

Usually, the cover and the bottom part are at least partially joined by the sealing layers of the plastic sheet of the bottom part and the cover sheet of the cover. Preferably, the cover and the bottom part are joined over the whole surface of the rim. The cover and the bottom part, particularly the sealing layers of the plastic sheet of the bottom part and the cover sheet of the cover are preferably joined by heat sealing.

According to a preferred embodiment of the present invention, the administration packaging comprises a bottom part and a cover, wherein the plastic sheet of the bottom part comprises or consists of at least 5 layers:
an outer thermoformable layer,
a cyclic olefin copolymer layer,
an inner thermoformable layer,
a barrier layer,
a sealing layer,
wherein the cyclic olefin copolymer layer is arranged between the outer thermoformable layer and the inner thermoformable layer, and wherein the barrier layer is arranged between the sealable layer and the inner thermoformable layer,
and wherein the cover sheet comprises or consists of the following layers:
a protective layer,
a first barrier layer,
an intermediate layer,
a second barrier layer and
a sealing layer, preferably a heat-sealing layer,
wherein the first barrier layer is arranged between the protective layer and the intermediate layer and wherein the second barrier layer is arranged between the intermediate layer and the sealing layer.

The inventive combination of films has excellent machinability, particularly in regard to shaping, sealing, cutting and stabilizing of the films and to opening of the manufactured packaging.

In regard to this specific embodiment, all particularities, features and advantages which have been mentioned in connection with other embodiments also apply.

According to a particular preferred embodiment of the present invention, the plastic sheet of the bottom part comprises or consists of the following layer structure:
(a) an outer thermoformable layer, preferably comprising or consisting of, particularly consisting of, polypropylene,
(b) a cyclic olefin copolymer layer (COC),
(c) an inner thermoformable layer, preferably comprising or consisting of, preferably consisting of polypropylene (PP),
(d) an intermediate layer, preferably comprising or consisting of, preferably consisting of, polyethylene (PE), (e) a barrier layer, preferably comprising or consisting of, particularly consisting of, ethylene vinyl alcohol (EVOH), and (f) a sealing layer, preferably comprising or consisting of, particularly consisting of, polyethylene (PE), and wherein the cover sheet comprises or consists of the following layer structure:

(i) a protective layer, preferably comprising or consisting of, particularly consisting of, polyethylene terephthalate (PET), (ii) a first barrier layer, preferably comprising or consisting of, particularly consisting of, an aluminum foil, (iii) an intermediate layer, comprising or consisting of, preferably consisting of, polyethylene (PE), (iv) a second barrier layer, preferably comprising or consisting of, particularly consisting of, ethylene vinyl alcohol (EVOH), and (v) a sealing layer, preferably comprising or consisting of, particularly consisting of, polyethylene (PE).

In regard to this, this specific embodiment of the present invention all advantages, features and particularities discussed in connection with the other embodiments also apply.

With regard to the predetermined breaking zone, the predetermined breaking zone of the administration packaging is preferably generated by thermoforming. This reduces the number of steps required in producing the administration packaging and, thus, makes the production quicker and/or more efficient. In particular, fewer tools are needed for the production of the administration packaging.

The cavity preferably comprises a chamber and an administration channel that is in fluid communication with the chamber and/or opens into the chamber. The administration channel is preferably elongated and/or straight and/or has a smaller diameter and/or volume than the chamber. Hereby, the administration packaging may be used as and/or transformed into a pipette, so that the pharmaceutic product may be directly applied to a patient from the packaging.

The predetermined breaking zone is preferably configured to enable an opening of the administration packaging by breaking the packaging along the breaking zone. For example, the administration packaging may be folded or bent along the predetermined breaking zone, so that the packaging material is severed and, as a result, the packaging is opened.

The predetermined breaking zone is preferably formed as or comprises a groove on an outer surface of the administration packaging. This is simple to produce and enables a simple and reliable opening of the administration packaging and/or breaking of the predetermined breaking zone.

The predetermined breaking zone is preferably a region which is thinner than a region of the bottom part surrounding the breaking zone. However, it is also possible that the predetermined breaking zone is a region that has the same thickness as a region of the bottom part surrounding the breaking zone.

A predetermined breaking zone is preferably only formed in the region of the cavity, in particular in the region of an administration channel of the cavity. In other words, the predetermined breaking zone preferably does not extend over and/or is not formed in the region of the rim.

Further subject-matter of the invention—according to a second aspect of the present invention—is a method for producing and filling an administration packaging for a preferably liquid pharmaceutic product. The method is preferably a thermoforming method. The method described herein is preferably performed with an apparatus described herein and the administration packaging described herein before is produced with the method described herein.

According to the method, a plastic sheet, which is multi-layered, is at least partially heated to a thermoforming temperature. The thermoforming temperature is in particular a temperature at which the plastic sheet or the heated regions thereof are plasticized and/or forming the plastic sheet or the heated regions thereof to a desired shape with a molding tool is made possible.

Then, the plastic sheet is stretched onto and/or into a molding tool so that a bottom part of the administration packaging is formed. In particular, a bottom part having a cavity for receiving the pharmaceutic product and a rim surrounding the cavity is formed. The rim is preferably at least essentially flat.

In a next step, the cavity is filled with the pharmaceutic product and afterwards, the cavity is covered with a cover and the cover is fixed to the rim so that the cavity is completely closed. The cavity is preferably closed by sealing, particularly heat-sealing, the sealing layer of the plastic sheet of the bottom part and the sealing layer of the cover sheet of the cover. Preferably the cover and the bottom part are sealed over the whole surface of the rim.

According to the invention, a predetermined breaking zone is generated in the bottom part with the molding tool and/or during the step of forming the bottom part. This has the advantage that no extra step for forming the predetermined breaking zone is needed, the breaking zone can be formed to have any desired shape and the breaking zone may be specifically tailored or adapted to different materials of the plastic.

It is preferred that the molding tool has a positive mold and a negative mold and/or that a positive and a negative mold are used for forming the bottom part. This allows a very precise control of the shape of the bottom part and/or leads to small manufacturing tolerances.

A predetermined breaking zone is preferably only formed in the region of the cavity, in particular in the region of an administration channel of the cavity. In other words, the predetermined breaking zone does preferably not extend over and/or is not formed in the region of the rim.

Preferably, different administration packagings having predetermined breaking zones with different shapes are formed, wherein a forming device for forming the predetermined breaking zone is exchanged and/or adjusted for forming the different administration packagings. This allows to produce different administration packagings in a very efficient manner.

With regard to further details of the inventive method, reference is made to the above explanations as to the inventive administration packaging which also apply to the inventive method.

The inventive administration packaging for a preferably liquid pharmaceutic product is preferably produced with a specific apparatus. The apparatus is preferably configured for performing the method described herein and/or for producing the administration packaging described herein.

The apparatus has a heating device for at least partially heating a preferably multi-layered plastic sheet to a thermoforming temperature and a molding tool for forming a bottom part of the administration packaging by stretching the plastic sheet onto and/or into the molding tool.

The molding tool preferably has a forming device for forming a predetermined breaking zone in the bottom part. The forming device preferably forms an elevation and/or an indentation on a surface of a mold of the molding tool. By this, the predetermined breaking zone may be formed as a groove and/or a bend/kink. A predetermined breaking zone having at least essentially the same or a lower thickness than the material surrounding the predetermined breaking zone may be realized.

The forming device is preferably an adjustable and/or exchangeable component of the molding tool. By this, the desired shape of the predetermined breaking zone may be easily controlled and/or adapted. This allows to easily and/or efficiently produce different administration packagings, in particular administration packagings with different predetermined breaking zones.

The molding tool preferably has a positive mold and a negative mold. This allows a precise control of the shape of the formed bottom part and/or leads to very small manufacturing tolerances.

Preferably, the negative mold and the positive mold have complementary or correspondingly shaped surfaces, preferably at least in the region where the predetermined breaking zone shall be formed. In this way, preferably, a bend/kink can be generated in the wall of the bottom part as predetermined breaking zone, in particular with the wall having at least essentially the same thickness in the predetermined breaking zone as outside of it.

Particularly preferably, the negative mold has an elevation and the positive mold has a complementary/corresponding indentation for forming the predetermined breaking zone, or vice versa.

Alternatively, the positive mold and the negative mold may have differently or non-correspondingly shaped surfaces, in particular so that the apparatus is configured to generate a predetermined breaking zone which is thinner than the regions surrounding the predetermined breaking zone. For example, the negative mold may comprise an elevation with the positive mold being flat in the corresponding region, or vice versa.

Further subject-matter of the invention—according to a third aspect of the present invention—is a use of a plastic sheet for producing an administration packaging for a preferably liquid pharmaceutic product.

The used plastic sheet comprises at least 5 layers:
an outer thermoformable layer,
a cyclic olefin copolymer (COC) layer,
an inner thermoformable layer,
a barrier layer, preferably barrier layer against oxygen and/or chemicals,
a sealing layer, preferably a heat-sealing layer,
wherein the cyclic olefin copolymer layer is arranged between the outer thermoformable layer and the inner thermoformable layer and wherein the barrier layer is arranged between the sealing layer and the inner thermoformable layer.

The plastic sheet is preferably used in a method and/or in an apparatus as described herein.

The plastic sheet is preferably used to produce an administration packaging as described herein. With regard to further details of the inventive use, reference is made to the above explanations as to the inventive administration packaging, in particular the explanations with regard to the plastic sheet from which the administration packaging is produced, which preferably also apply to the inventive use. In particular, the plastic sheet of the inventive use may have any of the features described herein in connection with the inventive administration packaging and its production.

Several of the aforementioned and subsequent aspects and features of the present invention can be combined with each other in various combinations but can also be implemented independently of each other.

Further aspects, features, advantages and characteristics of the present invention are apparent from the claims and the following description of preferred embodiments with reference to the accompanying drawings.

DETAILED DESCRIPTION OF THE INVENTION

In the figures, the same reference signs are used for the same components and parts, even if a repeated description is omitted.

Figure 1:
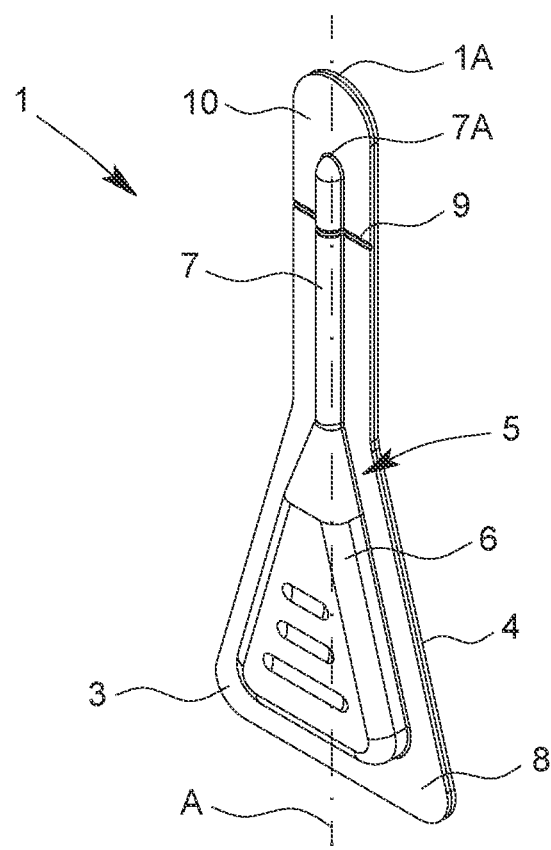
FIG. 1 is a schematic perspective view of an administration packaging according to the invention.
Figure 2:
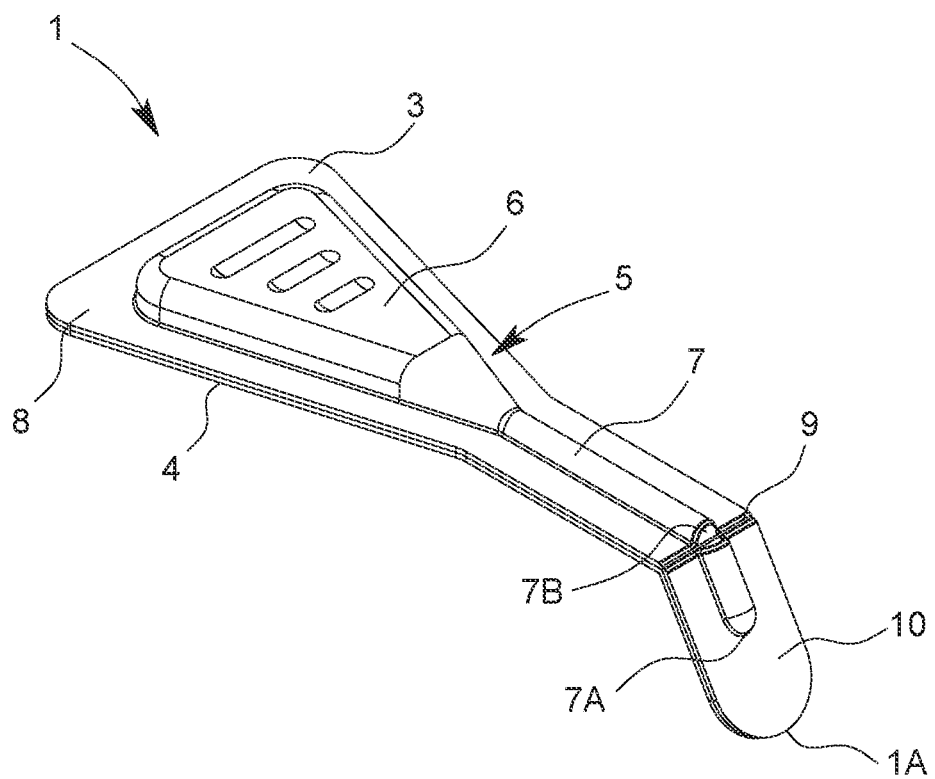
FIG. 2 is an opened administration packaging according to the invention in a schematic perspective view.
Figure 3:
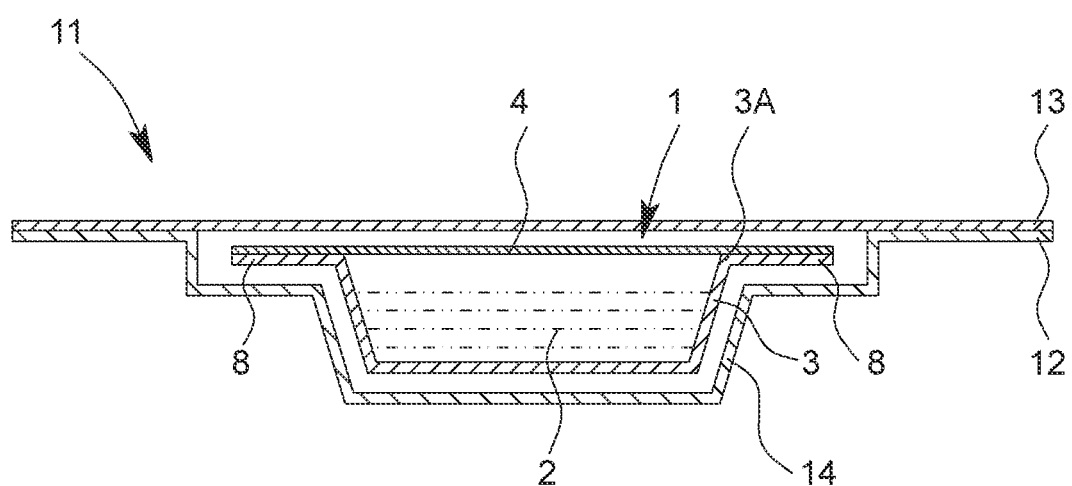
FIG. 3 is a schematic section through an administration packaging packaged in a secondary packaging.

FIGS. 1 to 3 show an administration packaging 1 according to the invention. FIG. 1 is a schematic perspective view of the closed administration packaging 1 or in its delivery state. FIG. 2 shows in a schematic perspective view the administration packaging 1 in the opened state and/or when transformed into a pipette. FIG. 3 is a schematic section through the administration packaging 1, also showing a secondary packaging 11 in which the administration packaging 1 is preferably or optionally delivered/sold.

The administration packaging 1 is preferably configured for receiving a pharmaceutic product 2 and/or contains or comprises the pharmaceutic product 2, as shown in FIG. 3.

The pharmaceutic product 2 is preferably liquid. The pharmaceutic product 2 is preferably a product for the treatment and/or prevention of fleas, ticks, and/or chewing lice, in particular in dogs and/or cats. Preferably, the pharmaceutic product 2 aids in the control of sarcoptic mange, particularly in dogs.

The administration packaging 1 comprises or consists of a bottom part 3 and a cover 4.

The bottom part 3 comprises a cavity 5 for receiving the pharmaceutic product 2. The cavity 5 preferably comprises different sections, in particular a chamber 6 and an administration channel 7.

The bottom part 3 has a rim 8 surrounding, in particular completely surrounding, the cavity 5. The rim 8 is preferably at least essentially flat.

The cover 4 covers, closes and/or seals the bottom part 3 or cavity 5, in particular the chamber 6 and the administration channel 7, preferably in a fluid-tight, in particular liquid-tight and/or air-tight, manner. Preferably, the administration packaging 1, bottom part 3 or cavity 5 is closed by means of the cover 4 in such a way that it is storage-stable and/or such that no product 2 can escape from the closed administration packaging 1, bottom part 3 or cavity 5.

The cover 4 is preferably fixed or bonded, in particular (heat) sealed, to the bottom part 3, in particular the rim 8 or a part of the rim 8.

Preferably, the cover 4 is fixed or bonded to the bottom part 3 or rim 8 by heat sealing and/or by means of a (thermal) ring sealing, which in particular extends along the entire circumference of the rim 8 and/or of the edge 3A between the cavity 5 and the rim 8.

Thus, preferably, the cover 4 is bonded or sealed to the bottom part 3 at least in the region of the edge 3A between the cavity 5 and the rim 8 in order to close/seal the cavity 5.

Particularly preferably, the cover 4 is fixed, bonded or sealed to the entire rim 8. However, the bonding between the bottom part 3 and the cover 4 may be less strong outside of the region of the edge 3A and/or may decrease from said edge 3A towards the outer side of the rim 8.

The bottom part 3, in particular the cavity 5 and the rim 8, is/are preferably produced by thermoforming or deep-drawing a plastic sheet. In particular, the cavity 5 results from deep-drawing or thermoforming a respective region of the plastic sheet into and/or onto a molding tool, while the region, that after the thermoforming/deep-drawing results in the rim 8, is not deformed during the thermoforming/deep-drawing step. This is explained in more detail later.

The chamber 6 and the administration channel 7 are preferably in fluid communication with each other. In particular, the administration channel 7 opens into the chamber 6.

As shown in FIG. 1, the chamber 6 preferably has an essentially triangular shape. However, this is not mandatory and the chamber 6 may have any desired shape.

The administration channel 7 is preferably elongated and/or straight. Preferably, the administration channel 7 has a smaller diameter and/or volume than the chamber 6. Preferably, the administration channel 7 extends along a longitudinal axis A of the administration packaging 1. The axis A is preferably a symmetry axis of the administration packaging 1.

The length of the administration channel 7 is preferably more than 2 cm or 3 cm and/or less than 5 cm or 4 cm.

The length or longitudinal extension of the administration packaging 1 or bottom part 3, in particular along the axis A, is preferably more than 6 cm and/or less than 10 cm, particularly preferably about 8.5 cm.

The width of the rim 8, in particular perpendicular to the administration channel 7 or axis A and/or adjacent or on one side of the administration channel 7 is preferably more than 2 cm and/or less than 6 cm, particularly preferably about 4 cm.

The administration packaging 1 may be opened so that the pharmaceutic product 2 contained in the administration packaging 1 or cavity 5 may be withdrawn from or pushed out of the administration packaging 1 and/or administered to a patient (not shown). The patient is preferably a human or animal, in particular a domestic animal such as a cat or dog. Preferably, the administration packaging 1 is configured for administering the pharmaceutic product 2 directly to a skin and/or fur of the patient.

The administration packaging 1 is in particular transformable to a pipette as shown in FIG. 2. In particular, the administration packaging 1 is transformed into a pipette by opening the administration packaging 1.

The administration packaging 1, in particular the bottom part 3, comprises a predetermined breaking zone 9. The administration packaging 1 is preferably openable at the predetermined breaking zone 9 and/or by breaking the administration packaging 1, in particular the bottom part 3, along the predetermined breaking zone 9.

In particular, the administration packaging 1 is openable by folding and/or bending along the predetermined breaking zone 9.

The predetermined breaking zone 9 is preferably produced by thermoforming or deep-drawing, in particular at the same time or in the same step of thermoforming or deep-drawing the bottom part 3 and/or with the same molding tool. This will be explained in more detail later with regard to FIGS. 4 and 19 to 22.

The predetermined breaking zone 9 preferably crosses the cavity 5, in particular the administration channel 7, and/or is arranged in the region of the cavity 5, in particular the administration channel 7.

The breaking zone 9 may be provided only in the region of the cavity 5 or administration channel 7. In other words, the rim 8 may be at least essentially free of the breaking zone 9. This will be explained in more detail later with reference to FIGS. 9 to 11. Alternatively, the breaking zone 9 may run along at least essentially the entire (width of the) administration packaging 1 and/or may be provided in the region of the cavity 5, in particular administration channel 7, and the rim 8, as for example shown in FIGS. 1 and 13 and also explained in more detail later.

The predetermined breaking zone 9 preferably runs transversely, in particular perpendicular to the axis A and/or administration channel 7.

The predetermined breaking zone 9 is preferably arranged close to an axial end of the channel 7 and/or the administration packaging 1. Preferably, the distance of the predetermined breaking zone 9 to the axial end 7A of the administration channel 7 is at most 15 mm or less, preferably at most 10 mm or less. The distance between the predetermined breaking zone 9 and an axial end 1A of the administration packaging 1 is preferably at most 25 mm or less, in particular at most 20 mm or less.

Preferably, the distance between the predetermined breaking zone 9 and the axial end 7A of the administration channel 7 is more than 15% or 20% and/or less than 40% or 30%, particularly preferably about 25%, of the total length of the administration channel 7.

Preferably, the distance between the predetermined breaking zone 9 and the axial end 1A of the administration packaging 1 is more than 10% or 15% and/or less than 40% or 30%, particularly preferably about 20%, of the total length or longitudinal extension of the administration packaging 1 along the axis A.

The predetermined breaking zone 9 preferably defines a tip 10 of the administration packaging 1 and/or bottom part 3. The tip 10 is in particular a part or section of the administration packaging 1 or the bottom part 3 that is opposite the chamber 6 with respect to the predetermined breaking zone 9.

The tip 10 can preferably be folded away or bent, in particular by folding or bending the administration packaging 1 along the predetermined breaking zone 9. Particularly, this breaks the administration packaging 1 or at least the bottom part 3, so that the administration packaging 1 is opened and/or the pharmaceutical product 2 may be withdrawn, dispensed or pushed out through the administration channel 7. This is in particular shown in FIG. 2.

Preferably, by breaking the administration packaging 1, in particular along the predetermined breaking zone 9 and/or by bending/folding the tip 10, an open end 7B of the cavity 5, in particular the administration channel 7, is created, as shown in FIG. 2.

By opening the administration packaging 1 as described, the administration packaging 1 is preferably transformed into a pipette and/or can preferably be used to administer the pharmaceutic product 2 to a patient. In particular, the pharmaceutic product 2 can be administered by or from the administration packaging 1 by pressing on the chamber 6, so that the pharmaceutic product 2 is forced through the administration channel 7 and leaves/exits the administration channel 7 at its opened end 7B at the predetermined breaking zone 9.

Preferably, it is necessary to press/push on the chamber 6 to withdraw the pharmaceutical product 2. In other words, the administration channel 7 and/or the open end 7B are preferably configured or dimensioned in such a way that no product 2 can escape due to (only) gravitational forces and/or such that no product 2 flows out when holding the administration packaging 1 with the open end 7B pointing downwards without applying further forces, in particular without pushing on the chamber 6. In this way, accidental withdrawal of pharmaceutical product 2 is prevented.

Particularly preferably, the flow cross-section of the cavity 5, in particular the administration channel 7, is narrowed or reduced at the opened end 7B and/or in the region of the predetermined breaking zone 9. Thus, preferably, a narrowing flow channel or cross-section reduction or nozzle is formed at the open end 7B and/or in the region of the predetermined breaking zone 9. This will be explained in more detail later with reference to FIGS. 9 to 11.

In the example shown in FIG. 2, the cover 4 preferably remains intact or is not broken. In particular, the tip 10 is still connected to the administration packaging 1, preferably via the cover 4, after folding or bending it or opening the administration packaging 1. However, other solutions are also possible here in which the cover 4 breaks as well—completely or at least partially—and/or in which the tip 10 is completely removed from the administration packaging 1.

The administration packaging 1 is preferably packaged in a secondary packaging 11, in particular after production of the administration packaging 1, for delivery and/or storage and/or before usage of the administration packaging 1 for applying the contained pharmaceutic product 2 to a patient. The secondary packaging 11 is shown in FIG. 3.

The secondary packaging 11 is preferably a blister packaging.

The secondary packaging 11 preferably comprises a base portion 12 and a cover or lid 13. The base portion 12 preferably has or forms a cavity or receptacle 14 for receiving the administration packaging 1. The lid 13 preferably closes, in particular completely closes, the receptacle 14. The lid 13 is preferably fixed, in particular glued, to the base portion 12. Preferably, the lid 13 may be peeled away from the base portion 12 in order to remove the administration packaging 1 from the secondary packaging 11 or receptacle 14.

Figure 4:
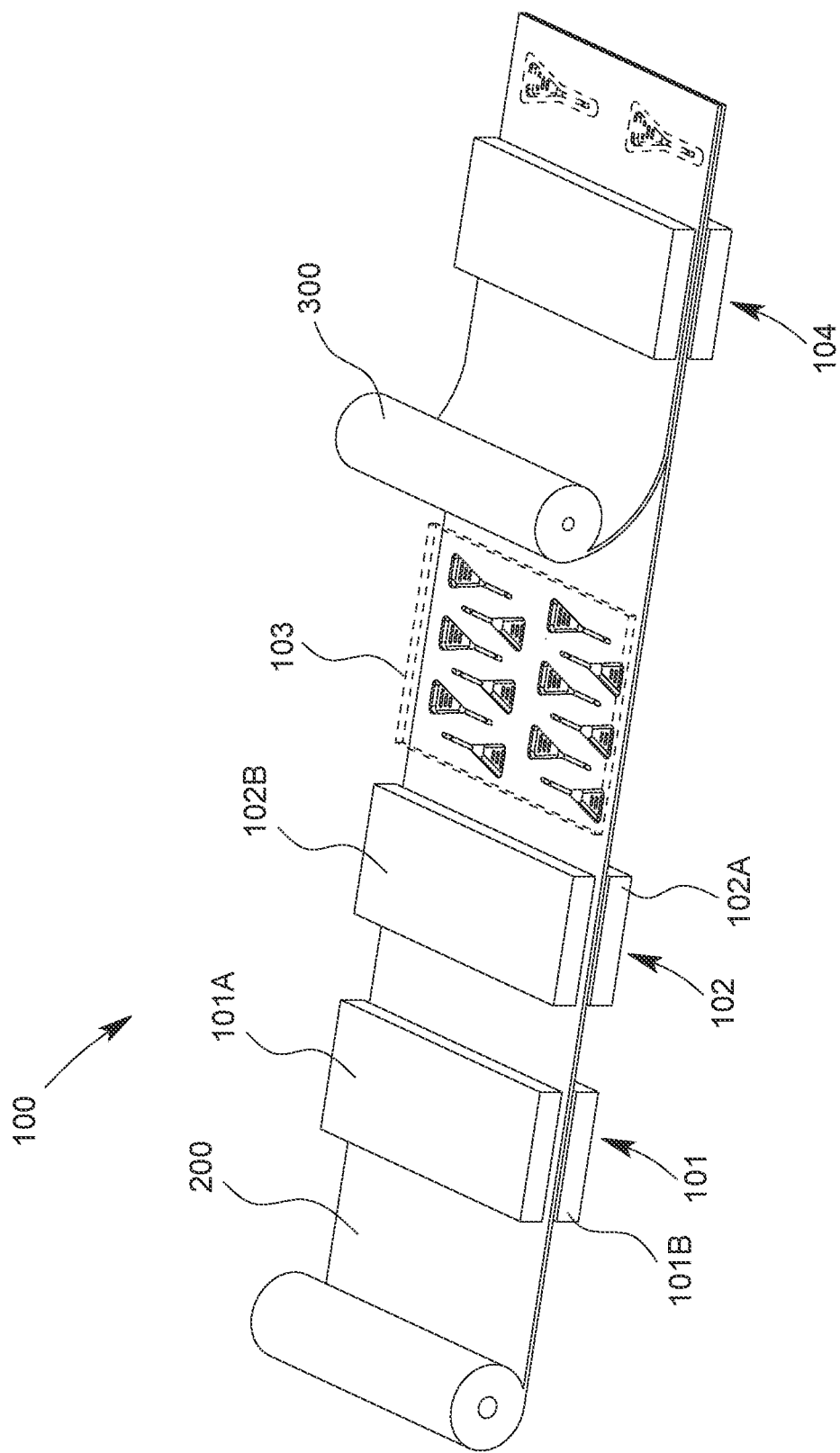
FIG. 4 is a schematic view of an apparatus for producing an administration packaging according to the invention.

FIG. 4 shows in a very schematic illustration an apparatus 100 for producing the administration packaging 1. In the following, the apparatus 100 and a method for producing the administration packaging 1 are described with reference to FIG. 4.

The method as described herein is preferably performed with the apparatus 100. In turn, the apparatus 100 is preferably configured for performing the method described herein.

The apparatus 100 preferably comprises a heating device 101 and a molding tool 102.

For producing the administration packaging 1, a plastic sheet 200 is preferably guided through the apparatus 100 and the administration packaging 1 is formed from the plastic sheet 200 by thermoforming, in particular deep drawing. The thermoforming is in particular performed in the heating device 101 and/or the molding tool 102.

Preferably, the plastic sheet 200 is provided rolled up and/or is on or forms a roll, as schematically indicated in FIG. 4. Preferably, in particular in an unrolling or feeding step, the plastic sheet 200 is unwound/unrolled and guided into the apparatus 100 and/or the heating device 101. However, the plastic sheet 200 may be fed to the apparatus 100 and/or heating device 101 also in any other desired form or manner.

The plastic sheet 200 may be guided through the apparatus 100 continuously or stepwise, as required.

After unrolling/feeding the plastic sheet 200 and/or in a heating step, the plastic sheet 200 is preferably at least partially heated by means of the heating device 101.

The heating device 101 is preferably configured for heating the plastic sheet 200, at least partially. In particular, the heating device 101 is configured for heating sub-regions of the plastic sheet 200, from which are then preferably formed bottom parts 3 of the administration packaging 1, in particular in the molding tool 102.

The heating device 101 is preferably configured for heating the plastic sheet 200 from both sides. Preferably, the heating device 101 comprises at least one heating plate 101A, 101B, in particular two heating plates 101A, 101B, which are hereinafter referred to as an upper heating plate 101A and a lower heating plate 101B. The upper and lower heating plate 101A, 101B are configured for heating different sides of the plastic sheet 200.

Preferably, the heating device 101, in particular the heating plate(s) 101A, 101B, heats the plastic sheet 200 to a plasticizing temperature or thermoforming temperature.

The plasticizing or thermoforming temperature is preferably the temperature at which the plastic sheet 200 plasticizes and/or can be thermoformed, in particular the temperature at which the plastic sheet 200 softens and/or becomes plastically deformable. A plastic material, here the plastic sheet 200, can preferably be deformed when it has reached the plasticizing or thermoforming temperature and keeps the new form after cooling or falling below the plasticizing or thermoforming temperature.

Preferably, the heating device 101 heats the plastic sheet 200 to a temperature of 180° C. and/or the plasticizing or thermoforming temperature is at least 150° C. and/or at most 200° C.

The two heating plates 101A, 101B may be operated at the same temperature or at different temperatures. Preferably, if the plastic sheet 200 is multi-layered, in particular with layers of different material and/or with different plasticizing/thermoforming temperature, the two heating plates 101A, 101B are operated at different temperatures, in particular corresponding to the respective plasticizing/thermoforming temperatures of the layers of the plastic sheet 200 facing the respective heating plate 101A, 101B.

After heating and/or in a (thermo)forming step, the (heated) plastic sheet 200 is preferably formed, in particular thermoformed, by means of the molding tool 102.

The molding tool 102 is preferably configured for forming the shape of the bottom part 3 from the plastic sheet 200. In particular, the molding tool 102 is configured for stretching the plastic sheet 200 or the heated sub-regions of the plastic sheet 200, respectively. In particular, the heated regions of the plastic sheet 200 are stretched in or into the molding tool 102.

The molding tool 102 comprises at least one mold 102A, 102B. Preferably, the molding tool 102 comprises two molds 102A, 102B, which are hereinafter referred to as a negative mold 102A and a positive mold 102B.

Preferably, the plastic sheet 200 is stretched into the negative mold 102A and/or onto the positive mold 102B.

The forming or stretching is preferably performed by the plastic sheet 200 being forced against the molding tool 102 or mold 102A and/or 102B, preferably by creating an overpressure or blowing a gas, in particular air, against the plastic sheet 200 and/or by creating a negative pressure in the molding tool 102 or mold 102A and/or 102B. Additionally or alternatively, the plastic sheet 200 can be forced against the molding tool 102 or mold 102A and/or 102B by means of a stamp. Particularly preferably, if two molds 102A, 102B are provided, one of the molds 102A, 102B acts as a stamp. It is also possible that a stamp is only provided in sub-regions, in particular in addition to a gas, for example in regions which require a more precise forming like the administration channel 7.

The predetermined breaking zone 9 is preferably generated in the molding tool 102 and/or during the forming step, and/or the apparatus 100, in particular the molding tool 102, is configured for this purpose. This will be explained in more detail later.

Preferably, the predetermined breaking zone 9 is exclusively generated/produced in the (thermo)forming step and/or by means of the molding tool 102. In particular, the proposed method does not comprise a step in which the plastic sheet 200 is (partially) cut in order to generate a predetermined breaking zone 9 and/or the proposed apparatus 100 does not have or need a cutting tool for this purpose.

However, it is also possible that the predetermined breaking zone 9 is only essentially or mainly generated/produced in the (thermo)forming step and/or by means of the molding tool 102. This is preferably to be understood that the main or essential step for generating/forming the predetermined breaking zone 9 is performed during (thermo)forming and/or with the molding tool 102.

In contrast, in the prior art, a predetermined breaking zone is either generated only after the (thermo)forming step, e.g., by perforating the otherwise finished packaging along a certain line, or by cutting a plastic sheet before the (thermo)forming step.

In the prior art, in particular in EP 2 998 098 A1 and EP 2 998 099 A1, the cutting of the plastic sheet is the main or essential or generating step which takes place before the thermoforming step. The cut of the plastic sheet may be further deformed when it is deep drawn, however, such deformation does not generate a predetermined breaking zone since the generating happens previously by cutting the sheet. Furthermore, such deformation is certainly not the essential or main step of generating the predetermined breaking zone. This is already evident by the fact that without the cut, no predetermined breaking zone would be formed at all in the prior art.

Thus, the predetermined breaking zone 9 of the present invention is preferably generated cut-free and/or without a cutting step prior to or after the step of forming the bottom part and/or without using a cutting tool.

In the sense of the present invention, also a perforation, scoring or similar operations are preferably to be understood as "cut" or "cuts". Thus, the term "cut-free" preferably also comprises or may be replaced or complemented with expressions such as "perforation-free" or the like. Similarly, a cutting step/tool may also be a perforation step/tool, etc.

The molding tool 102 is preferably configured to form a plurality of bottom parts 3 simultaneously or at the same time or in one step, in the illustrated example shown in FIG. 4 twelve bottom parts 3 at the same time. However, other solutions, e.g., where only one bottom part 3 is formed in one forming step, are possible as well.

Preferably, it is possible to exchange the molding tool 102 and/or the mold(s) 102A, 102B in order to produce differently shaped administration packagings 1, in particular bottom parts 3, for example to adapt to different volumes of the chamber 6 or pharmaceutical product 2.

After forming and/or in a filling step, the bottom part(s) 3, in particular the cavity/cavities 5, formed in the plastic sheet 200 is/are filled with the pharmaceutical product 2, in particular by means of a filling device 103, which is schematically indicated by dashed lines in FIG. 4.

The filling is preferably performed after the plastic sheet 200 or its heated/thermoformed region has hardened and/or cooled down or fallen below the plasticizing/thermoforming temperature.

After filling and/or in a covering/closing step, a cover sheet 300 is applied, in particular fixed or bonded, to the plastic sheet 200. The closing/covering is preferably performed in a covering device 104, in particular a sealing device.

Preferably, the bottom part(s) 3 or cavity/cavities 5 formed in the plastic sheet 200 is/are covered or closed by means of the cover sheet 300, thereby forming the respective cover(s) 4.

Preferably, the cover sheet 300 is provided rolled up and/or is on or forms a roll, as schematically indicated in FIG. 4. Preferably, the cover sheet 300 is unwound/unrolled and guided into the apparatus 100 and/or the covering device 104, in particular together with the plastic sheet 200. However, it is also possible that the (rolled) cover sheet 300 is entirely located within the covering device 104.

The covering device 104 is preferably configured to bond or seal, in particular to heat-seal, the cover sheet 300 to the plastic sheet 200 or the bottom part(s) 3, in particular in a fluid-tight, in particular liquid-tight and/or air-tight, manner.

Preferably, the cover sheet 300 of the cover 3 is bonded or sealed to the plastic sheet 200 of the bottom part(s) 3 by sealing, preferably heat-sealing, sealing layers 205 and 305 of the cover sheet 300 and the plastic sheet 200. The sealing layers 205 and 305 are explained in detail below in connection with the explanations as to FIGS. 5 to 8.

For fixing the cover sheet 300 to the plastic sheet 200, the covering device 104 is preferably brought in contact with the cover sheet 300 such that the cover sheet 300 is pressed against the plastic sheet 200, at least in the region of the bottom part(s) 3 or its/their edge(s) 3A. The covering device 104 is preferably heated, at least in the contact region, such that the cover sheet 300 is heat-sealed to the plastic sheet 300, at least in said region.

The bonding/sealing is preferably performed at least in the region of the edge(s) 3A of the bottom part(s) 3 or the covering device 104 is configured therefor. For this purpose, the covering device 104 preferably comprises (for each bottom part 3) a ring-like sealing tool (not shown) which has at least essentially the form of the edge 3A and/or which can be heated.

Particularly preferably, the bonding/sealing is performed in addition to the region of the edge(s) 3A also in the region surrounding the edge(s) 3A and/or the region where later the rim(s) 8 is/are formed.

In principle, when heat sealing the cover sheet 300 to the plastic sheet 200, it is possible to not contact this additional region by the covering device 104, but only to use its radiation heat. This will result in a reduced bonding strength compared to the region where the covering device 102 contacts the cover sheet 300. However, solutions are also possible where a contact in this region is established as well and/or with constant bonding strength.

After covering/closing and/or in a separating step, the administration packaging(s) 1 formed by the plastic sheet 200 and cover sheet 300 is/are separated from the sheets and/or from each other.

For this purpose, the apparatus 100 may comprise a separating device (not shown), preferably downstream of the covering device 104. However, it is also possible that a separating device is integrated into the covering device 104 and/or that the covering device 104 is configured for separating the administration packaging(s) 1.

Preferably, the administration packaging(s) 1 is/are trimmed, punched out or cut out.

The separation, in particular punching/cutting out, is preferably carried out along a line with a (constant) distance to the edge(s) 3A and/or such that the rim(s) 8 are formed. The line along which the administration packaging 1 is separated, in particular cut out or punched out, is schematically indicated by dashed lines in FIG. 4.

The administration packaging 1 preferably consist of a bottom part 3 and a cover 4 which comprise specific functional layers, particularly specific layer structures. Preferred embodiments of the plastic sheet 200 of the bottom part 3 and the cover sheet 300 of the cover 4, or of the plastic sheet 200 and cover sheet 300 used for producing the bottom part 3 and cover 4, are displayed in FIGS. 5 to 8.

As delineated above, the plastic sheet 200 of the bottom part 3 is a multi-layer film. The plastic sheet 200 of the bottom part 3 comprises at least five layers:
an outer thermoformable layer 201,
a cyclic olefin copolymer (COC) layer 202,
an inner thermoformable layer 203,
a barrier layer 204 and
a sealing layer 205.

The cyclic olefin copolymer layer 202 is arranged between the outer thermoformable layer 201 and the inner thermoformable layer 203 and the barrier layer 204 is arranged between the sealing layer 205 and the inner thermoformable layer 203.

Preferably, the plastic sheet 200 comprises the aforementioned at least five layers in the layer sequence as stated before, i. e., the plastic sheet 200 of the bottom part 3 comprises at least five layers in the following layer sequence:
the outer thermoformable layer 201, followed by
the cyclic olefin copolymer (COC) layer 202, followed by
the inner thermoformable layer 203, followed by
the barrier layer 204, followed by
the sealing layer 205.

Particularly preferred, it is envisioned, that the abovementioned layers are followed directly by another, i. e., according to the above preferred embodiment of the present invention, the above-mentioned layers are formed consecutively or sequentially and/or are not separated from another by intermediate layers.

The outer thermoformable layer 201 usually forms an outer surface of the inventive administration packaging 1.

Figure 5:
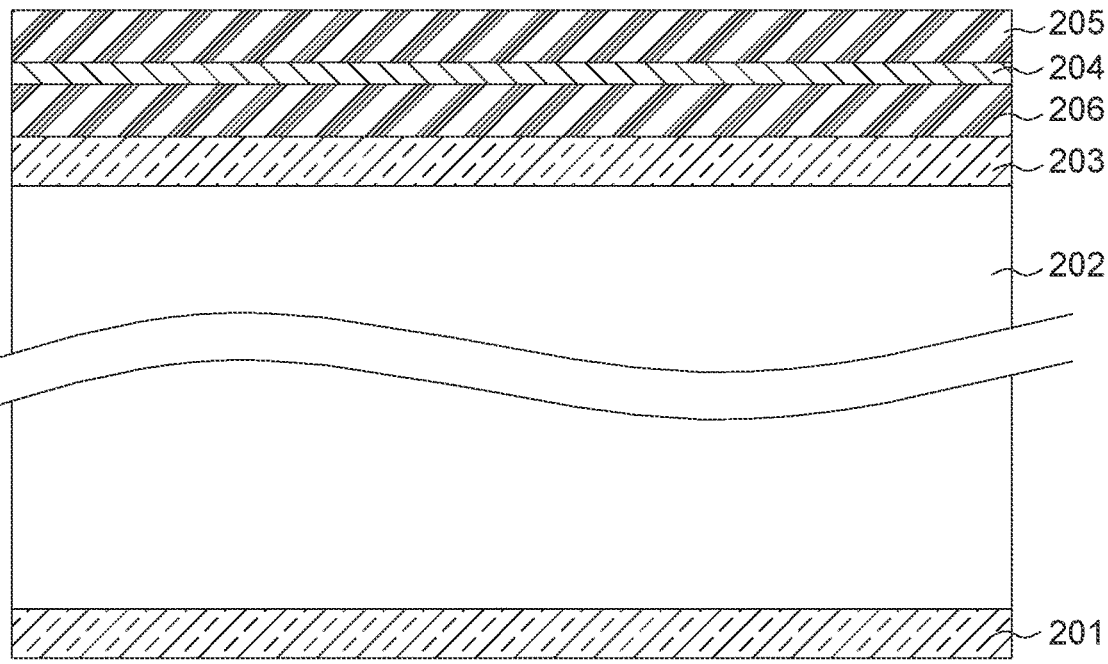
FIG. 5 is a schematic section through the material of a bottom part of the administration packaging.

Preferably, the plastic sheet 200 of the bottom part 3 further comprises an intermediate layer 206 as displayed in FIG. 5. The intermediate layer 206 can be omitted in the plastic sheet 200, but further enhances the compatibility of the plastic sheet 200, particularly of the inner thermoformable layer 203 and the barrier layer 204. The intermediate layer 206 is usually arranged between the inner thermoformable layer 203 and the barrier layer 204. The intermediate layer 206 usually comprises or consists of the same materials as the sealing layer 205 and usually also has the same thickness. The sealing layer 205 is preferably a heat-sealing layer for bonding/sealing the bottom part 3 and the cover 4.

A preferred plastic sheet 200 of the bottom part 3 comprises or consists of the following layer structure:
(a) an outer thermoformable layer 201,
(b) a cyclic olefin copolymer layer 202,
(c) an inner thermoformable layer 203,
(d) an intermediate layer 206,
(e) a barrier layer 204, and
(f) a sealing layer 205.

The plastic sheet 200 of the bottom part 3 usually has a thickness in the range of from 230 to 750 μm, particularly 300 to 650 μm, preferably 400 to 600 μm, more preferably 450 to 500 μm, particularly preferably 480 to 520 μm and determines the form of the administration packaging 1 after deep-drawing.

The cyclic olefin copolymer layer 202 is the main layer of the plastic sheet 200. It comprises or consists of, preferably consists of, cyclic olefin copolymers (COC).

The cyclic olefin copolymer layer 202 usually provides stiffness and structural integrity to the bottom part 3 of the administration packaging 1, especially after deep drawing. Moreover, the cyclic olefin copolymer layer 202 is brittle and breaks under increased pressure which makes it suited for the fabrication of single use administration packaging with a breaking zone 9 for opening the administration packaging 1. The cyclic olefin copolymer layer 202 preferably has a thickness in the range of from 200 to 600 µm, particularly 250 to 500 µm, preferably 300 to 450 µm, more preferably 350 to 400 µm, particularly preferably 360 to 390 µm.

The inner thermoformable layer 203 and the outer thermoformable layer 201 enhance the thermoformable properties of the plastic sheet 200 and provide more flexibility to the plastic sheet 200, thus enhancing the machinability of the plastic film 200 and providing protection of the brittle COC layer 202.

The outer thermoformable layer 201 and the inner thermoformable layer 203 preferably have a thickness in the range of from 10 to 40 µm, particularly 12 to 35 µm, preferably 15 to 30 µm, more preferably 18 to 27 µm, particularly preferably 20 to 25 µm.

Best results are obtained, if the thickness of the cyclic olefin copolymer layer 202 to the thickness of the outer thermoformable layer 201 and/or the thickness of the inner thermoformable layer 203 is in the range of from 5:1 to 30:1, particularly 7:1 to 25:1, preferably 10:1 to 22:1, more preferably 13:1 to 20:1, particularly preferably 15:1 to 18:1.

Moreover, the outer thermoformable layer 201 and the inner thermoformable layer 203 comprise or consist of the same polymer, particularly consist of, the same polymer. The polymer of the outer thermoformable layer 201 and/or the inner thermoformable layer 203 is usually selected from the group consisting of polystyrene (PS), polyvinyl chloride (PVC), amorphous polyethylene therephthalate (APET), ethylene butylacrylate (EBA), ethylene vinyl acetate (EVA), polypropylene (PP), polyethylene (PE), low-density polyethylene (LDPE), linear low-density polyethylene (LLDPE) and mixtures thereof.

According to the invention it is preferred if the polymer of the outer thermoformable layer 201 and/or the inner thermoformable layer 203 is selected from the group consisting of polypropylene (PP), polyethylene (PE), low-density polyethylene (LDPE), linear low-density polyethylene (LLDPE) or mixtures thereof. It is particularly preferred according to the invention if the polymer of the outer thermoformable layer 201 and/or the inner thermoformable layer 203 is polypropylene (PP).

The barrier layer 204 preferably comprises or consists of, preferably consists of, a polymer selected from the group consisting of ethylene vinyl alcohol (EVOH), ethylene vinyl alcohol (EVA), polyvinylidene chloride (PVDC), polychlorotrifluoroethylene (PCTFE), polyethylene therephthalate (PET), amorphous polyethylene therephthalate (APET), polyethylene naphthalate (PEN), ethyl methylacrylate (EMA), ethylene butylacrylate (EBA), ethylene ethylacrylate (EEA), poly(methyl methacrylate) (PMMA), ethylene/methyl methacrylate (EMMA), ethylene acrylic acid copolymers (EAA), ethylene methacrylic acid copolymers (EMAA), polyacrylonitrile (PAN) or mixtures thereof.

It is preferred according to the invention if the polymer of the barrier layer 204 is selected from the group consisting of ethylene vinyl alcohol (EVOH), polyvinylidene chloride (PVDC), polychlorotrifluorethylene (PCTFE) and mixtures thereof. Best results are obtained if the polymer of the barrier layer 204 is ethylene vinyl alcohol (EVOH). The barrier layer 204 prevents substances from the environment from penetrating the packaging 1 and deteriorating the pharmaceutic product 2, on the one hand, and prevents any undesired interaction between the pharmaceutic product 2 and the packaging 1, on the other hand. Barrier layers, especially comprising or consisting of EVOH show excellent barrier properties against chemicals and oxygen.

The barrier layer 204 has a thickness in the range of from 2 to 20 µm, particularly 5 to 15 µm, preferably 7 to 12 µm.

The sealing layer 205 and/or the intermediate layer 206 preferably comprises or consists of, preferably consists of, a polymer selected from the group consisting of polypropylene (PP), copolymers of propylene (CoPP), terpolymers of polypropylene (ter-PP), polyethylene (PE), low-density polyethylene (LDPE), linear low-density polyethylene (LLDPE), metallocene linear low-density polyethylene (mLLDPE), very low-density polyethylene (VLDPE), ionomers of acid copolymers, ethylene acrylic acid copolymers (EAA), ethylene methacrylic acid copolymers (EMAA), ethyl methylacrylate (EMA), ethylene vinyl alcohol (EVA) or mixtures thereof.

According to a preferred embodiment of the present invention, the polymer of the sealing layer 205 and/or the intermediate layer 206 is selected from the group consisting of polypropylene (PP), copolymers of propylene (CoPP), terpolymers of polypropylene (ter-PP), polyethylene (PE), low-density polyethylene (LDPE), linear low-density polyethylene (LLDPE), metallocene linear low-density polyethylene (mLLDPE), very low-density polyethylene (VLDPE) or mixtures thereof.

It is preferred if the polymer of the sealing layer 205 and/or the intermediate layer 206 is selected from the group consisting of polypropylene (PP), polyethylene (PE), low-density polyethylene (LDPE), linear low-density polyethylene (LLDPE), metallocene linear low-density polyethylene (mLLDPE), very low-density polyethylene (VLDPE) or mixtures thereof. Best results are obtained if the polymer of the sealing layer 205 and/or the intermediate layer 206 is polyethylene (PE).

The sealing layer 205 and/or the intermediate layer 206 has a thickness in the range of from 10 to 50 µm, particularly 15 to 40 µm, preferably 17 to 35 µm, more preferably 20 to 30 µm, particularly preferably 22 to 27 µm. As delineated above, preferably the sealing layer 205 and the intermediate layer 206 comprise or consist of the same polymer and have the same thickness.

A very preferred plastic sheet 200 according to the invention therefore comprises or consists of the following layer structure with the following layer sequence:
- (a) an outer thermoformable layer 201 comprising or consisting of PP, followed by
- (b) a cyclic olefin copolymer layer 202 comprising or consisting of COC, followed by
- (c) an inner thermoformable layer 203 comprising or consisting of PP, followed by
- (d) optionally, the intermediate layer 206 comprising or consisting of PE, followed by
- (e) a barrier layer 204 comprising or consisting of EVOH, followed by
- (f) a sealing layer 205 comprising or consisting of PE.

Particularly preferred, it is envisioned, that the above-mentioned layers are followed directly by another, i. e., according to the above preferred embodiment of the present invention, the above-mentioned layers are formed consecutively or sequentially and/or are not separated from another by any further intermediate layers than the optional intermediate layer 206.

The layers of the plastic sheet 200 of the bottom part 3 might be adhered directly or indirectly to each other. A direct adhesion means that the layers are bonded directly to each other, for example by coextrusion or by a tie layer or an adhesive layer. An indirect adhesion means that further layers, particularly plastic sheets or metal foils, are arranged between the respective layers.

Figure 6:
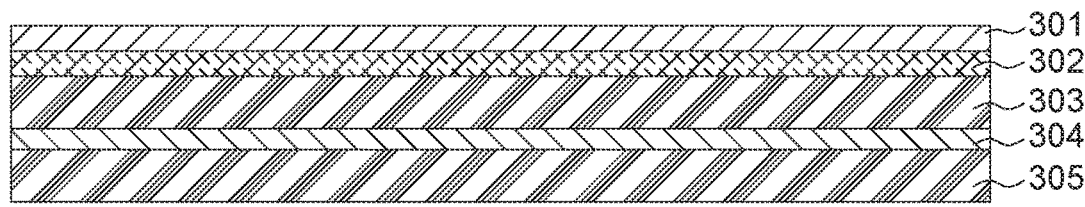
FIG. 6 is a schematic section through the material of a cover of the administration packaging.

As displayed in FIG. 6, the cover sheet 300 of the cover 4 comprises or consists of the following layers:
a protective layer 301,
a first barrier layer 302,
an intermediate layer 303,
a second barrier layer 304 and
a sealing layer 305,
wherein the first barrier layer 302 is arranged between the protective layer 301 and the intermediate layer 303 and wherein the second barrier layer 304 is arranged between the intermediate layer 303 and the sealing layer 305.

The cover sheet 300 usually has a thickness in the range of from 50 to 200 µm, particularly 70 to 180 µm, preferably 80 to 150 µm, more preferably 90 to 140 µm, particularly preferably 95 to 130 µm.

The protective layer 301 preferably comprises or consists of, preferably consists of, a polymer selected from the group of polyethylene therephthalate (PET), polyamide (PA), polyvinylidene difluoride (PVDF) and mixtures thereof. Preferably the polymer of the protective layer 301 is polyethylene therephthalate (PET). The protective layer does not only provide protection against mechanical damage, but also allows printing on the protective layer 301, particularly if the protective layer comprises or consists of PET.

The protective layer preferably has a thickness in the range of from 5 to 25 µm, particularly 7 to 20 µm, preferably 10 to 14 µm.

The first barrier layer 302 is usually a metal foil, particularly an aluminum foil. Metal foils, particularly aluminum foils, provide excellent oxygen barrier properties. The first barrier layer usually has a thickness in the range of from 5 to 25 µm, particularly 7 to 20 µm, preferably 10 to 40 µm.

The intermediate layer 303 and the sealing layer 305 preferably comprise or consist of the same polymers. Usually, the intermediate layer 303 and/or the sealing layer 305 comprise or consist of, preferably consist of, a polymer selected from the group consisting of polypropylene (PP), copolymers of propylene (CoPP), terpolymers of polypropylene (ter-PP), polyethylene (PE), low-density polyethylene (LDPE), linear low-density polyethylene (LLDPE), metallocene linear low-density polyethylene (mLLDPE), very low-density polyethylene (VLDPE), ionomers of acid copolymers, ethylene acrylic acid copolymers (EAA), ethylene methacrylic acid copolymers (EMAA), ethyl methylacrylate (EMA), ethylene vinyl alcohol (EVA) or mixtures thereof.

In this regard it is preferred if the polymer of the intermediate layer 303 and/or the sealing layer 305 is selected from the group consisting of polypropylene (PP), copolymers of propylene (CoPP), terpolymers of polypropylene (ter-PP), polyethylene (PE), low-density polyethylene (LDPE), linear low-density polyethylene (LLDPE), metallocene linear low-density polyethylene (mLLDPE), very low-density polyethylene (VLDPE) or mixtures thereof.

It is particularly preferred according to the invention if the polymer of the intermediate layer 303 and/or the sealing layer 305 is selected from the group consisting of polypropylene (PP), polyethylene (PE), low-density polyethylene (LDPE), linear low-density polyethylene (LLDPE), metallocene linear low-density polyethylene (mLLDPE), very low-density polyethylene (VLDPE) or mixtures thereof. It is particularly preferred if the polymer of the intermediate layer 303 and/or the sealing layer 305 is polyethylene (PE).

Moreover, it is preferred according to the invention if the intermediate layer 303 and the sealing layer 305 have the same layer thickness. Usually, the layer thickness of intermediate layer 303 and/or the sealing layer 305 has a thickness in the range of from 10 to 50 µm, particularly 15 to 40 µm, preferably 17 to 35 µm, more preferably 20 to 30 µm, particularly preferably 22 to 27 µm.

The second barrier layer 304 preferably comprises or consists of, preferably consists of, a polymer selected from the group consisting of ethylene vinyl alcohol (EVOH), ethylene vinyl alcohol (EVA), polyvinylidene chloride (PVDC), polychlorotrifluoroethylene (PCTFE), polyethylene therephthalate (PET), amorphous polyethylene therephthalate (APET), polyethylene naphthalate (PEN), ethyl methylacrylate (EMA), ethylene butylacrylate (EBA), ethylene ethylacrylate (EEA), poly(methyl methacrylate) (PMMA), ethylene/methyl methacrylate (EMMA), ethylene acrylic acid copolymers (EAA), ethylene methacrylic acid copolymers (EMAA), polyacrylonitrile (PAN) or mixtures thereof. It is particularly preferred if the polymer of the second barrier layer 304 is selected from the group consisting of ethylene vinyl alcohol (EVOH), polyvinylidene chloride (PVDC), polychlorotrifuorethylene (PCTFE) and mixtures thereof. According to a preferred embodiment of the present invention, the polymer of the second barrier layer 304 is ethylene vinyl alcohol (EVOH).

Good results are obtained, if the second barrier layer 304 has a thickness in the range of from 2 to 20 µm, particularly 5 to 15 µm, preferably 7 to 12 µm.

According to a preferred embodiment, the cover sheet 300 has the following layer structure:
a protective layer 301,
a first barrier layer 302,
an intermediate layer 303,
a second barrier layer 304, and
a sealing layer 305.

Specifically, it may be envisaged, that the cover sheet 300 comprises or consists of the following layer structure with the following layer sequence:
(i) the protective layer 301, followed by
(ii) the first barrier layer 302, followed by
(iii) the intermediate layer 303, followed by
(iv) the second barrier layer 304, followed by
(v) a sealing layer 305.

Particularly preferred, it is envisioned, that the above-mentioned layers are followed directly by another, i.e., according to the above preferred embodiment of the present invention, the above-mentioned layers are formed consecutively or sequentially and/or are not separated from another.

The layers of the cover sheet 300 might be adhered to each other directly or indirectly. A direct adhesion means that the layers are bonded to each other directly, for example by coextrusion or by an adhesive layer or a tie layer. An indirect adhesion means that there are further layers, particularly plastic sheets or metal foils, arranged between the respective layers.

A very preferred embodiment of the present invention includes that the plastic sheet 200 of the bottom part 3 comprises or consists of the following layer structure with the following layer sequence:

(a) an outer thermoformable layer 201, in particular comprising or consisting of PP, followed by
(b) a cyclic olefin copolymer layer 202, in particular comprising or consisting of COC, followed by
(c) an inner thermoformable layer 203, in particular comprising or consisting of PP, followed by
(d) optionally, the intermediate layer 206, in particular comprising or consisting of PE, followed by
(e) a barrier layer 204, in particular comprising or consisting of EVOH, followed by
(f) a sealing layer 205, in particular comprising or consisting of PE, and the cover sheet 300 comprises or consists of the following layer structure:
(i) the protective layer 301, followed by
(ii) the first barrier layer 302, followed by
(iii) the intermediate layer 303, followed by
(iv) the second barrier layer 304, followed by
(v) a sealing layer 305.

Particularly preferred, it is envisioned, that the above-mentioned layers are followed directly by another, i. e., according to the above preferred embodiment of the present invention, the above-mentioned layers are formed consecutively or sequentially and/or are not separated from another by any further intermediate layers than the optional intermediate layer 206. According to the invention it is preferred if between each layer of the cover sheet 300 a tie layer or adhesive layer is arranged. The adhesives of the adhesive layers are preferably polyurethane based adhesives, particularly water- or solvent-borne polyurethane adhesives. The tie layers generally consist of adhesive resins.

Moreover, it is preferred, if both the plastic 200 and the cover sheet 300 comprise tie layers and adhesive layers between each functional layer.

Figure 7:
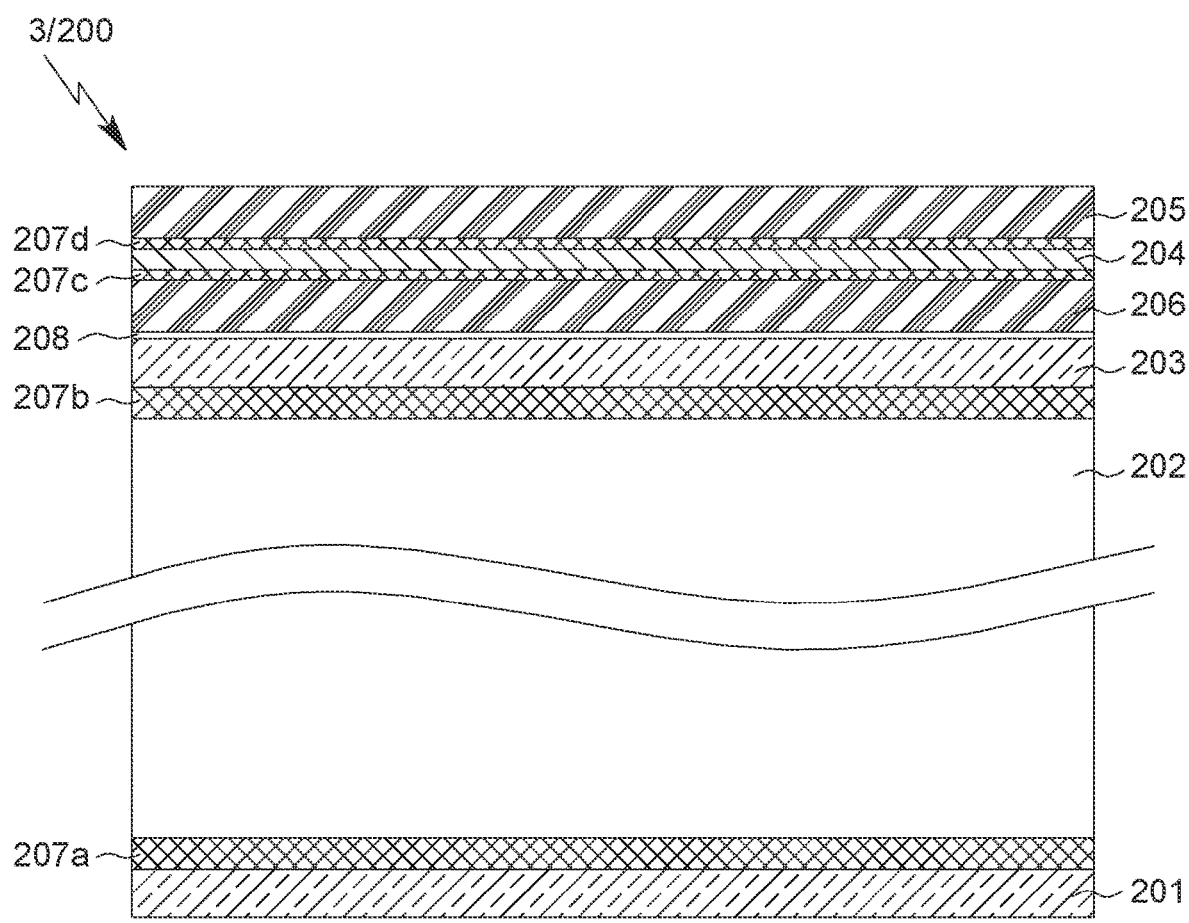
FIG. 7 is a schematic section through a preferred material of a bottom part of the administration packaging.

According to preferred embodiment of the invention, which is displayed in FIG. 7, the plastic sheet 200 comprises or consists of the following layer structure:
(a) an outer thermoformable layer 201, preferably comprising or consisting of, particularly consisting of, PP
(b) a tie layer 207a,
(c) a cyclic olefin copolymer layer 202, comprising or consisting of, particularly consisting of, COC,
(d) a tie layer 207b,
(e) an inner thermoformable layer 203, preferably comprising or consisting of, particularly consisting of, PP,
(f) an adhesive layer 208,
(g) an intermediate layer 206, preferably comprising or consisting of, particularly consisting of, PE,
(h) a tie layer 207c,
(i) a barrier layer 204, preferably comprising or consisting of, particularly consisting of, EVOH,
(j) a tie layer 207d, and
(k) a sealing layer 205, preferably comprising or consisting of, particularly consisting of, PE.

Figure 8:
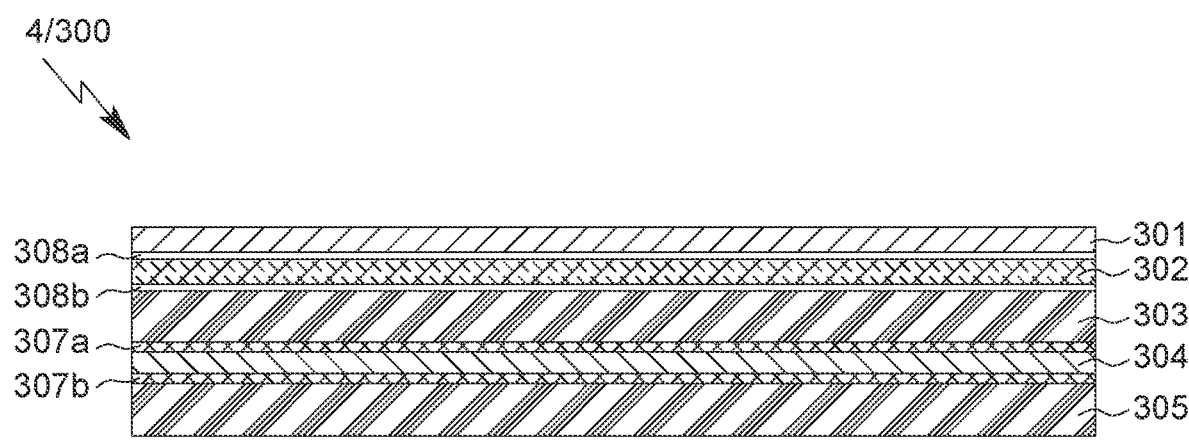
FIG. 8 is a schematic section through a preferred material of a cover of the administration packaging.

FIG. 8 displays a preferred layer structure of the cover sheet 300:
(i) protective layer 301, preferably comprising or consisting of PET,
(ii) adhesive layer 308a,
(iii) first barrier layer 302, preferably comprising or consisting of, particularly consisting of, an aluminum foil,
(iv) adhesive layer 308b,
(v) intermediate layer 303, preferably comprising or consisting of, particularly consisting of, PE,
(vi) tie layer 307a,
(vii) second barrier layer 304, preferably comprising or consisting of, particularly consisting of, EVOH,
(viii) tie layer 307b,
(ix) sealing layer 305, preferably comprising or consisting of, particularly consisting of, PE.

According to the invention, the cover sheet 300 is bonded or sealed to the plastic sheet 200 by sealing layers 205 and 305. Preferably the cover sheet 300 and the plastic sheet are bonded or sealed by heat-sealing.

In the following, different embodiments of the administration packaging 1 according to the invention are described in more detail. The different embodiments preferably differ (only) by the design of the predetermined breaking zone 9. In other words, apart from the predetermined breaking zone 9, the different embodiments of the administration packaging 1 are preferably identical.

Preferably, aspects, features and explanations described for one embodiment also apply to the other embodiments even if not repeated, unless explicitly stated otherwise.

Furthermore, the previously described aspects, features and explanations with regard to the administration packaging 1, in particular with reference to FIGS. 1 to 3, the method and apparatus 100 of producing it, in particular with reference to FIG. 4, and the preferred multilayer structure, in particular with reference to FIGS. 5 to 8, apply preferably additionally or correspondingly to the embodiments described in the following, even without repetition.

The embodiments of the administration packaging 1 described in the following preferably have the aspects and features of the administration packaging 1 generally described with reference to FIGS. 1 to 3.

The embodiments of the administration packaging 1 described in the following are preferably produced or producible by a method and/or apparatus 100 as described with reference to FIG. 4.

The embodiments of the administration packaging 1 described in the following are produced from a plastic sheet 200 and/or cover sheet 300 as described with reference to FIGS. 5 to 8, and/or their bottom parts 3 and/or covers 4 have a multilayer structure as described with reference to FIGS. 5 to 8.

Figure 9:
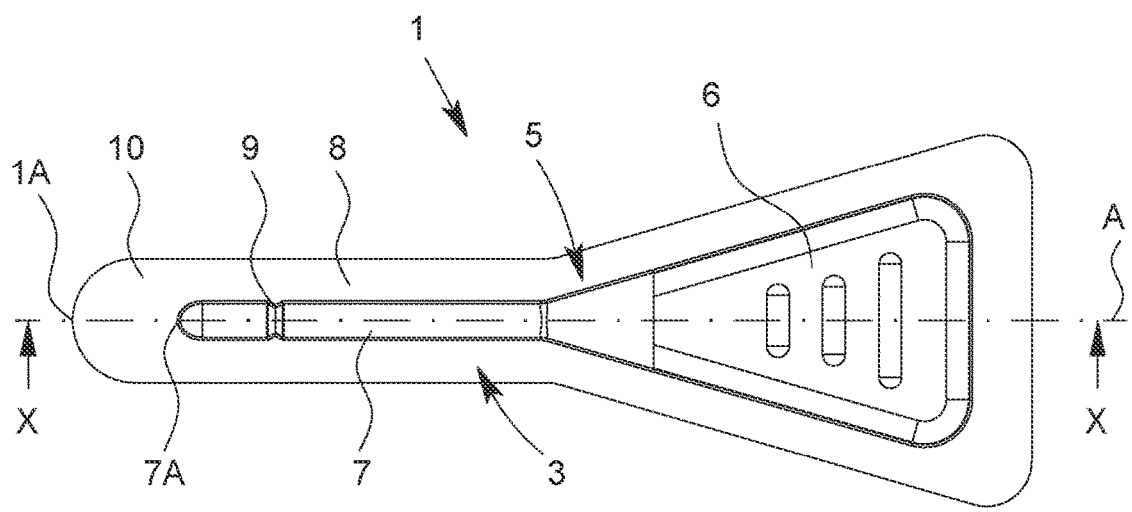
FIG. 9 is a schematic plan view of an administration packaging according to a first embodiment.
Figure 10:
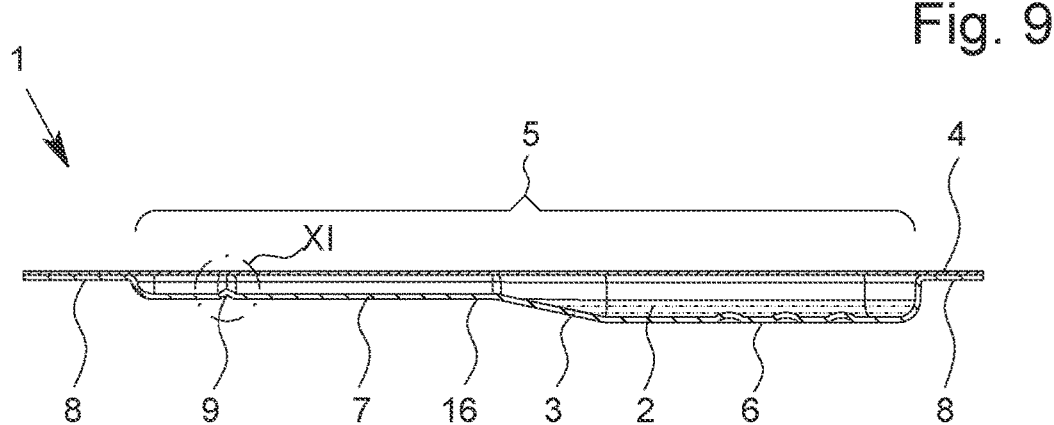
FIG. 10 is a schematic section of the administration packaging along the line X-X of FIG. 9.
Figure 11:
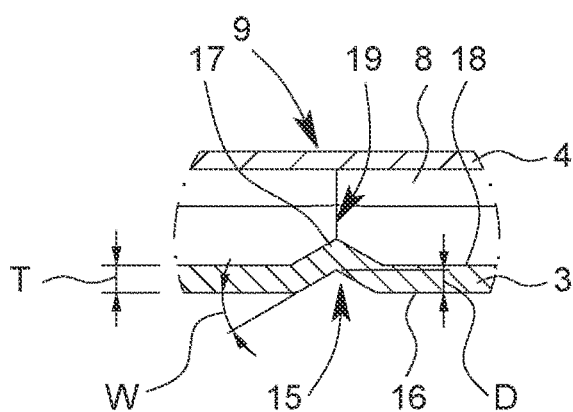
FIG. 11 is an enlarged detail of the predetermined breaking zone according to the first embodiment.

A first embodiment of the administration packaging 1 is shown in FIGS. 9 to 11.

FIG. 9 shows a schematic plan view from the bottom side of the administration packaging 1, i. e., facing the bottom part 3. The cover 4 is not visible in this view since it is behind the bottom part 3.

FIG. 10 shows a schematic section of the administration packaging 1 along the line X-X in FIG. 9. FIG. 11 shows an enlarged detail of FIG. 10 in the region of the breaking zone 9, the detail being indicated with label XI in FIG. 10.

As indicated by the hatching, the rim 8 shown in FIG. 11 lies behind the section plane. The cover 4 preferably extends along the upper surface of the rim 8 and over the cavity 5 or administration channel 7, thereby closing the cavity 5 or administration 7 from above (in the orientation shown in the figures).

In the first embodiment, the predetermined breaking zone 9 extends only over the cavity 5, in particular the administration channel 7 of the cavity 5, as in particular shown in FIG. 9. Preferably, in the first embodiment, the predetermined breaking zone 9 is not provided at the rim 8 and/or the rim 8 does not comprise the predetermined breaking zone 9. This preferably enhances the stability of the administration packaging 1 and/or reduces the risk of an accidental opening of the administration packaging 1.

In this sense, the term "predetermined breaking zone" preferably means a region of the administration packaging 1, in particular the bottom part 3, which is specifically prepared or manufactured to ensure the breaking/opening of the administration packaging 1. Thus, in particular, the predetermined breaking zone 9 is preferably a material weakening, and the term "predetermined breaking zone" may be replaced by "material weakening" throughout this application.

Preferably, also when the predetermined breaking zone 9 is only provided in the region of the cavity 5 or administration channel 7, the rim 8 breaks nevertheless as well when the administration packaging 1 is opened, in particular when the tip 10 is bend/folded along the predetermined breaking zone 9, preferably in a defined manner. In other words, when bending/folding the tip 10, the material preferably breaks at the predetermined breaking zone 9 and the break propagates into the rim 8, in particular in a defined manner, causing a breaking of the entire tip 10 of the bottom part 3.

In particular, the predetermined breaking zone 9 is only provided on the bottom part 3 and/or the cover 4 does not comprise the predetermined breaking zone 9.

The predetermined breaking zone 9 is or has preferably a dent or notch or groove 15, as in particular shown in FIG. 11. Preferably, the predetermined breaking zone 9 is or has a groove 15 on an outer surface 16 of the administration packaging 1, in particular the bottom part 3.

The outer surface 16 of the administration packaging 1 or bottom part 3 is in particular the surface of the bottom part 3 that is opposite the cavity 5 or hollow space configured for receiving the pharmaceutic product 2. Particularly preferably, the outer surface 16 is formed by the outer thermoformable layer 201.

Preferably, the groove 15 has in a cross-section an at least essentially triangular shape and/or is at least essentially wedge-shaped. However, other shapes are possible as well.

The groove 15 preferably has and/or is defined by an angle W and a depth D.

The angle W is preferably the smaller angle between the main plane of extension of the outer surface 16 and the main plane of extension of the beveled or inclined surface of the groove 15, in particular at the edge of the predetermined breaking zone 9 or groove 15, i. e., the edge where the outer surface 16 bends inwards and/or starts to get grooved/indented.

If the groove 15 or its cross-section is at least essentially triangular or wedge-shaped, the angle W is preferably the angle between one of the legs and the base of the (isosceles) triangular cross-section.

However, the groove 15 may also be characterized by any other suitable angle which can preferably be determined from the angle W, for example, the angle by which the outer surface 16 actually bends inwards or towards the cavity 5 or administration channel 7 (which can be computed as 180° minus W) or, in particular in the case of a triangular or wedge shape, by the opening angle of the groove 15 (i.e., the angle included between the two inclined surfaces of the groove 15) which can be computed as 180° minus 2 times W.

The depth D is preferably the distance from the main plane of extension of the outer surface 16 and the lowest region of the groove 15, in particular measured perpendicular to said main plane.

If the groove 15 or its cross-section is at least essentially triangular or wedge-shaped, the depth D is preferably the height or altitude (with respect to the base) of the (isosceles) triangular cross-section.

The angle W is preferably at least 20 degrees or at least 25 degrees, in particular at least 30° degrees and/or at most 60 degrees or at most 55 degrees, in particular at most 50 degrees. Particularly preferred values of the angle W are 30 degrees, 40 degrees or 50 degrees.

The opening angle or groove angle is preferably at least 60 degrees or at least 70 degrees, in particular at least 75 degrees or at least 80 degrees and/or at most 140 degrees or at most 130 degrees, in particular at most 125 degrees or at most 120 degrees. Particularly preferred values are 80 degrees, 100 degrees or 120 degrees.

The depth D is preferably at least 0.05 mm, in particular at least 0.1 mm and/or at most 0.5 mm, in particular at most 0.4 mm. Particularly preferred values of the depth D are 0.1 mm, 0.2 mm, 0.3 mm or 0.4 mm.

The depth D is preferably at least 5% or 10%, in particular at least 15% or 20%, and/or at most 70% or 60%, in particular at most 50% or 40%, of the thickness T of (the wall of) the bottom part 3.

Preferably, the groove 15 has a (very) small radius of curvature at its lowest region or valley, preferably less than 15% or 10%, in particular less than 5% or 2%, of the depth D. Preferably, the radius of curvature is less than 50 μm or 20 μm, in particular less than 10 μm or 5 μm.

Preferably, a projection 17 is formed on an inner surface 18 of the administration packaging 1, in particular the bottom part 3, in the predetermined breaking zone 9.

The inner surface 18 of the administration packaging 1 or bottom part 3 is in particular the surface of the bottom part 3 that faces the cavity 5 or hollow space configured for receiving the pharmaceutic product 2 and/or that is opposite the inner surface 16. Particularly preferably, the inner surface 18 is formed by the sealing layer 205.

Thus, the outer surface 16 and inner surface 18 are preferably the two opposing surfaces of the wall forming the bottom part 3. Particularly preferably, the inner surface 18 is the surface which is in contact with the pharmaceutic product 2, at least when dispensing it and/or the surface of the sealing layer 205. Particularly preferably, the outer surface 16 is the surface which is in contact with the environment and/or the surface of the outer thermoformable layer 201.

The projection 17 is preferably arranged opposite of the groove 15.

Preferably, the projection 17 is formed corresponding to the groove 15, in particular extends in the same direction as the groove 15, has the same length and/or width as the groove 15 and/or has the same shape and/or angles as the groove 15.

Preferably, the predetermined breaking zone 9 is a region that has the same thickness T as a region of the bottom part 3 surrounding the predetermined breaking zone 9. In other words, the thickness T of the (wall of the) bottom part 3 is preferably at least essentially constant in the region comprising and surrounding the predetermined breaking zone 9.

Thus, preferably, the thickness T of the (wall of the) bottom part 3 in the region of the groove 15 and/or projection 17 is at least essentially the same as in the region surrounding/adjacent to the groove 15 and/or projection 17.

The thickness T is preferably the distance between the outer surface 16 and the inner surface 18. In the predetermined breaking zone 9, the thickness T is preferably the distance between the (surfaces of the) groove 15 and the projection 17.

The at least essentially constant thickness T is preferably achieved by forming the projection 17 accordingly, in particular by the projection 17 having the same or at least almost the same height as the depth D of the groove 15. In other words, the projection 17 is preferably at least essentially as high as the groove 15 is deep, and/or the outer surface 16 is at least essentially as much indented as the inner surface 18 is elevated (at the predetermined breaking zone 9).

The thickness T of the bottom part 3, preferably both in the predetermined breaking zone 9 and the region surrounding it, is preferably at least 230 µm, particularly at least 300 or 400 µm, more preferably 450 or 480 µm, and/or at most 750 µm, particularly 650 or 600 µm, more preferably 500 µm or 520 µm.

In the first embodiment, the predetermined breaking zone 9 is preferably formed as a bend or kink or crease in the (wall of) the bottom part 3.

In a cross-section, in particular perpendicular to its longitudinal extension, the predetermined breaking zone 9 or (the wall of) the bottom part 3 in the region of the predetermined breaking zone 9 is preferably at least essentially V-shaped.

Preferably, a narrowing flow channel or cross-section reduction or nozzle 19 is formed at/in or by the predetermined breaking zone 9, in particular in the cavity 5 or administration channel 7.

The channel height and/or the flow cross-section of the administration channel 7 is preferably defined or delimited by the inner surface 18 and the cover 4, in particular the surface of the cover 4 facing the administration channel 7 or formed by the layer 305.

The height and/or width of the administration channel 7 away from the predetermined breaking zone 9 or cross-section reduction or nozzle 19 are/is preferably more than 0.5 mm, in particular more than 1 mm, and/or less than 4 mm or 3 mm.

The height and/or width of the administration channel 7 is preferably reduced at/in or by the predetermined breaking zone 9 by at least 0.05 mm or more and/or at most 0.5 mm or less, particularly preferably by 0.1 mm, 0.2 mm, 0.3 mm or 0.4 mm.

Preferably, the administration channel 7 is narrowed or its (flow) cross-section is reduced or the nozzle 19 is formed by means of the projection 17. In particular, the projection 17 projects into the administration channel 7 and/or towards the cover 4, thereby narrowing the channel and/or reducing the (flow) cross-section.

When the administration packaging 1 is opened, in particular by folding/bending along the predetermined breaking zone 9 or groove 15, the narrowing flow channel or cross-section reduction or nozzle 19 is preferably formed or located at the open end 7B, in particular where the pharmaceutical product 2 exits the administration packaging 1.

As already explained above, the administration channel 7 and/or the open end 7B are preferably configured or dimensioned in such a way that no product 2 can escape due to (only) gravitational forces. This is particularly preferably achieved—at least partially—by means of the narrowing flow channel or cross-section reduction or nozzle 19.

Preferably, the administration channel 7 or open end 7B is narrowed, in particular by means of the projection 17, such that no pharmaceutical product 2 exits/leaves therethrough without applying an additional force, e.g., by pressing on the chamber 6, even if the open end 7B points downwards.

Thus, the pharmaceutical product 2 is preferably dispensed from the opened administration packaging 1 exclusively by pressing on the chamber 6.

Preferably, when dispensing the pharmaceutical product 2 and/or pressing on the chamber 6, the pharmaceutical product 2 is accelerated when leaving the administration packaging 1, in particular at the open end 7B, particularly preferably by means of the narrowing flow channel or cross-section reduction or nozzle 19.

Preferably, the narrowing flow channel or cross-section reduction or nozzle 19 (also) prevents that pharmaceutic product 2 flows, in particular from the chamber 6, past the narrowing flow channel or cross-section reduction or nozzle 19 and/or into the tip 10 or the portion of the administration channel 7 comprised by the tip 10 and/or towards the axial end 7A, in particular before the administration packaging 1 is opened. Thus, preferably, it is prevented that pharmaceutical product 2 collects at the axial end 7A or in the tip 10. In this way, preferably, no pharmaceutical product 2 is wasted or spilled when the administration packaging 1 is opened or the tip 10 is disposed of.

Figure 12:
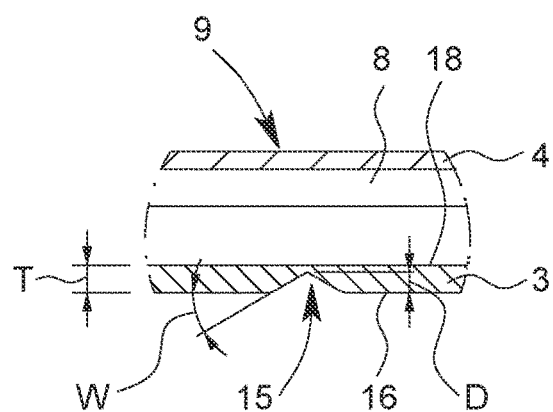
FIG. 12 is an enlarged detail of the predetermined breaking zone according to a second embodiment.

FIG. 12 shows an enlarged detail of a second embodiment of the administration packaging 1 in the region of the breaking zone 9 in an illustration corresponding to the enlarged detail of the first embodiment shown in FIG. 11.

Preferably, the only difference between the first and second embodiment is that the administration packaging 1 or bottom part 3 or predetermined breaking zone 9 does not comprise the projection 17 and/or does not comprise the narrowing flow channel or cross-section reduction or nozzle 19.

The administration channel 7 of the second embodiment has preferably a constant distance between the inner surface 18 and the cover 4 and/or a constant (flow) cross-section, in particular also in the predetermined breaking zone 9.

Along the axis A and/or along the section shown in FIG. 12, the inner surface 18 is preferably at least essentially flat, in particular (also) in the predetermined breaking zone 9.

Preferably, in the predetermined breaking zone 9, the thickness T of the (wall of the) bottom part 3 is decreased or reduced compared to the region surrounding the predetermined breaking zone 9. Particularly preferably, the thickness T is reduced by the depth D of the groove 15.

The ratio of the thickness at (the narrowest region of) the predetermined breaking zone 9 to the thickness in the region surrounding the predetermined breaking zone 9 is preferably at least 0.1 or 0.2 and/or at most 0.9 or 0.8.

Embodiments are also possible in which the administration packaging 1, in particular the bottom part 3 or predetermined breaking zone 9, has a projection 17 or narrowing flow channel or cross-section reduction or nozzle 19, but nevertheless a non-constant thickness T, e.g., a reduced thickness T in the region of the projection 17 or predetermined breaking zone 9, compared to the region surrounding the projection 17 or predetermined breaking zone 9.

It is also conceivable that the thickness T is reduced in some region and increased in another region, compared to the average thickness T. For example, the thickness T could be reduced at the tip of the projection 17 and increased at the foot/base of the projection 17.

Preferably, the predetermined breaking zone 9 or a material weakening of the bottom part 3 is formed by a bend/kink, by a material reduction/thickness reduction, or by a combination thereof.

In the following, a third and fourth embodiment of the administration packaging 1 are described which differ from the first and second embodiment preferably by the predetermined breaking zone 9 or its groove 15 extending over the rim 8 or being formed both at the administration channel 7 and the rim 8.

Figure 13:
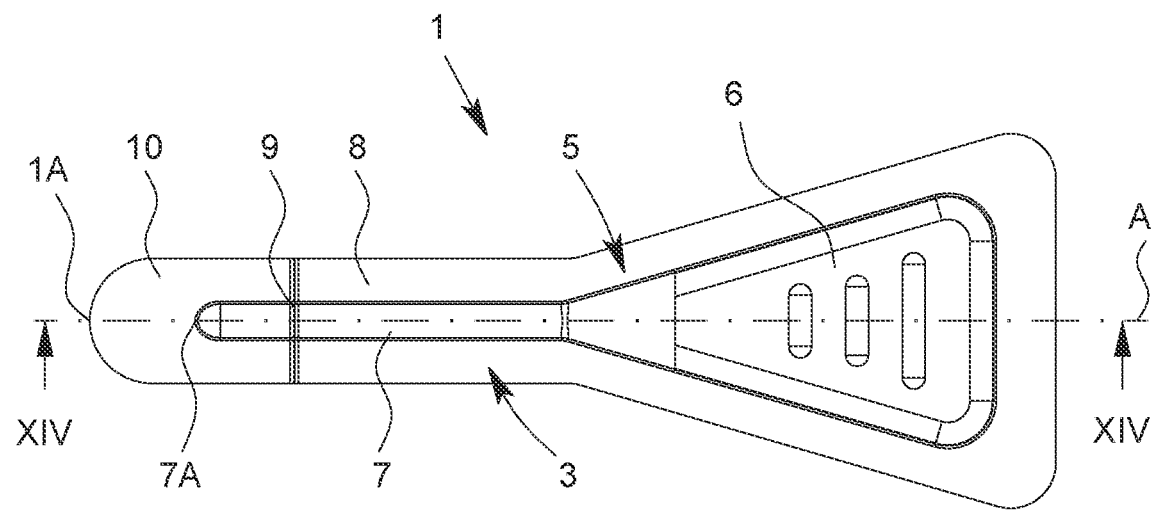
FIG. 13 is a schematic plan view of an administration packaging according to a third embodiment.
Figure 14:
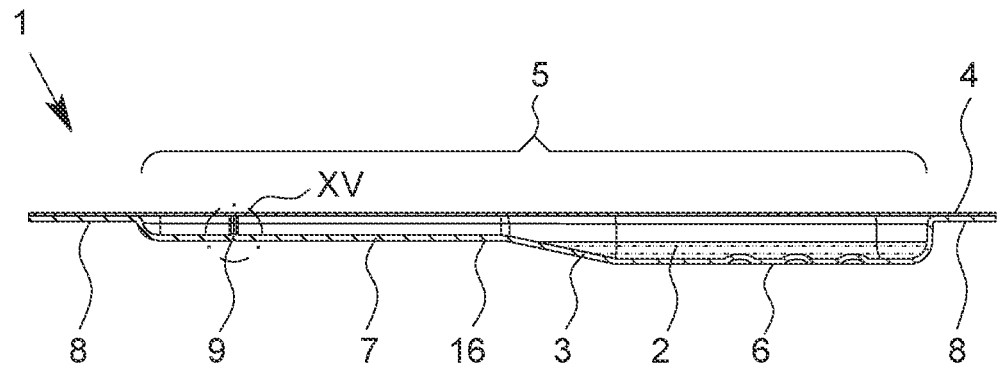
FIG. 14 is a schematic section of the administration packaging along the line XIV-XIV of FIG. 13.
Figure 15:
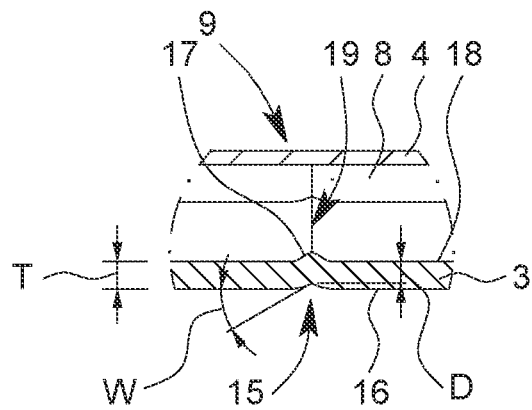
FIG. 15 is an enlarged detail of the predetermined breaking zone according to the third embodiment in the region of an administration channel.

FIGS. 13 to 15 show the third embodiment of the administration packaging 1, in views corresponding to FIGS. 9 to 11, respectively. In particular, FIG. 13 shows a schematic plan view from the bottom side of the administration packaging 1, FIG. 14 shows a schematic section of the administration packaging 1 along the line XIV-XIV in FIG. 13 and FIG. 15 shows an enlarged detail of FIG. 13 labeled XV. The sections shown in FIGS. 14 and 15 are along the axis A, i. e., along or in the region of the administration channel 7.

Figure 16:
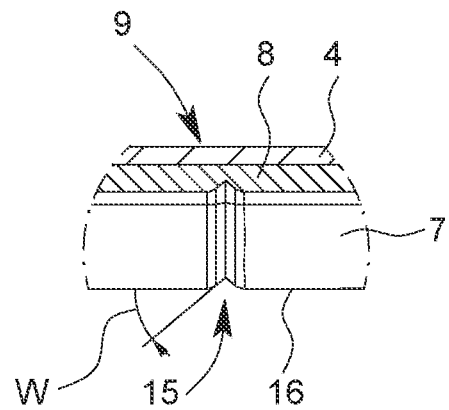
FIG. 16 is an enlarged detail of the predetermined breaking zone according to the third embodiment in the region of a rim.

FIG. 16 shows a schematic section of the administration packaging 1 according to the third embodiment in the region of the rim 8 in an enlarged view similar to FIG. 15. Similar figures for the first and second embodiment have been omitted since in these embodiments the rim 8 does not comprise the predetermined breaking zone 9 or groove 15.

Figure 17:
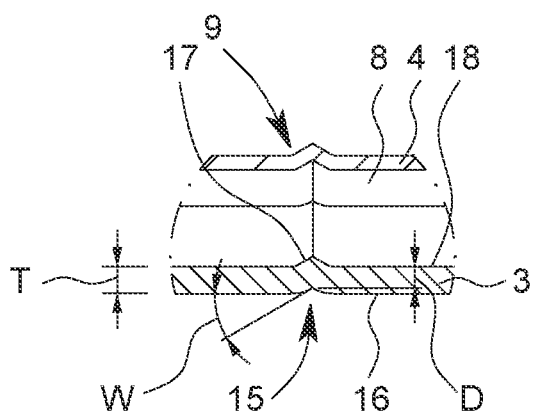
FIG. 17 is an enlarged detail of the predetermined breaking zone according to a fourth embodiment in the region of an administration channel.
Figure 18:
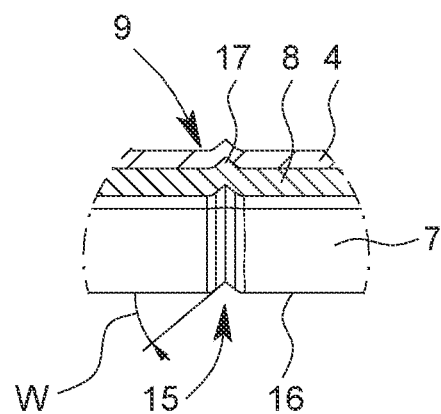
FIG. 18 is an enlarged detail of the predetermined breaking zone according to the fourth embodiment in the region of a rim.

FIG. 17 shows an enlarged detail of a fourth embodiment of the administration packaging 1 in the region of the breaking zone 9 in an illustration corresponding to the enlarged details of the other embodiments shown in FIGS. 11, 12 and 15. FIG. 18 shows an enlarged detail of the fourth embodiment of the administration packaging 1 in the region of the breaking zone 9 at the rim 8 in an illustration corresponding to FIG. 16.

In both the third and fourth embodiment, the predetermined breaking zone 9 or groove 15 preferably extends over the cavity 5, in particular the administration channel 7, and the rim 8. In other words, the predetermined breaking zone 9 or groove 15 preferably extends over the complete width of the administration packaging 1, i. e., over the complete extension of the administration packaging 1 in a direction transversal or perpendicular to the (longitudinal extension of the) administration channel 7 or the axis A.

Preferably, the region of the predetermined breaking zone 9 at the rim 8 has the same or similar features as the region of the predetermined breaking zone 9 at the cavity 5 or administration channel 7.

The above explanations with regard to the predetermined breaking zone 9, the groove 15, the angle W, the depth D, etc. preferably also apply to the predetermined breaking zone 9 of the third and fourth embodiment, particularly preferably both in the region of the cavity 5 and the rim 8.

Preferably, the groove 15 has the same or similar properties in the region of the rim 8 as in the region of the cavity 5 or administration channel 7, for example the same angle W, same depth D or the like.

However, solutions are also possible in which the predetermined breaking zone 9 and/or groove 15 differs at the rim 8. For example, the groove 15 could have a lesser depth D at the rim 8 than at the cavity 5 or administration channel 7.

Preferably, the main or only difference between the third embodiment according to FIGS. 13 to 16 and the fourth embodiment according to FIGS. 17 and 18 is whether or not the projection 17 is formed on the rim 8.

Preferably, the rim 8 in the third embodiment does not comprise the projection 17, as can be seen in particular in FIG. 16, and/or the rim 8 in the fourth embodiment comprises the projection 17, as can be seen in particular in FIG. 18.

In the fourth embodiment, the projection 17 preferably extends over the complete width of the administration packaging 1, i. e., over the complete extension of the administration packaging 1 in a direction perpendicular to the (longitudinal extension of the) administration channel 7 or the axis A. Thus, in particular, also the edge 3A and/or the rim 8 comprise the projection 17.

Preferably, the projection 17 has the same or similar properties in the region of the rim 8 as in the region of the cavity 5 or administration channel 7. However, solutions are also possible in which the projection 17 differs at the rim 8.

Preferably, the cover 4 follows or adapts to the surface of the rim 8. In other words, in the fourth embodiment, in the region of the predetermined breaking zone 9 or projection 17, the cover 4 (also) has a bulge or projection on its outer side and a groove on its inner side, as can be seen in FIGS. 17 and 18. In the third embodiment and/or when the rim 8 is flat or does not comprise the projection 17, the cover 4 is preferably at least essentially flat, in particular also in the region of the predetermined breaking zone 9, as can be seen in FIGS. 15 and 16.

In the third embodiment, the thickness T is preferably reduced in the region of the predetermined breaking zone 9 at the rim 8 compared to the surrounding region and/or the region of the predetermined breaking zone 9 at the administration channel 7.

In the fourth embodiment, the thickness T is preferably at least essentially constant over the entire length of the predetermined breaking zone 9.

Preferably, the administration packaging 1 according to the third embodiment comprises the narrowing flow channel or cross-section reduction or nozzle 19.

Preferably, the administration packaging 1 according to the fourth embodiment has an at least essentially constant flow cross-section and/or does not comprise the narrowing flow channel or cross-section reduction or nozzle 19. This is in particular achieved by the cover 4 being shaped accordingly, in particular with a non-flat surface in the region of the predetermined breaking zone 9 or projection 17. However, solutions are also possible in which the cover 4 is only non-flat at the rim 8, but still flat where it covers the cavity 5 or administration channel 7, in particular still flat in the region framed by the edge 3A.

Any combinations of the different embodiments are possible. For example, also the predetermined breaking zone 9 of the third embodiment may be formed without a projection 17, as in the second embodiment.

In the following and with reference to FIGS. 19 to 22, the molding tool 102 and/or how to produce the predetermined breaking zone 9 in the proposed method, in particular during the thermoforming step, and/or in the proposed apparatus 100, in particular the molding tool 102, is explained in more detail.

Figure 19:
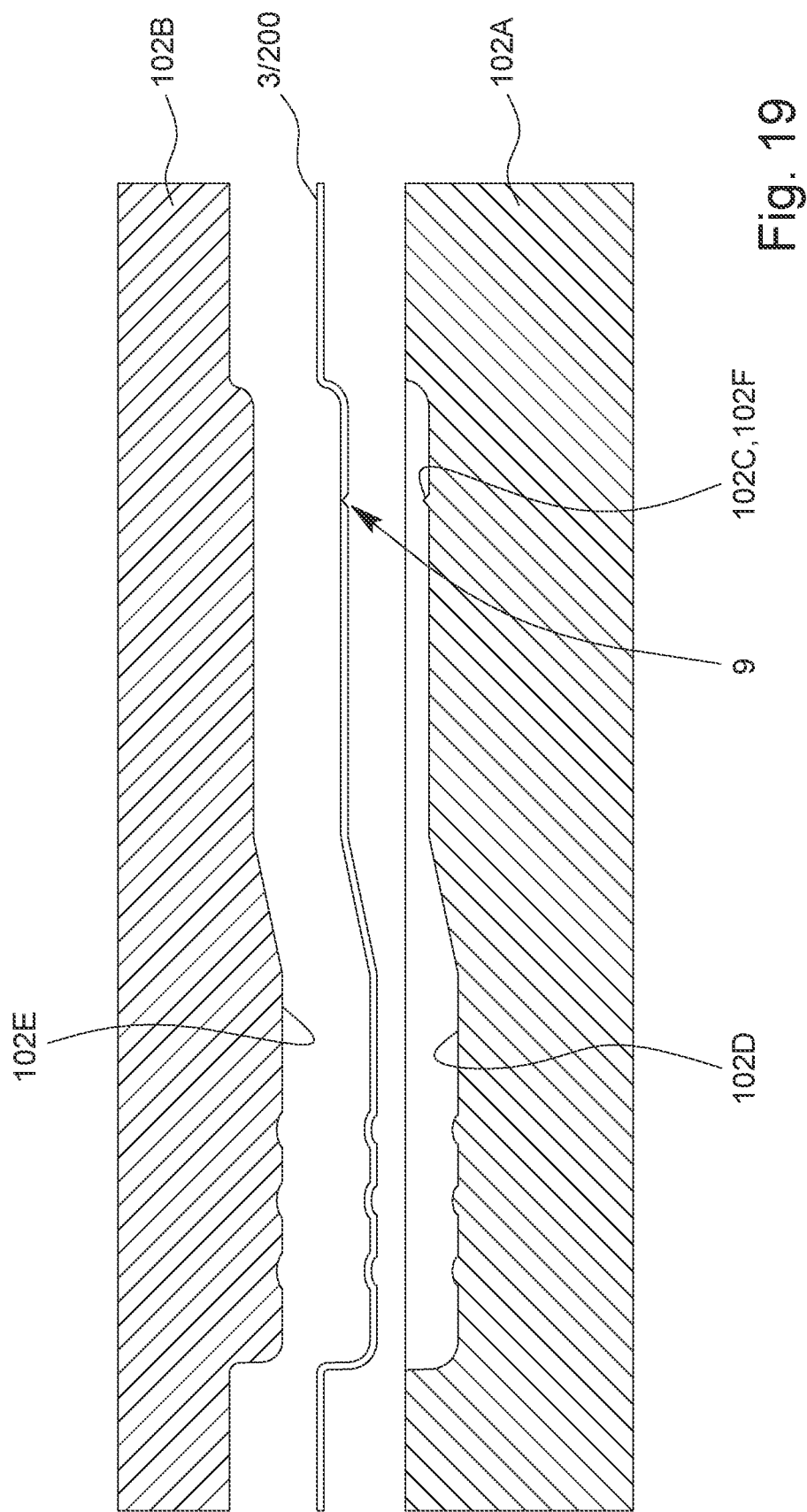
FIG. 19 is a schematic section through a molding tool of the apparatus according to FIG. 4.
Figure 20:
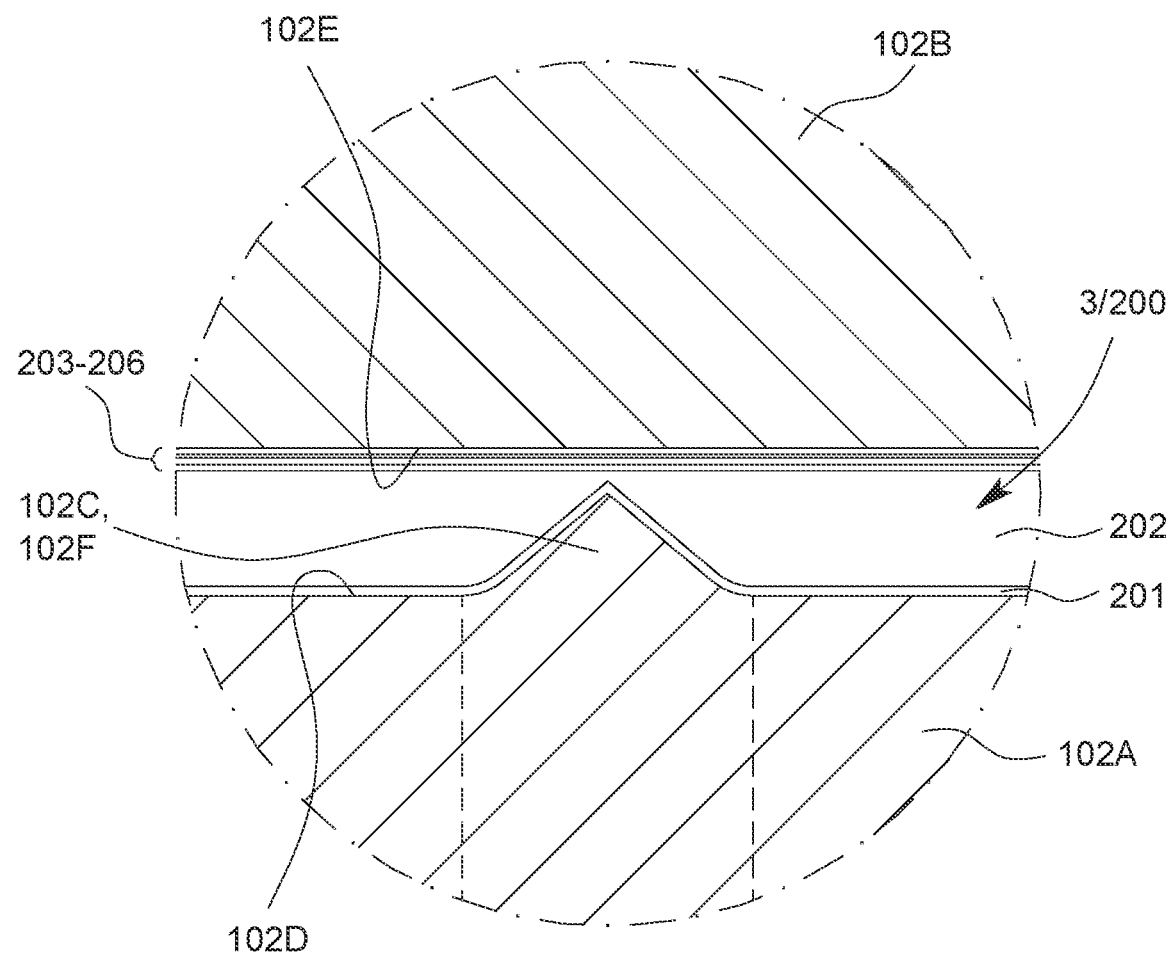
FIG. 20 is a schematic sectional detail of the molding tool of FIG. 19 in the region of a forming device of the molding tool for forming the predetermined breaking zone.
Figure 21:
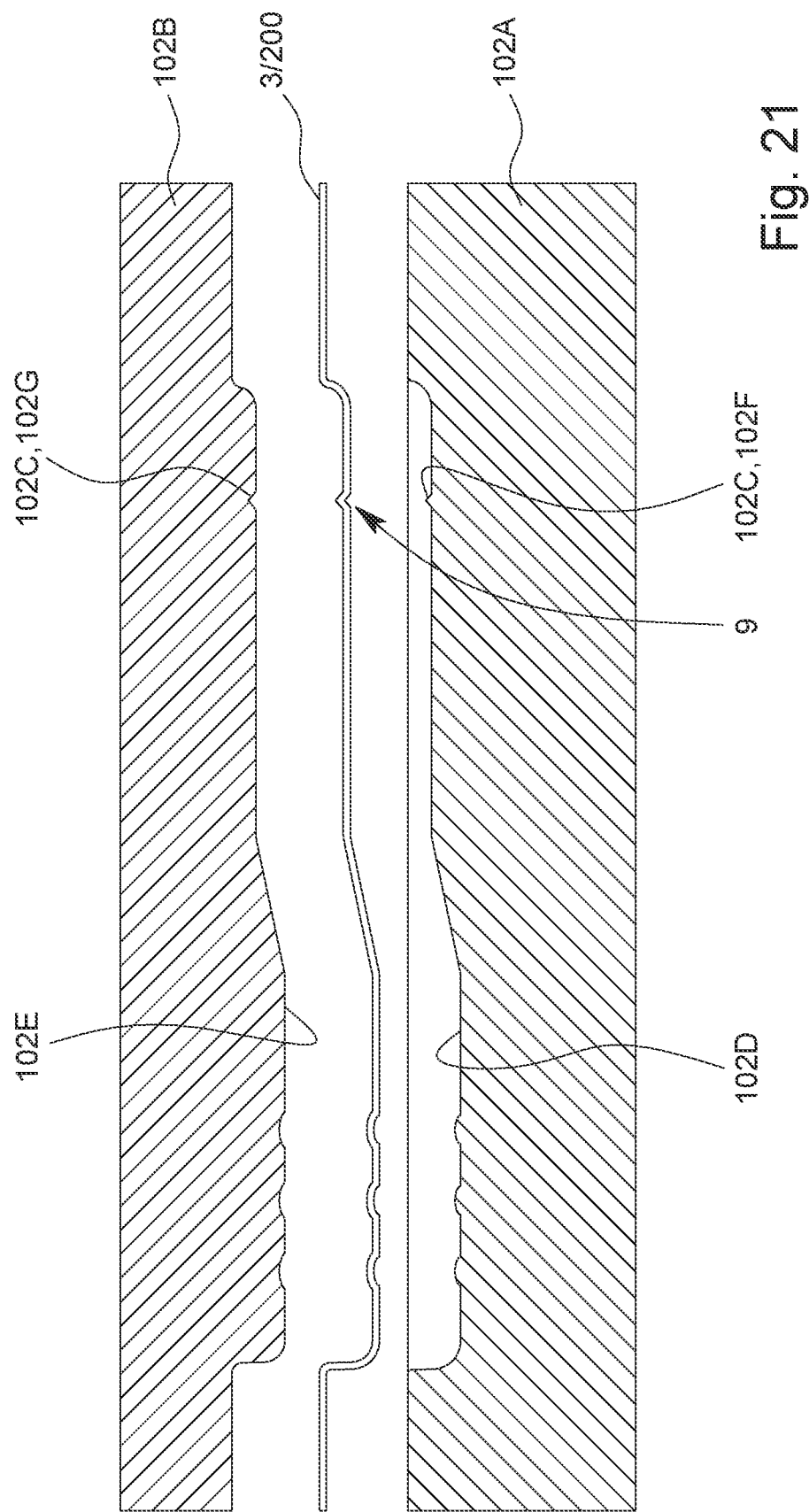
FIG. 21 is a schematic section through a molding tool of the apparatus according to another embodiment.
Figure 22:
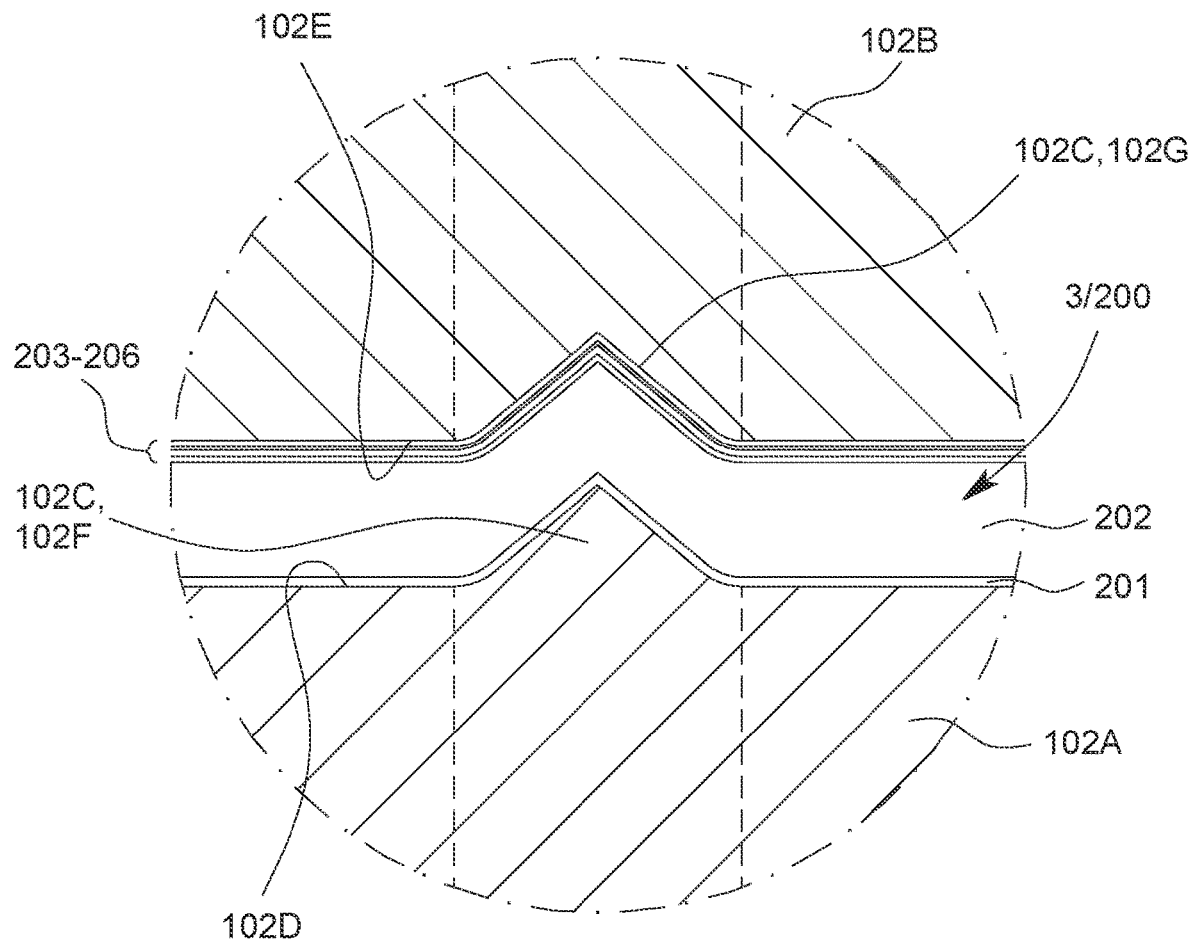
FIG. 22 is a schematic sectional detail of the molding tool of FIG. 21 in the region of a forming device of the molding tool for forming the predetermined breaking zone.

FIG. 19 shows in a schematic section the molding tool 102 with a (thermoformed) plastic sheet 200 or bottom part 3. FIG. 20 shows an enlarged detail of a section of the molding tool 102 in the region of a forming device 102C with a (thermoformed) plastic sheet 200 or bottom part 3. FIGS. 21 and 22 show the molding tool 102 according to a further embodiment in illustrations corresponding to FIGS. 19 and 20, respectively.

The following description preferably applies to both embodiments, unless otherwise stated.

In FIGS. 19 and 21, the molds 102A, 102B are shown spaced apart from each other and from the plastic sheet 200/bottom part 3 and/or (just) after thermoforming when the plastic sheet 200/bottom part 3 is released from the molds 102A, 102B.

In FIGS. 20 and 22, the molds 102A, 102B are shown lying against the plastic sheet 200/bottom part 3 and/or during thermoforming.

The negative mold 102A preferably has a (concave) cavity and/or a concave form or (concave) surface 102D. The surface 102D of the negative mold 102A is preferably concave overall but may locally be flat or even convex.

Particularly preferably, the negative mold 102A has a plurality of (concave) cavities for forming a plurality of bottom parts 3 (at the same time/in one forming step), as already explained above with reference to FIG. 4.

The positive mold 102B preferably has a (convex) elevation and/or a convex form or (convex) surface 102E. The surface 102E of the positive mold 102B is preferably convex overall, but may locally be flat or even concave.

Particularly preferably, the positive mold 102B has a plurality of (convex) elevations for forming a plurality of bottom parts 3 (at the same time/in one forming step), as already explained above with reference to FIG. 4.

As already explained above with regard to the apparatus 100 shown in FIG. 4 and the corresponding production method, it is possible that the molding tool 102 comprises only the negative mold 102A or only the positive mold 102B, or to use only one of the two molds 102A, 102B during (thermo)forming. In this case, the plastic sheet 200 is preferably forced against the negative mold 102A or the positive mold 102B, in particular pneumatically and/or by means of a gas blown onto the plastic sheet 200, thereby adapting to the shape of the respective mold. Alternatively or in addition, a negative pressure may be created, e.g., by sucking air or another gas away from the respective mold. Alternatively, or in addition, a stamp or other means of mechanical force may be used.

Particularly preferably, both the negative mold 102A and the positive mold 102B are provided or used during or for forming the bottom part(s) 3. In this case, preferably, the positive mold 102B is pressed against the negative mold 102A and/or vice versa and/or the plastic sheet 200 is squeezed or formed between the negative mold 102A and the positive mold 102B. Thus, preferably, a mechanical force is exerted onto the plastic sheet 200 by means of molds 102A, 102B. In this sense, one of the molds 102A, 102B may act as a stamp for the other mold 102B, 102A.

Preferably, even when both molds 102A, 102B are provided/used, blowing a gas and/or creating a negative pressure are/is used in addition.

It is also possible that one of the molds 102A, 102B or surfaces 102D, 102E is only partially formed or provided, in particular only in regions of the bottom part to be formed which require a more precise forming. For example, the positive mold 102B or its (convex) surface 102E may be only provided in the region where the administration channel 7 is formed or even just where the predetermined breaking zone 9 is formed. In such case, preferably, the plastic sheet 200 is forced against the respective mold in the other regions solely by means of gas and/or negative pressure.

The molding tool 102, in particular the negative mold 102A and/or the positive mold 102B, is preferably configured for (thermo)forming the predetermined breaking zone 9, groove 15 and/or projection 17, in particular during the (thermo)forming step of the production method.

The molding tool 102, in particular the negative mold 102A and/or the positive mold 102B preferably comprises a forming device or generating device 102C for (thermo)forming the predetermined breaking zone 9, groove 15 and/or projection 17.

The forming device 102C is preferably shaped corresponding to the (desired) predetermined breaking zone 9, in particular as a projection or elevation 102F in the negative mold 102A and/or a groove or indentation 102G in the positive mold 102B.

It is also possible to provide a projection or elevation 102F in the positive mold 102B and/or a groove or indentation 102G in the negative mold 102A for generating/forming a predetermined breaking zone 9 according to a fifth embodiment which will be explained later with reference to FIGS. 23 to 25.

The forming device 102C preferably has shapes, measures and/or dimensions corresponding to or being the same as the (desired) predetermined breaking zone 9, for example with regard to the angle W and/or depth D.

In particular, the forming device 102C is elongated and/or wedge-shaped, preferably like the predetermined breaking zone 9. In the case of a surface elevation, its height preferably corresponds to or is the same as the (desired) depth D of the predetermined breaking zone 9. In the case of a surface indentation, its depth preferably corresponds to or is the same as the (desired) depth D of the predetermined breaking zone 9.

The forming device 102C or the elevation 102F preferably has a sharp edge or sharp ridge.

Preferably, the radius of curvature at the edge/ridge of the forming device 102C/elevation 102F is less than 15% or 10%, in particular less than 5% or 2%, of the height of the forming device 102/elevation 102F.

Preferably, the radius of curvature at the edge/ridge of the forming device 102C/elevation 102F is less than 50 μm or 20 μm, in particular less than 10 μm or 5 μm.

Preferably, the groove 15 has the same or a corresponding radius of curvature at its valley and/or the projection 17 has the same or a corresponding radius of curvature at its ridge.

The forming device 102C may be embodied/formed/provided only in the negative mold 102A (for example as shown in FIGS. 19 and 20), only in the positive mold 102B (not shown), or both in the negative mold 102A and the positive mold 102B (for example as shown in FIGS. 21 and 22).

In the case of the negative mold 102A, the forming device 102C is preferably configured as a projection or elevation 102F in the negative mold 102A and/or in the (concave) cavity formed by the negative mold 102A and/or of the (overall concave) surface 102D.

In the case of the positive mold 102B, the forming device 102C is preferably configured as a groove or indentation 102G in the positive mold 102B and/or in the (convex) elevation formed by the positive mold 102B and/or of the (overall convex) surface 102E.

Preferably, when the plastic sheet 200 is forced against the negative mold 102A and/or the positive mold 102B, it adapts to the shape of the respective mold 102A, 102B. In particular, the plastic sheet 200 lies flat against the negative mold 102A or surface 102D and/or positive mold 102B or surface 102E.

Particularly preferably, the plastic sheet 200 (also) adapts or lies flat against the forming device 102C, the elevation 102F and/or the indentation 102G, in particular when forced against it, thereby forming the predetermined breaking zone 9, groove 15 and/or projection 17.

Depending on the desired form of the predetermined breaking zone 9, the forming device 102C is shaped accordingly.

The forming device 102C may be only provided in the region of the molding tool 102, in particular one or both molds 102A, 102B, where the administration channel 7 is formed or is to be formed. Alternatively, the forming device 102C may also be provided in the region where the rim 8 is formed.

When forming the bottom part 3, in particular in the forming step, the predetermined breaking zone 9 is or will be formed only where the forming device 102C is provided.

When the forming device 102C is only provided in the region where the administration channel 7 is formed or is to be formed, the predetermined breaking zone 9 is or will correspondingly be formed only in the region of the administration channel 7. Thus, preferably, an administration packaging 1 or bottom part 3 according to the first embodiment shown in FIGS. 9 to 11 and/or according to the second embodiment shown in FIG. 12 and/or any other embodiment in which the predetermined breaking zone 9 is only provided at the administration channel 7 can be formed/produced in this way.

When the forming device 102C is also provided in the region where the rim 8 is formed or is to be formed, the predetermined breaking zone 9 is or will correspondingly be formed also in the region of the rim 8. Thus, preferably, an administration packaging 1 or bottom part 3 according to the third embodiment shown in FIGS. 13 to 16 and/or according to the fourth embodiment shown in FIGS. 17 and 18 and/or any other embodiment in which the predetermined breaking zone 9 is also provided at the rim 8, for example also the embodiment shown in FIGS. 1 to 3, can be formed/produced in this way.

Preferably, when both molds 102A, 102B are provided or in regions where both molds 102A, 102B are provided, the molds 102A, 102B or their surfaces 102D, 102E at least essentially correspond to each other. In particular, the surfaces 102D, 102E are at least essentially identical or have at least essentially the same shape—apart from having the opposite curvature. However, in certain regions, in particular where the predetermined breaking zone 9 is or is to be formed, the molds 102, 102B or their surfaces 102D, 102E may be shaped differently.

Preferably, in the embodiment shown in FIGS. 19 and 20, only the negative mold 102A comprises the forming device 102C. In particular, while a projection or elevation 102F is provided on the negative mold 102A or surface 102D— in particular in the region where the administration channel 7 or predetermined breaking zone 9 is or is to be formed—no corresponding groove or indentation is provided on the positive mold 102B.

As can be seen best in FIG. 20, this preferably results in a predetermined breaking zone 9 without a projection 17 and/or with decreased thickness T. In particular, in this way, an administration packaging 1 according to the second embodiment shown in FIG. 12 and/or any other embodiment without projection 17 can be formed.

Alternatively, the forming device 102C may be embodied/provided on both molds 102A, 102B, as exemplary shown in FIGS. 21 and 22. In particular, one mold 102A, 102B may comprise a projection or elevation 102F and the other mold 102B, 102A may comprise a corresponding groove or indentation 102G, in particular with the same or similar or corresponding angle W and/or height/depth D. In this way, it is preferably possible to form/produce administration packagings 1 with groove 15 and corresponding projection 17, e.g., the administration packaging 1 according to the first embodiment shown in FIGS. 9 to 11 or according to the third or fourth embodiment shown in FIGS. 13 to 18, depending on whether the forming device 102C is only provided in the region of the administration channel 7 to be formed or also in the region of the rim 8 to be formed.

It is also possible that the parts of the forming device 102C on the different molds 102A, 102B correspond only in certain regions to each other, but differ in other regions.

For example, the forming device 102C or surface 102D may comprise a projection or elevation 102F which extends both along the region where the administration channel 7 is formed or is to be formed and the region where the rim 8 is formed or is to be formed, while the forming device 102C or surface 102E only comprises a groove or indentation 102G in the region where the administration channel 7 is formed or is to be formed, but not in the region where the rim 8 is formed or is to be formed. In this way, preferably, an administration packaging 1 according to the third embodiment shown in FIGS. 13 to 16 can be formed/produced.

The forming device 102C may be integrally formed with the molding tool 102, in particular the negative mold 102A and/or the positive mold 102B or their respective surfaces 102D, 102E.

In the example shown in FIGS. 19 and 20, the forming device 102C is preferably an integrally formed projection or elevation 102F of the mold 102A or surface 102D. Depending on the desired shape of the predetermined breaking zone 9, the other mold 102B or surface 102E may comprise, in addition or alternatively, an integrally formed groove or indentation 102G, e.g., as shown in FIGS. 21 and 22.

Preferably, the apparatus 100 can be adapted for producing differently shaped predetermined breaking zones 9.

As already explained before, the molding tool 102, in particular the molds 102A, 102B, are preferably exchangeable. The apparatus 100 may be adaptable for producing differently shaped predetermined breaking zones 9 by exchanging the molding tool 102, in particular one or both molds 102A, 102B, with a molding tool 102 with a different forming device 102C.

Particularly preferably, the forming device 102C is displaceable, adjustable and/or exchangeable, in particular within the molding tool 102 or respective mold 102A, 102B and/or without exchanging the entire molding tool 102 or respective mold 102A, 102B. In particular, the apparatus 100 can preferably be adapted for producing differently shaped predetermined breaking zones 9 without exchanging the entire molding tool 102 or respective mold 102A, 102B.

Preferably, the forming device 102C forms a displaceable, adjustable and/or exchangeable component of the molding tool 102.

For example, the forming device 102C may be designed as one or more inserts for the molding tool 102 or mold 102A, 102B. This is very schematically indicated by dashed lines in FIGS. 20 and 22.

The forming device 102C or insert can preferably be fixed to the molding tool 102 or mold 102A, 102B in a force-fitting and/or form-fitting manner. For example, the forming device 102C or insert may be screwed into a corresponding screw-hole of the molding tool 102 or mold 102A, 102B.

For producing a different type of administration packaging 1 or predetermined breaking zone 9, or for adapting the apparatus 100 or molding tool 102 therefor, the forming device 102C or insert can preferably be exchanged for a different forming device 102C or insert. Preferably, in this way, an adaption is possible without exchanging the (entire) molding tool 102 or mold 102A, 102B.

Alternatively, or additionally, the forming device 102C may be adjustable or displaceable. Preferably, the forming device 102C is adjustable or displaceable orthogonally and/or parallel to the surface 102D, 102E.

In particular, the height/depth D and/or angle W of the forming device 102C, in particular the elevation 102F and/or indentation 102G,—and in turn of the produced predetermined breaking zone 9—may be adjustable. For example, it may be adjustable how far the forming device 102C is inserted or screwed into the molding tool 102 or mold 102A, 102B.

Preferably, the forming device 102C is adjustable or displaceable to determine/change the position of the predetermined breaking zone 9 within the administration channel 7, e.g., to move it further to or further away from the axial end 7A.

FIG. 20 shows in an enlarged detail an example for producing a predetermined breaking zone 9 with reduced thickness T and/or according to the second embodiment shown in FIG. 12 and/or with the negative mold 102A and positive mold 102B having non-corresponding surfaces 102D, 102E, in particular with the forming device 102C being only provided/formed in the negative mold 102A or on the surface 102D.

The plastic sheet 200 is preferably squeezed or compressed between the molds 102A, 102B, in particular in the region of the forming device 102C and/or between the forming device 102C or elevation 102F formed thereby and the surface 102E of the other mold 102B (directly) opposite of the forming device 102C.

Due to the squeezing/compressing and/or the differently shaped surfaces 102D, 102E and/or the forming device 102C, the thickness T of the plastic sheet 200 is preferably reduced in the region of the forming device 102C. In this way, preferably, the predetermined breaking zone 9 is generated.

The forming device 102C or elevation 102F preferably penetrates the plastic sheet 200.

Preferably, only the (most) outer layers of the plastic sheet 200, in particular the outer thermoformable layer 201, preferably also the cyclic olefin copolymer layer 202, optionally also the inner thermoformable layer 203, are affected, penetrated and/or squeezed/compressed by the forming device 102C or during thermoforming.

Preferably, the innermost layers, in particular at least the barrier layer 204 and the sealing layer 205, remain intact or are at least essentially not affected, penetrated or squeezed/compressed by means of the forming device 102C or in the forming step. Thus, preferably, the sealing and barrier qualities of the plastic sheet 200 or bottom part 3 are not impaired by or at the predetermined breaking zone 9.

The height of the forming device 102C or elevation 102F is preferably less than the thickness of the plastic sheet 200, particularly preferably less than the thickness of the cyclic olefin copolymer layer 202 or less than the sum of the outer thermoformable layer 201 and the cyclic olefin copolymer layer 202 and, optionally, of the inner thermoformable layer 203.

Particularly preferably, the height of the forming device 102C or elevation 102F corresponds to the (desired) depth D of the groove 15 to be generated.

The height of the forming device 102C or elevation 102F is preferably at least 0.05 mm or more and/or at most 0.5 mm or less. Particularly preferred values are 0.1 mm, 0.2 mm, 0.3 mm or 0.4 mm.

In a further embodiment (for example the one shown in FIGS. 21 and 22), as already explained above, the molds 102A, 102B may have corresponding surfaces 102D, 102E in the region where the predetermined breaking zone 9 is or shall be formed. In this case, preferably, the forming device 102C is comprised of a projection or elevation 102F on one mold and a corresponding groove or indentation 102G on the other mold.

Then, the plastic sheet 200, in particular all of its layers, are pushed or bent or kinked inwards during (thermo) forming, in particular pushed by the elevation 102F of the mold 102A into the indentation 102G of the mold 102B or vice versa, for example, as shown in FIG. 22. In this way, preferably, the predetermined breaking zone 9 with groove 15 and corresponding projection 17 is formed.

In this embodiment, the plastic sheet 200 is preferably at least essentially not squeezed/compressed, in particular at least essentially also none of the outer layers are squeezed/compressed.

Preferably, all layers of the plastic sheet 200 are affected since all layers are bent/kinked inwards. However, the integrity of the inner layers, in particular at least the barrier layer 204 and the sealing layer 205, is preferably maintained. Thus, also in this case, the sealing and barrier qualities of the plastic sheet 200 or bottom part 3 are preferably not impaired by or at the predetermined breaking zone 9.

It is possible to have corresponding surfaces 102D, 102E only in certain regions and/or to bend/kink the plastic sheet 200 inwards only in certain regions or to squeeze/compress it in other regions. For example, the plastic sheet 200 may be bent/kinked in the region where the administration channel 7 is formed or is to be formed and squeezed/compressed in the region where the rim 8 is formed or is to be formed such that an administration packaging 1 or bottom part 3 according to the third embodiment shown in FIGS. 13 to 16 can be formed.

In the following, a fifth embodiment of the administration packaging 1 is described.

Figure 23:
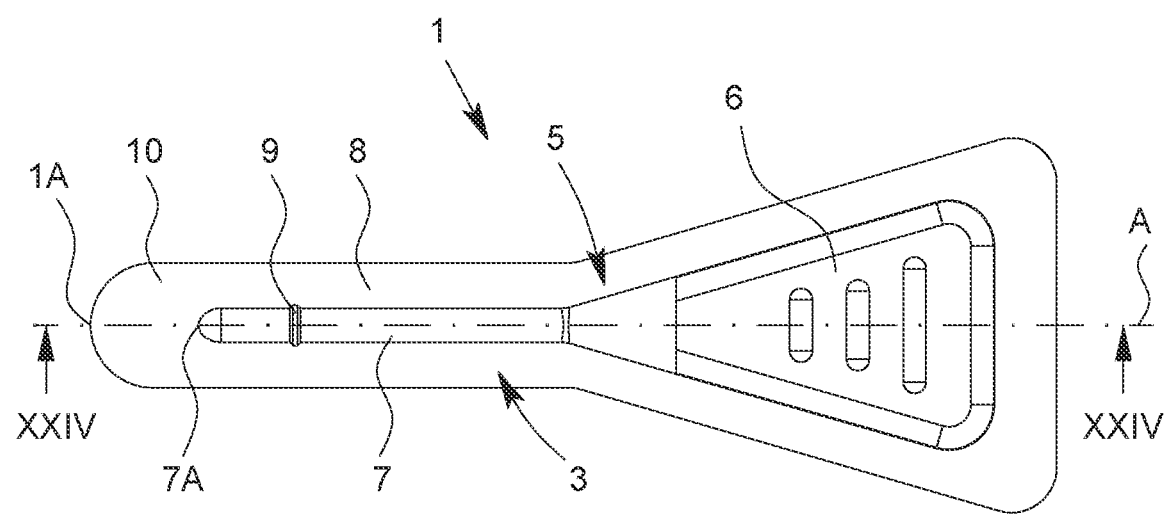
FIG. 23 is a schematic plan view of an administration packaging according to a fifth embodiment.
Figure 24:
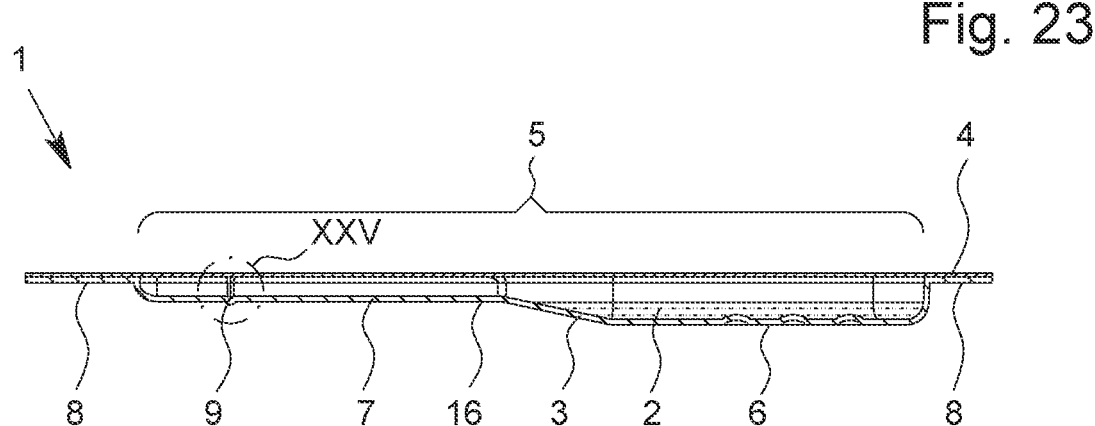
FIG. 24 is a schematic section of the administration packaging along the line XXIV-XXIV of FIG. 23.
Figure 25:
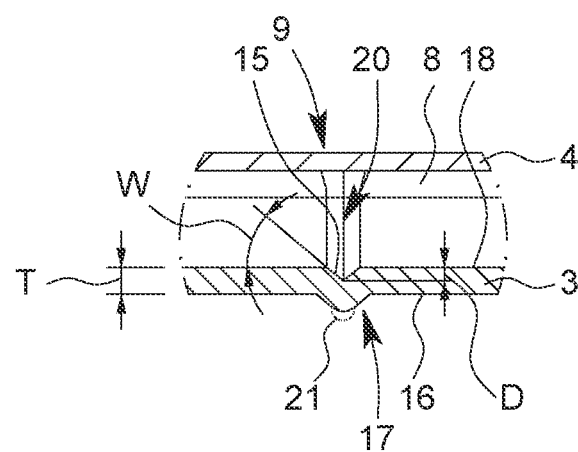
FIG. 25 is an enlarged detail of the predetermined breaking zone according to the fifth embodiment.

FIGS. 23 to 25 show the fifth embodiment of the administration packaging 1, in views corresponding to FIGS. 9 to 11, respectively. In particular, FIG. 23 shows a schematic plan view from the bottom side of the administration packaging 1, FIG. 24 shows a schematic section of the administration packaging 1 along the line XXIV-XXIV in FIG. 23, and FIG. 25 shows an enlarged detail of FIG. 24 labeled XXV. The sections shown in FIGS. 24 and 25 are along the axis A, i.e., along or in the region of the administration channel 7.

In the fifth embodiment, the groove 15 is provided on the inner surface 18 and/or the projection 17 is provided on the outer surface 16 and/or the bend/kink is toward the outside of the bottom part 3.

Compared to the previous embodiments, the positions of the groove 15 and projection 17 are preferably interchanged and/or the predetermined breaking zone 9 is preferably bent/kinked in the opposite direction.

In contrast to the first embodiment of FIGS. 9 to 11, the administration channel 7 is not narrowed by the predetermined breaking zone 9 of the fifth embodiment. Instead, preferably, a widening flow channel or cross-section enlargement or diffuser 20 is formed at/in or by the predetermined breaking zone 9, in particular in the cavity 5 or administration channel 7.

The height and/or width of the administration channel 7 is preferably enlarged at/in or by the predetermined breaking zone 9 by at least 0.05 mm or more and/or at most 0.5 mm or less, particularly preferably by 0.1 mm, 0.2 mm, 0.3 mm or 0.4 mm.

Preferably, the administration channel 7 is widened or its (flow) cross-section is enlarged or the diffuser 20 is formed by means of the groove 15. In particular, the groove 15 is formed on the inner surface 18, i.e., the surface 18 is recessed in the region of the predetermined breaking zone 9, thereby widening the channel and/or enlarging the (flow) cross-section.

When the administration packaging 1 is opened, in particular by folding/bending along the predetermined breaking zone 9 or groove 15, the widening flow channel or cross-section enlargement or diffuser 20 is preferably formed or located at the open end 7B, in particular where the pharmaceutical product 2 exits the administration packaging 1.

The widening of the channel at the open end 7B allows an easier exit of the pharmaceutic product 2. This may be advantageous, for example, for a more viscous fluid.

The preferred shapes, dimensions and/or other features of the predetermined breaking zone 9, in particular of the groove 15 and/or projection 17, described above for the other embodiments preferably also apply to the fifth embodiment accordingly or correspondingly.

It is evident that in some of the explanations and definitions of the previous embodiments, the term "outer surface 16" needs to be replaced by "inner surface 18" and vice versa to apply to the fifth embodiment. For example, in the fifth embodiment, the depth D is preferably the distance from the main plane of extension of the inner surface 18 and the lowest region of the groove 15, in particular measured perpendicular to said main plane and/or the angle W is preferably the smaller angle between the main plane of extension of the inner surface 18 and the main plane of extension of the beveled or inclined surface of the groove 15, in particular at the edge of the predetermined breaking zone 9 or groove 15, i.e., the edge where the inner surface 18 bends outwards and/or starts to get grooved/indented.

Particularly preferably, the explanations and preferred values for the groove 15 and/or the projection 17, in particular for the thickness T, depth D and/or angle W, preferably also apply accordingly or correspondingly to the fifth embodiment. FIG. 25 shows exemplary an angle W of about 40° (opening angle of about 100°).

In the fifth embodiment, the predetermined breaking zone 9, in particular the groove 15 and/or projection 17, preferably extends only over the cavity 5, in particular the administration channel 7, similar to the first embodiment.

Particularly preferably, the predetermined breaking zone 9 extends, in particular transversely or perpendicularly to the axis A/channel 7, over the entire cavity 5 or administration channel 7 or the width thereof.

However, it is also possible that the predetermined breaking zone 9 extends only partly over the cavity 5 or administration channel 7 or width thereof. For example, the region close to the edge 3A and/or where the cavity 5 or administration channel 7 transitions into the rim 8 may (already) be free of the predetermined breaking zone 9.

The above explanations and features regarding the entire or partial extension of the predetermined breaking zone 9 preferably also apply to the previous embodiments, e.g., the first embodiment, where the predetermined breaking zone 9 does not extend over the rim 8.

While the illustrative example of the fifth embodiment according to FIGS. 23 to 25 shows the predetermined breaking zone 9 extending only over the cavity 5/administration channel 7, it is also possible that the predetermined breaking zone 9 extends beyond the cavity 5/administration channel 7, in particular also over the rim 8 and/or the entire width of the administration packaging 1 or bottom part 3. As already explained with regard to the previous embodiments, in this case both the groove 15 and projection 17 may extend beyond the cavity 5/administration channel 7 (as in the fourth embodiment), or only one of the groove 15 or projection 17 extends beyond the cavity 5/administration channel 7 (as in the third embodiment).

Further, while the illustrative example of the fifth embodiment according to FIGS. 23 to 25 shows the predetermined breaking zone 9 embodied as a bend/kink and/or with both groove 15 and projection 17, it is also possible to provide only the groove 15 on the inner surface 18 and no projection, in particular similar to the second embodiment.

Consequently, any combinations of the different embodiments are possible. In particular, the fifth embodiment may be combined with any of the previous embodiments.

The molding tool 102, in particular the forming device 102C, is preferably constructed/shaped accordingly in order to form the bottom part 3, in particular the predetermined breaking zone 9, according to the fifth embodiment, i.e., with groove 15 on the inner surface 18 and/or projection 17 on the outer surface 16.

Figure 27:
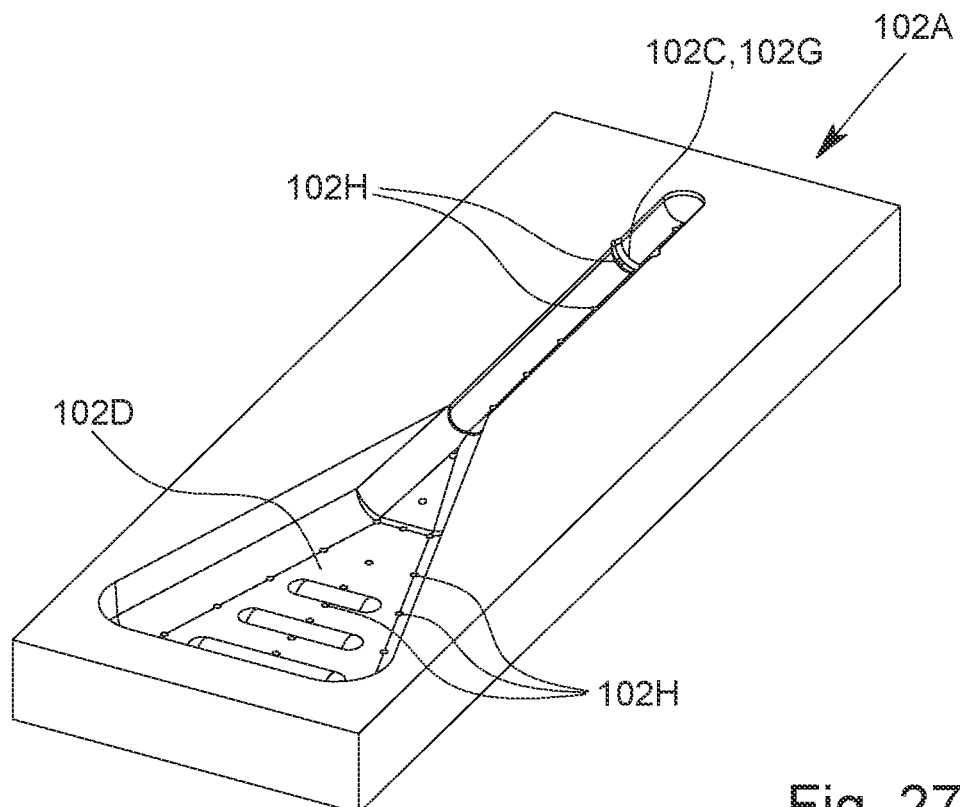
FIG. 27 is a schematic perspective view of another embodiment of a mold of the molding tool.

In particular, the negative mold 102A comprises an indentation 102G and/or the positive mold 102B comprises an elevation 102F. FIG. 27 exemplary shows a negative mold 102A having a corresponding indentation 102G.

Compared to the previously described molding tool 102 or forming device 102C shown in FIGS. 21 and 22, the positions of the elevation 102F and indentation 102G are preferably interchanged for forming/generating the predetermined breaking zone 9 of the fifth embodiment. Otherwise, the above explanations and features preferably apply accordingly or correspondingly, even without repetition.

Likewise, it is possible to provide only the positive mold 102B with an elevation 102F and no elevation or indentation at the negative mold 102A, in particular complementary to the forming device 102C shown in FIGS. 19 and 20, to form a predetermined breaking zone 9 with groove 15 on the inner surface 18 and with reduced wall thickness and/or without projection 17. Otherwise, the above explanations and features preferably apply accordingly or correspondingly, even without repetition.

If the forming device 102C is designed as inserts and/or exchangeable components in the respective molds 102A, 102B, it is also possible to adapt the forming device 102 for generating the predetermined breaking zone 9 of the fifth embodiment by interchanging said inserts, i.e., provide the insert of the negative mold 102A in the positive mold 102B and vice versa.

Figure 26:
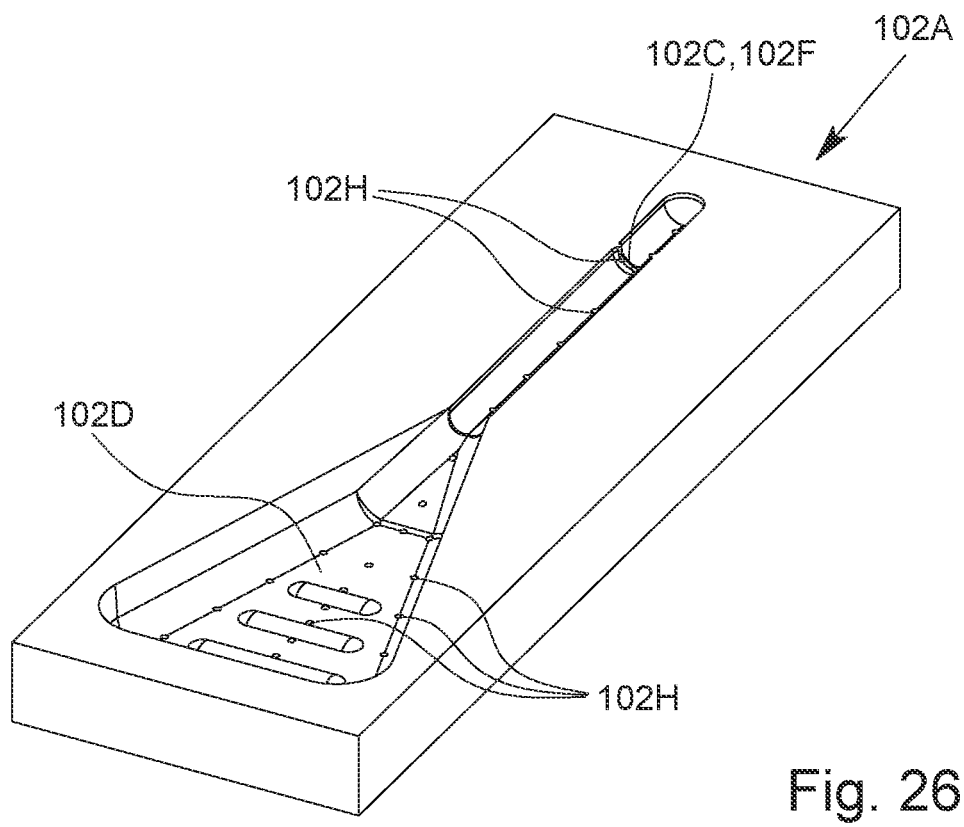
FIG. 26 is a schematic perspective view of an embodiment of a mold of the molding tool.

FIGS. 26 and 27 show exemplary preferred embodiments of negative molds 102A of the molding tool 102 in schematic, perspective views. Here, FIG. 26 shows a negative mold 102A having an elevation 102F for forming the predetermined breaking zone 9 and FIG. 27 shows a negative mold 102A having an indentation 102G for forming the predetermined breaking zone 9.

The above explanations and features, in particular as described with connection to FIGS. 19 to 22, preferably apply to the molds of FIGS. 26 and 27 accordingly or correspondingly, even without repetition. Likewise, the following explanations preferably also apply to the molds previously described in connection with FIGS. 19 to 22.

Preferably, the negative mold 102A of FIG. 26 can be used to produce an administration packaging 1 or bottom part 3 according to the first embodiment and/or with groove 15 on the outer surface 16.

Preferably, the negative mold 102A of FIG. 27 can be used to produce an administration packaging 1 or bottom part 3 according to the fifth embodiment and/or with groove 15 on the inner surface 18.

For producing an administration packaging 1 or bottom part 3 with predetermined breaking zone 9 also at the rim 8, the forming device 102C, in particular the elevation 102F or indentation 102G, preferably extends beyond the region for forming the cavity 5, in particular administration channel 7, and/or beyond the concave surface 102D. The following explanations and features preferably also apply to such molds 102A.

As shown in FIGS. 26 and 27, the (negative) mold 102A preferably comprises a plurality of (air) vents or venting holes 102H. Preferably, (also) the corresponding positive mold 102B comprises a plurality of (air) vents or venting holes (not shown).

The venting holes 102H are preferably distributed over the entire surface 102D, 102E of the mold 102A, 102B, in particular evenly and/or along the axis A and/or mirror-symmetrically to the axis A.

In a plan view or cross section, the venting holes 102H are preferably at least essentially circular or elliptical or oval.

Preferably, the venting holes 102H extend through the entire mold 102A, 102B.

The venting holes 102H are preferably provided such that air can escape the mold 102A, 102B when thermoforming, in particular deep drawing, the bottom part 3.

In particular, when the plastic sheet 200 is pressed into and/or onto the mold 102A, 102B by negative and/or positive pressure, air between the plastic sheet 200 and the respective mold 102A, 102B escapes through the venting holes 102H into the environment. In this way, preferably, the plastic sheet 200 can lie flat against the mold(s) 102A, 102B without any impairment by air trapped between the plastic sheet 200 and the mold(s) 102A, 102B.

Particularly preferably, as indicated in FIGS. 26 and 27, one or multiple venting holes 102H, especially preferably (exactly) three venting holes 102H, are (also) located or arranged or formed in/at the forming device 102C, in particular the elevation 102F and/or indentation 102G.

Preferably, by the venting holes 102H in/at the forming device 102C, it is ensured that the plastic sheet 200 lies (snugly) against the forming device 102C and/or that the predetermined breaking zone 9 is generated/formed in the desired shape.

The venting holes 102H or at least the venting hole(s) 102H in/at the forming device 102C preferably have a diameter of at least 0.2 mm or 0.3 mm, in particular of at least 0.4 mm or 0.5 mm, and/or of at most 1.0 mm or 0.9 mm, in particular of at most 0.8 mm or 0.7 mm. Particularly preferred diameters are 0.5 mm, 0.6 mm or 0.7 mm.

The ratio of the diameter of one venting hole 102H located in the administration channel 7 to the width of the administration channel 7, in particular in/at the forming device 102C, preferably is larger than 1:7 and/or smaller than 1:3. Particularly preferably, the ratio is about 1:6, 1:5 or 1:4.

Preferably, the diameter of the venting hole(s) 102H located at the forming device 102C is larger than or about the same as the height of the forming device 102H.

The diameter of the venting hole(s) 102H located at the forming device 102C is preferably smaller than the extent of the forming device 102C in the direction of the axis A or longitudinal extension of the administration channel 7.

Preferably, all venting holes 102H of the mold 102A and/or 102B have the same shape and/or dimensions. However, it is also possible to provide venting holes 102H with different diameters. For example, the venting hole(s) 102H at/in the forming device 102C may be smaller or larger than the venting holes 102H formed outside of the forming device 102C.

The positions of the venting holes 102H may be visible on the finished administration packaging 1 or bottom part 3. In particular, the bottom part 3 may have deformations 21, such as marks, bulges, humps, or imprints, at the corresponding positions, e.g., along the axis A. This is especially the case for the preferred plastic sheet 200 as described in connection with FIGS. 5 and 7.

Particularly preferably, the administration packaging 1 or bottom part 3 has one or multiple deformations 21, such as marks, bulges, humps, or imprints, from or generated by the venting hole(s) 102H (also) at the predetermined breaking zone 9. By way of example, FIG. 25 shows a deformation 21 at the predetermined breaking zone 9 by dashed lines.

The deformations 21 have (in a plan view) preferably a diameter and/or shape which is similar to the diameter and/or shape of the respective venting holes 102H.

In particular, by means of the one or multiple deformations 21 at the predetermined breaking zone 9, the breaking behavior, in particular frangibility, may be enhanced.

A further aspect of the present invention relates to a use of a plastic sheet 200 for producing an administration packaging 1 for a preferably liquid pharmaceutic product 2,
   wherein the administration packaging 1 has a bottom part 3 having a cavity 5 for receiving the pharmaceutic product 2 and a rim 8 surrounding the cavity 5,
   wherein the administration packaging 1 has a cover 4 which covers and completely closes the cavity 5,
   wherein the bottom part 3 is formed from the plastic sheet 200 in form of a multi-layer film, preferably by thermoforming or deep drawing,
characterized
   in that the plastic sheet 200 of the bottom part 3 comprises at least five layers:
   an outer thermoformable layer 201,
   a cyclic olefin copolymer (COC) layer 202,
   an inner thermoformable layer 203,
   a barrier layer 204, preferably layer against oxygen and/or chemicals,
   a sealing layer 205, preferably a heat-sealing layer,
   wherein the cyclic olefin copolymer layer 202 is arranged between the outer thermoformable layer 201 and the inner thermoformable layer 203 and wherein the barrier layer 204 is arranged between the sealable layer 205 and the inner thermoformable layer 203.

Individual aspects, features and method steps can be implemented independently from each other, but also in any desired combination or order.

In particular, the present invention relates to any one of the following aspects which can be realized independently or in any combination, also in combination with any aspects above:

1. Administration packaging 1 for a preferably liquid pharmaceutic product 2,
   wherein the administration packaging 1 has a bottom part 3 having a cavity 5 for receiving the pharmaceutic product 2 and a rim 8 surrounding the cavity 5,
   wherein the administration packaging 1 has a cover 4 which covers and completely closes the cavity 5,
   wherein the administration packaging 1, in particular the bottom part 3, has a predetermined breaking zone 9 for opening the administration packaging 1 by breaking the breaking zone 9,
   wherein the bottom part 3 is formed from a plastic sheet 200 in form of a multi-layer film and wherein the cover 4 is a cover sheet 300 in form of a multi-layer film,
   characterized
   in that the plastic sheet 200 of the bottom part 3 comprises at least 5 layers:
   an outer thermoformable layer 201,
   a cyclic olefin copolymer (COC) layer 202,
   an inner thermoformable layer 203, a barrier layer 204, preferably layer against oxygen and/or chemicals,
a sealing layer 205, preferably a heat-sealing layer,
wherein the cyclic olefin copolymer layer 202 is arranged between the outer thermoformable layer 201 and the inner thermoformable layer 203 and wherein the barrier layer 204 is arranged between the sealable layer 205 and the inner thermoformable layer 203.

2. Administration packaging 1 according to aspect 1, wherein the outer thermoformable layer 201 comprises or consists of, preferably consists of, a polymer is selected from the group consisting of polystyrene (PS), polyvinyl chloride (PVC), amorphous polyethylene therephthalate (APET), ethylene butylacrylate (EBA), ethylene vinyl acetate (EVA), polypropylene (PP), polyethylene (PE), low-density polyethylene (LDPE), linear low-density polyethylene (LLDPE) and mixtures thereof 3. Administration packaging 1 according to aspect 1 or 2, wherein the outer thermoformable layer 201 and the inner thermoformable layer 203 comprise or consist of the same polymer, preferably consist of the same polymer.

4. Administration packaging 1 according to any of the preceding aspects, wherein the barrier layer 204 comprises or consist of, preferably consists of, a polymer selected from the group consisting of ethylene vinyl alcohol (EVOH), ethylene vinyl acetate (EVA), polyvinylidene chloride (PVDC), polychlorotrifluoroethylene (PCTFE), polyethylene therephthalate (PET), amorphous polyethylene therephthalate (APET), polyethylene naphthalate (PEN), ethyl methylacrylate (EMA), ethylene butylacrylate (EBA), ethylene ethylacrylate (EEA), poly(methyl methacrylate) (PMMA), ethylene/methyl methacrylate (EMMA), ethylene acrylic acid copolymers (EAA), ethylene methacrylic acid copolymers (EMAA), polyacrylonitrile (PAN) or mixtures thereof, particularly ethylene vinyl alcohol (EVOH), polyvinylidene chloride (PVDC), polychlorotrifuorethylene (PCTFE) and mixtures thereof, preferably ethylene vinyl alcohol (EVOH).

5. Administration packaging 1 according to any of the preceding aspects, wherein the sealing layer 205 comprises or consists of, preferably consists of, a polymer selected from the group consisting of polypropylene (PP), copolymers of propylene (CoPP), terpolymers of polypropylene (ter-PP), polyethylene (PE), low-density polyethylene (LDPE), linear low-density polyethylene (LLDPE), metallocene linear low-density polyethylene (mLLDPE), very low-density polyethylene (VLDPE), ionomers of acid copolymers, ethylene acrylic acid copolymers (EAA), ethylene methacrylic acid copolymers (EMAA), ethyl methylacrylate (EMA), ethylene vinyl alcohol (EVA) or mixtures thereof 6. Administration packaging 1 according to any of the preceding aspects, wherein the cyclic olefin copolymer layer 202 has a thickness in the range of from 200 to 600 µm, particularly 250 to 500 µm, preferably 300 to 450 µm, more preferably 350 to 400 µm, particularly preferably 360 to 390 µm.

7. Administration packaging 1 according to any of the preceding aspects, wherein the thickness of the cyclic olefin copolymer layer 202 to the thickness of the outer thermoformable layer 201 and/or the thickness of the inner thermoformable layer 203 is in the range of 5:1 to 30:1, particularly 7:1 to 25:1, preferably 10:1 to 22:1, more preferably 13:1 to 20:1, particularly preferably 15:1 to 18:1.

8. Administration packaging 1 according to any of the preceding aspects, wherein the plastic sheet 200 of the bottom part 3 comprises an intermediate layer 206, preferably a polyolefine layer, particularly wherein the intermediate layer 206 is arranged between the inner thermoformable layer 203 and the barrier layer 204.

9. Administration packaging 1 according to any of the preceding aspects, wherein the plastic sheet 200 of the bottom part 3 comprises or consists of at least 5 layers with the following, in particular consecutive, layer sequence:
the outer thermoformable layer 201, followed by
the cyclic olefin copolymer (COC) layer 202, followed by
the inner thermoformable layer 203, followed by
optionally, the intermediate layer 206, followed by
the barrier layer 204, preferably layer against oxygen and/or chemicals, followed by
the sealing layer 205, preferably a heat-sealing layer.

10. Administration packaging 1 according to aspect 9, wherein the outer thermoformable layer 201 comprises or consists of, preferably consists of, a polymer selected from the group consisting of polystyrene (PS), polyvinyl chloride (PVC), amorphous polyethylene therephthalate (APET), ethylene butylacrylate (EBA), ethylene vinyl acetate (EVA), polypropylene (PP), polyethylene (PE), low-density polyethylene (LDPE), linear low-density polyethylene (LLDPE) and mixtures thereof 11. Administration packaging 1 according to aspect 9, wherein the plastic sheet 200 comprises or consists of the following, in particular consecutive, layer structure with the following layer sequence:
(a) an outer thermoformable layer 201 comprising or consisting of PP, followed by
(b) a cyclic olefin copolymer layer 202 comprising or consisting of COC, followed by
(c) an inner thermoformable layer 203 comprising or consisting of PP, followed by
(d) optionally, the intermediate layer 206 comprising or consisting of PE, followed by
(e) a barrier layer 204 comprising or consisting of EVOH, followed by
(f) a sealing layer 205 comprising or consisting of PE.

12. Administration packaging 1 according to any of the preceding aspects, wherein the cover sheet 300 comprises or consists of the following layers:
a protective layer 301,
a first barrier layer 302,
an intermediate layer 303,
a second barrier layer 304 and
a sealing layer 305, preferably a heat sealing layer,
wherein the first barrier layer 302 is arranged between the protective layer 301 and the intermediate layer 303 and wherein the second barrier layer 304 is arranged between the intermediate layer 303 and the sealing layer 305.

13. Administration packaging 1 according to any of the preceding aspects, wherein the cover sheet 300 comprises or consists of the following, in particular consecutive, layer structure with the following layer sequence:
(i) the protective layer 301, followed by
(ii) the first barrier layer 302, followed by
(iii) the intermediate layer 303, followed by
(iv) the second barrier layer 304, followed by
(v) a sealing layer 305.

14. Administration packaging 1 according to any of the preceding aspects, wherein the cover 4 and the bottom part 3 are at least partially joined by the sealing layers 205, 305 of the plastic sheet 200 of the bottom part 3 and the cover sheet 300 of the cover 4, particularly wherein the cover 4 and the bottom part 3 are joined over the whole surface of the rim 8.

15. Administration packaging 1 according to any of the preceding aspects, wherein the plastic sheet 200 of the bottom part 3 comprises or consists of the following layer structure:
    (a) an outer thermoformable layer 201,
    (b) a cyclic olefin copolymer layer 202,
    (c) an inner thermoformable layer 203,
    (d) an intermediate layer 206,
    (e) a barrier layer 204, preferably barrier layer against oxygen and/or chemicals, and
    (f) a sealing, preferably heat-sealing, layer 205, and
    wherein the cover sheet 300 comprises or consists of the following layer structure:
    (i) a protective layer 301,
    (ii) a first barrier layer 302,
    (iii) an intermediate layer 303,
    (iv) a second barrier layer 304 and
    (v) a sealing layer 305.

16. Administration packaging 1 according to any of the preceding aspects, wherein the plastic sheet 200 of the bottom part 3 comprises or consists of the following, in particular consecutive, layer structure with the following layer sequence:
    (a) an outer thermoformable layer 201, in particular comprising or consisting of PP, followed by
    (b) a cyclic olefin copolymer layer 202, in particular comprising or consisting of COC, followed by
    (c) an inner thermoformable layer 203, in particular comprising or consisting of PP, followed by
    (d) optionally, the intermediate layer 206, in particular comprising or consisting of PE, followed by
    (e) a barrier layer 204, in particular comprising or consisting of EVOH, followed by
    (f) a sealing layer 205, in particular comprising or consisting of PE, and
    wherein the cover sheet 300 comprises or consists of the following layer structure:
    (i) the protective layer 301, followed by
    (ii) the first barrier layer 302, followed by
    (iii) the intermediate layer 303, followed by
    (iv) the second barrier layer 304, followed by
    (v) a sealing layer 305.

17. Method for producing and filling an administration packaging 1 according to any of the preceding aspects, the method comprising the following steps:
    at least partially heating a preferably multi-layered plastic sheet 200, in particular to a thermoforming temperature,
    forming a bottom part 3 of the administration packaging 1 by stretching the plastic sheet 200 onto and/or into a molding tool 102, the bottom part 3 having a cavity 5 for receiving the pharmaceutic product 2 and a rim 8 surrounding the cavity 5,
    filling the cavity 5 with the pharmaceutic product 2,
    covering the cavity 5 with a cover 4 and fixing the cover 4 to the rim 8 so that the cavity 5 is completely closed,
    characterized
    in that a predetermined breaking zone 9 is generated in the bottom part 3 with the molding tool 102 and/or during the step of forming the bottom part 3.

18. Method according to aspect 17, wherein the cavity 5 comprises a chamber 6 and an administration channel 7 in fluid communication with the chamber 6, preferably wherein the administration channel 7 is elongated and/or straight and/or has a smaller diameter and/or volume than the chamber 6.

19. Method according to aspect 17 or 18, wherein a molding tool 102 having a negative mold 102A and a positive mold 102B is used for forming the bottom part 3.

20. Method according to one of aspects 17 to 19, wherein the predetermined breaking zone 9 is only formed in the region of the cavity 5, in particular an administration channel 7 of the cavity 5.

21. Use of a plastic sheet 200 for producing an administration packaging 1 for a preferably liquid pharmaceutic product 2, wherein the administration packaging 1 has a bottom part 3 having a cavity 5 for receiving the pharmaceutic product 2 and a rim 8 surrounding the cavity 5, wherein the administration packaging 1 has a cover 4 which covers and completely closes the cavity 5, wherein the bottom part 3 is formed from the plastic sheet 200 in form of a multi-layer film, preferably by thermoforming or deep drawing, characterized in that the plastic sheet 200 of the bottom part 3 comprises at least 5 layers:

an outer thermoformable layer 201, a cyclic olefin copolymer (COC) layer 202, an inner thermoformable layer 203, a barrier layer 204, preferably layer against oxygen and/or chemicals, a sealing layer 205, preferably a heat-sealing layer, wherein the cyclic olefin copolymer layer 202 is arranged between the outer thermoformable layer 201 and the inner thermoformable layer 203 and wherein the barrier layer 204 is arranged between the sealable layer 205 and the inner thermoformable layer 203.

| List of reference numbers: | |
|---|---|
| 1 | administration packaging |
| 1A | axial end of 1 |
| 2 | pharmaceutic product |
| 3 | bottom part |
| 3A | edge |
| 4 | cover |
| 5 | cavity |
| 6 | chamber |
| 7 | administration channel |
| 7A | axial end of 7 |
| 7B | open end |
| 8 | rim |
| 9 | predetermined breaking zone |
| 10 | tip |
| 11 | secondary packaging |
| 12 | base portion |
| 13 | lid |
| 14 | receptacle |
| 15 | groove |
| 16 | outer surface |
| 17 | projection |
| 18 | inner surface |
| 19 | nozzle/cross-section reduction |
| 20 | diffuser/cross-section-enlargement |

-continued

List of reference numbers:

| | |
|---|---|
| 21 | deformation |
| 100 | apparatus |
| 101 | heating device |
| 101A | upper heating plate |
| 101B | lower heating plate |
| 102 | molding tool |
| 102A | negative mold |
| 102B | positive mold |
| 102C | forming device |
| 102D | (concave) surface |
| 102E | (convex) surface |
| 102F | elevation |
| 102G | indentation |
| 102H | venting hole |
| 103 | filling device |
| 104 | covering device |
| 200 | plastic sheet |
| 201 | outer thermoformable layer |
| 202 | cyclic olefin copolymer layer |
| 203 | inner thermoformable layer |
| 204 | barrier layer |
| 205 | sealing layer |
| 206 | intermediate layer |
| 207 | tie layer |
| 208 | adhesive layer |
| 300 | cover sheet |
| 301 | protective layer |
| 302 | first barrier layer |
| 303 | intermediate layer |
| 304 | second barrier layer |
| 305 | sealing layer |
| 306 | tie layer |
| 307 | adhesive layer |
| A | axis |
| D | depth |
| T | thickness |
| W | angle |

What is claimed is:

1. An administration packaging for a pharmaceutic product, comprising:
    a bottom part having a cavity for receiving the pharmaceutic product and a rim surrounding the cavity,
    a cover which covers and completely closes the cavity,
    a predetermined breaking zone for opening the administration packaging by breaking the breaking zone,
    wherein the bottom part is formed from a plastic sheet in form of a multi-layer film and
    wherein the cover is a cover sheet in form of a multi-layer film,
    wherein the plastic sheet of the bottom part comprises at least 5 layers:
    an outer thermoformable layer,
    a cyclic olefin copolymer (COC) layer,
    an inner thermoformable layer,
    a barrier layer, and
    a sealing layer, and
    wherein the cyclic olefin copolymer layer is arranged between the outer thermoformable layer and the inner thermoformable layer and wherein the barrier layer is arranged between the sealable layer and the inner thermoformable layer.

2. The administration packaging according to claim 1, wherein the outer thermoformable layer comprises or consists of a polymer is selected from the group consisting of polystyrene (PS), polyvinyl chloride (PVC), amorphous polyethylene therephthalate (APET), ethylene butylacrylate (EBA), ethylene vinyl acetate (EVA), polypropylene (PP), polyethylene (PE), low-density polyethylene (LDPE), linear low-density polyethylene (LLDPE) and mixtures thereof.

3. The administration packaging according to claim 1, wherein the outer thermoformable layer and the inner thermoformable layer are made of the same polymer.

4. The administration packaging according to claim 1, wherein the barrier layer comprises a polymer selected from the group consisting of ethylene vinyl alcohol (EVOH), ethylene vinyl acetate (EVA), polyvinylidene chloride (PVDC), polychlorotrifluoroethylene (PCTFE), polyethylene therephthalate (PET), amorphous polyethylene therephthalate (APET), polyethylene naphthalate (PEN), ethyl methylacrylate (EMA), ethylene butylacrylate (EBA), ethylene ethylacrylate (EEA), poly(methyl methacrylate) (PMMA), ethylene/methyl methacrylate (EMMA), ethylene acrylic acid copolymers (EAA), ethylene methacrylic acid copolymers (EMAA), polyacrylonitrile (PAN) or mixtures thereof.

5. The administration packaging according to claim 1, wherein the sealing layer comprises a polymer selected from the group consisting of polypropylene (PP), copolymers of propylene (CoPP), terpolymers of polypropylene (ter-PP), polyethylene (PE), low-density polyethylene (LDPE), linear low-density polyethylene (LLDPE), metallocene linear low-density polyethylene (mLLDPE), very low-density polyethylene (VLDPE), ionomers of acid copolymers, ethylene acrylic acid copolymers (EAA), ethylene methacrylic acid copolymers (EMAA), ethyl methylacrylate (EMA), ethylene vinyl alcohol (EVA) or mixtures thereof.

6. The administration packaging according to claim 1, wherein the cyclic olefin copolymer layer has a thickness in the range of from 200 to 600 μm.

7. The administration packaging according to claim 1, wherein the thickness of the cyclic olefin copolymer layer to the thickness of the outer thermoformable layer and/or the thickness of the inner thermoformable layer is in the range of for 5:1 to 30:1.

8. The administration packaging according to claim 1, wherein the plastic sheet of the bottom part comprises an intermediate layer.

9. The administration packaging according to claim 1, wherein the plastic sheet of the bottom part comprises at least 5 layers with the following layer sequence:
    the outer thermoformable layer, followed by
    the cyclic olefin copolymer (COC) layer, followed by
    the inner thermoformable layer, followed by
    optionally, the intermediate layer, followed by
    the barrier layer, followed by
    the sealing layer.

10. The administration packaging according to claim 9, wherein the outer thermoformable layer comprises a polymer selected from the group consisting of polystyrene (PS), polyvinyl chloride (PVC), amorphous polyethylene therephthalate (APET), ethylene butylacrylate (EBA), ethylene vinyl acetate (EVA), polypropylene (PP), polyethylene (PE), low-density polyethylene (LDPE), linear low-density polyethylene (LLDPE) and mixtures thereof.

11. The administration packaging according to claim 9, wherein the plastic sheet comprises the following layer structure with the following layer sequence:
    (a) an outer thermoformable layer comprising PP, followed by
    (b) a cyclic olefin copolymer layer comprising COC, followed by
    (c) an inner thermoformable layer comprising PP, followed by
    (d) optionally, the intermediate layer comprising PE, followed by
    (e) a barrier layer comprising of EVOH, followed by
    (f) a sealing layer comprising of PE.

12. The administration packaging according to claim 1, wherein the cover sheet comprises the following layers:
- a protective layer,
- a first barrier layer,
- an intermediate layer,
- a second barrier layer and
- a sealing layer, wherein the first barrier layer is arranged between the protective layer and the intermediate layer and wherein the second barrier layer is arranged between the intermediate layer and the sealing layer.

13. The administration packaging according to claim 1, wherein the cover sheet comprises the following layer structure with the following layer sequence:
- (i) the protective layer, followed by
- (ii) the first barrier layer, followed by
- (iii) the intermediate layer, followed by
- (iv) the second barrier layer, followed by
- (v) a sealing layer.

14. The administration packaging according to claim 1, wherein the cover and the bottom part are at least partially joined by the sealing layers of the plastic sheet of the bottom part and the cover sheet of the cover.

15. The administration packaging according to claim 1, wherein the plastic sheet of the bottom part comprises the following layer structure:
- (a) an outer thermoformable layer,
- (b) a cyclic olefin copolymer layer,
- (c) an inner thermoformable layer,
- (d) an intermediate layer,
- (e) a barrier layer, and
- (f) a sealing layer, and wherein the cover sheet comprises the following layer structure:
- (i) a protective layer,
- (ii) a first barrier layer,
- (iii) an intermediate layer,
- (iv) a second barrier layer and
- (v) a sealing layer.

16. The administration packaging according to claim 1, wherein the plastic sheet of the bottom part comprises the following layer structure with the following layer sequence:
- (a) an outer thermoformable layer, followed by
- (b) a cyclic olefin copolymer layer, followed by
- (c) an inner thermoformable layer, followed by
- (d) optionally, the intermediate layer, followed by
- (e) a barrier layer, followed by
- (f) a sealing layer, and wherein the cover sheet comprises the following layer structure:
- (i) the protective layer, followed by (ii) the first barrier layer, followed by
- (iii) the intermediate layer, followed by
- (iv) the second barrier layer, followed by
- (v) a sealing layer.

17. A method for producing and filling an administration packaging for a pharmaceutic product,
wherein the administration packaging has a bottom part having a cavity for receiving the pharmaceutic product and a rim surrounding the cavity,
wherein the administration packaging has a cover which covers and completely closes the cavity,
wherein the administration packaging has a predetermined breaking zone for opening the administration packaging by breaking the breaking zone,
wherein the bottom part is formed from a plastic sheet in form of a multi-layer film and
wherein the cover is a cover sheet in form of a multi-layer film,
wherein the plastic sheet of the bottom part comprises at least the following 5 layers:
- an outer thermoformable layer,
- a cyclic olefin copolymer (COC) layer,
- an inner thermoformable layer,
- a barrier layer,
- a sealing layer, wherein the cyclic olefin copolymer layer is arranged between the outer thermoformable layer and the inner thermoformable layer and wherein the barrier layer is arranged between the sealable layer and the inner thermoformable layer, the method comprises the following steps:
at least partially heating a multi-layered plastic sheet,
forming a bottom part of the administration packaging by stretching the plastic sheet onto and/or into a molding tool, the bottom part having a cavity for receiving the pharmaceutic product and a rim surrounding the cavity,
generating a predetermined breaking zone in the bottom part with the molding tool and/or during the step of forming the bottom part,
filling the cavity with the pharmaceutic product, and
covering the cavity with a cover and fixing the cover to the rim so that the cavity is completely closed.

18. The method according to claim 17, wherein the cavity comprises a chamber and an administration channel in fluid communication with the chamber.

19. The method according to claim 17, wherein the predetermined breaking zone is only formed in the region of the cavity.

20. An administration packaging for a pharmaceutic product, comprising
a bottom part having a cavity for receiving the pharmaceutic product and a rim surrounding the cavity, and
a cover which covers and completely closes the cavity,
wherein the bottom part is formed from the plastic sheet in form of a multi-layer film,
wherein the plastic sheet of the bottom part comprises at least the following 5 layers:
- an outer thermoformable layer,
- a cyclic olefin copolymer (COC) layer,
- an inner thermoformable layer,
- a barrier layer, and
- a sealing layer, wherein the cyclic olefin copolymer layer is arranged between the outer thermoformable layer and the inner thermoformable layer and wherein the barrier layer is arranged between the sealable layer and the inner thermoformable layer.

* * * * *